United States Patent
Huang et al.

(10) Patent No.: US 11,718,696 B2
(45) Date of Patent: Aug. 8, 2023

(54) PROCESS FOR FAST DISSOLUTION OF POWDER COMPRISING LOW MOLECULAR WEIGHT ACRYLAMIDE-BASED POLYMER

(71) Applicant: ECOLAB USA INC., St. Paul, MN (US)

(72) Inventors: Heqing Huang, Naperville, IL (US); Cheng Sung Huang, Naperville, IL (US); Weiguo Cheng, Naperville, IL (US)

(73) Assignee: ECOLAB USA INC., St. Paul, MN (US)

( * ) Notice: Subject to any disclaimer, the term of this patent is extended or adjusted under 35 U.S.C. 154(b) by 667 days.

(21) Appl. No.: 16/635,125

(22) PCT Filed: Jul. 31, 2018

(86) PCT No.: PCT/US2018/044570
§ 371 (c)(1),
(2) Date: Jan. 29, 2020

(87) PCT Pub. No.: WO2019/028001
PCT Pub. Date: Feb. 7, 2019

(65) Prior Publication Data
US 2020/0255569 A1 Aug. 13, 2020

Related U.S. Application Data

(60) Provisional application No. 62/539,323, filed on Jul. 31, 2017.

(51) Int. Cl.
| | |
|---|---|
| *C08F 220/56* | (2006.01) |
| *C08J 3/05* | (2006.01) |
| *D21H 17/37* | (2006.01) |
| *D21H 21/18* | (2006.01) |
| *C08L 33/26* | (2006.01) |

(52) U.S. Cl.
CPC ............. *C08F 220/56* (2013.01); *C08J 3/05* (2013.01); *C08L 33/26* (2013.01); *D21H 17/375* (2013.01); *D21H 21/18* (2013.01); *C08J 2333/26* (2013.01)

(58) Field of Classification Search
CPC ........ C08F 220/56; C08J 3/05; C08J 2333/26; C08L 33/26; D21H 17/375; D21H 21/18
See application file for complete search history.

(56) References Cited

U.S. PATENT DOCUMENTS

| | | | |
|---|---|---|---|
| 4,874,588 A * | 10/1989 | Sortwell | B01F 25/85 |
| | | | 528/499 |
| 5,221,435 A | 6/1993 | Smith, Jr. | |
| 6,228,217 B1 | 5/2001 | Dickerson | |
| 6,365,667 B1 | 4/2002 | Shannon et al. | |
| 8,425,726 B2 | 4/2013 | Buwono et al. | |
| 2005/0012470 A1 | 1/2005 | Qiu | |
| 2005/0161183 A1 | 7/2005 | Covarrubias | |
| 2008/0216979 A1 | 9/2008 | Schaffer | |
| 2011/0155339 A1 | 6/2011 | Brungardt et al. | |
| 2014/0360691 A1 | 12/2014 | Hietaniemi et al. | |
| 2015/0167245 A1 | 6/2015 | Cheng et al. | |
| 2016/0326698 A1 | 11/2016 | Chen et al. | |
| 2017/0029546 A1 * | 2/2017 | Langlotz | C08F 2/10 |

FOREIGN PATENT DOCUMENTS

| | | |
|---|---|---|
| CN | 101942779 | 1/2011 |
| CN | 102532409 | 7/2012 |
| JP | S5493089 | 7/1979 |
| JP | S61-57625 A | 3/1986 |
| JP | 6330554 | 2/1988 |
| JP | H4-96913 A | 3/1992 |
| WO | 1998035095 | 8/1998 |
| WO | 2016120524 | 8/2016 |

OTHER PUBLICATIONS

Z. Li et al, Facile synthesis of polyaniline hollow microsphere via self-assembly and its high electrochemical performance, Journal of The Electrochemical Society, 2018, 165, G75-G79.*
International Search Report and Written Opinion issued to PCT/US2018/044570, dated Feb. 4, 2020 (9 pages).
Nobukuni, Shigeki et al., Japan Tappi Journal70.5 (Jul. 30, 2016): 493-497; Accession No. PQ0003784216; DOI:10.2524/jtappij.70.493, https://www.jstage.jst.go.jp/article/jtappij/70/5/70_70.493/_article.
Suzuki, Hiroshi et al., Novel PAM Based Dry Strength Resins, Japan Tappi Journal66.5 (Jan. 1, 2013): 477-480; Accession No. 19911975; https://www.jstage.jst.go.jp/article/jtappij/66/5/66_477/_article.
Zhu, Xianmei et al., Study on branched polyacrylamide preparation and application, Advanced Materials Research, v 174, 490-3, 2011; ISSN: 1022-6680; DOI: 10.4028/www.scientific.net/AMR.174.490; Publisher: Trans Tech Publications Ltd., Switzerland; Accession No. 11986758, https://www.scientific.net/AMR.174.490.
Abson, Derek et al., Wet-End Behavior of Dry Strength Additives, Tappi Journal, v 68, n 1, p. 76-78, Jan. 1985; ISSN: 07341415; Accession No. 1985020019846.
Nakamura, Tomonori, PAM-type Ply Bond Strength Agent "Himoloc MJ-450", Kami Pa Gikyoshi/Japan Tappi Journal, v 57, n 11, p. 28-31, Nov. 2003; Language: Japanese; ISSN: 0022815X; Publisher: Japan Technical Assoc. of the Pulp and Paper Industry; Accession No. 2004017802082, https://www.jstage.jst.go.jp/article/tappij1955/57/11/57_11_1618/_article.

(Continued)

*Primary Examiner* — Kumar R Bhushan
(74) *Attorney, Agent, or Firm* — Eric D. Babych; Barnes & Thornburg LLP

(57) ABSTRACT

A process for making down a powder is provided. The process comprises making down a powder comprising one or more acrylamide-based polymer(s) to form a made down powder solution, comprising blending a mixture of the powder and a solvent for no more than about 15 minutes to yield the made down powder solution, wherein the powder comprises particles having been dry-cut to a median particle size of from about 200 microns to about 10,000 microns.

15 Claims, 4 Drawing Sheets

(56) References Cited

OTHER PUBLICATIONS

Zhu, Xian-Mei et al., Preparation of active resistant-electrolytic amphoteric polyacrylamide and its application as paper strength aid, Journal of Xi'an University of Technology, v 26, n 4, 412-16, Dec. 2010; Language: Chinese; ISSN: 1006-4710; Publisher: Xi'an University of Technology, China; Accession No. 12366532, http://open.oriprobe.com/articles/26072485/Preparation_of_Active_Resistant_Electrolytic_Ampho.htm.

* cited by examiner

PROCESS FOR FAST DISSOLUTION OF POWDER COMPRISING LOW MOLECULAR WEIGHT ACRYLAMIDE-BASED POLYMER

This application is an international (i.e., PCT) application claiming the benefit of U.S. Provisional Patent Application Ser. No. 62/539,323, filed Jul. 31, 2017, the disclosure of which is incorporated herein by reference in its entirety.

BACKGROUND OF THE INVENTION

Polymers with relatively low molecular weight (e.g., typically lower than 2 million Daltons) are commonly used in many industrial processes (e.g., mining, textiles, or papermaking). For example, some low molecular weight polymers can be employed as strength aids in papermaking to help improve the strength of the sheet, or in textiles to impart strength and dexterity to a fabric. In addition, some low molecular weight polymers can be employed in the mining industry to improve wastewater recovery, reuse, and recycling.

Depending on polymer structure, weight average molecular weight, and function, the polymer product may exist and be marketed as a powder, liquid, or concentrated solution. In many applications, the polymer product must be dissolved and used as a solution-based product. For example, to be used effectively, high and low molecular weight polymers have to be dissolved and diluted to approximately less than about 1 wt. %, before they are added to a paper machine/papermaking process.

When used for papermaking, powder polymers are made down at low concentration, under gentle mixing, for extended periods. The aforementioned process is cumbersome, but ensures that the powder polymer is fully dissolved without degrading the molecular weight, and thereby, reducing performance. A drawback to this approach is that the demand for low concentration solutions generally requires large make down equipment, and, thus, maintains a large spatial footprint.

One technique to accelerate the dissolution process and reduce the spatial footprint is to reduce particle size of the powder polymer. Although this technique shortens dissolution times, the reduced particle size tends to suffer from other drawbacks, such as cost, resources, and degradation associated with grinding, "fisheyes" (i.e., caking together of powder particles upon wetting), and safety and regulatory issues related to dusting, packaging, and storing the powder polymer.

Another approach for dealing with powder dissolution is disclosed by Sortwell et al. (U.S. Pat. No. 4,874,588). Sortwell et al. discloses a method of "wet cutting" a powder polymer to reduce particle size and facilitate dissolution. The process consists of first forming a suspension of relatively large powder particles in water, before cutting the wetted powder with a bladed apparatus, suitable for size reduction of particles. In order to reduce the size of the large particles Sortwell et al. subjects them to instantaneous and momentary high cutting shear. Although this process purportedly avoids problems associated with dusting of finely cut particles, other potential drawbacks to this approach include apparatus setup, high blade speeds (e.g., 10,000 to 13,000 rpms), wearing of the blades, overheating, fisheyes, and the necessity for high motor capacities (see, for example, Pich et al., U.S. Pat. No. 8,186,871).

Thus, there remains a need for a method of making down low molecular weight powder polymer products that does not require finely ground powder, low concentrations, and extended mixing times.

BRIEF SUMMARY OF THE INVENTION

A process for making down a powder comprising one or more acrylamide-based polymer(s) to form a made down powder solution is provided. The process comprises blending a mixture of the powder and a solvent for no more than about 15 minutes to yield the made down powder solution, wherein the powder comprises particles having been dry-cut to a median particle size of from about 200 microns to about 10,000 microns. In certain aspects of the process, a powder solution made down at a tip speed of about 5 m/sec to about 25 m/sec has an intrinsic viscosity (dL/g) within about 20% deviation of an intrinsic viscosity (dL/g) of an identical solution, wherein the identical solution has been made down with a cage stirrer with a tip speed of about 1.26 m/s, and otherwise identical conditions.

The present disclosure provides a unique approach to making down a powder comprising an acrylamide-based polymer (e.g., strength aid). Using the blending technique described herein, the demands for low concentrations, small particle size, and extended mixing times can be mitigated.

DETAILED DESCRIPTION OF THE INVENTION

Figure 1:
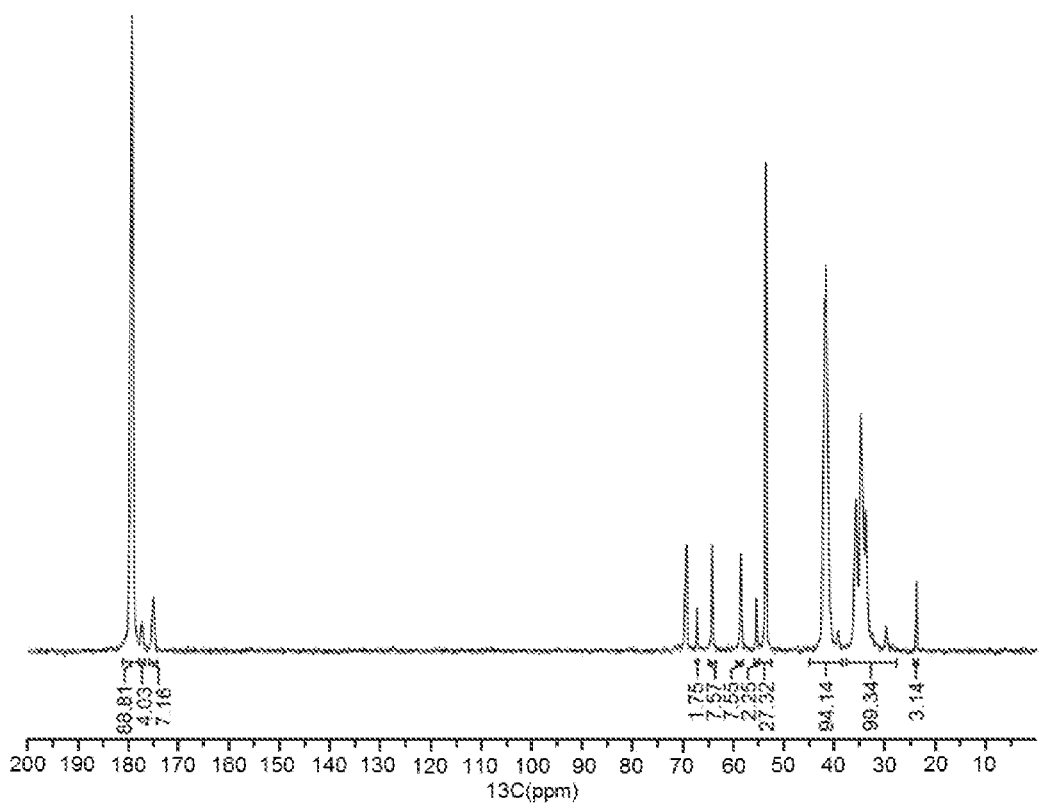
FIG. 1 is an exemplary $^{13}$C nuclear magnetic resonance (NMR) spectrum of the associative polymer described in Example 5.

Generally, high and low molecular weight polymers are diluted, dissolved, and then added to their respective applications as aqueous solutions to avoid solubility issues and damage from the high heat and/or shear. Common approaches for ensuring complete dissolution of powder-based polymer products include, but are not limited to, reduced particle size, low powder concentrations, and extended mixing times. Attempts to speed up the process by increasing the shear of the make down unit can result in irreparable polymer damage. A benefit of the process, described herein, is that the process does not require a powder with reduced particle size, dilute mixing concentrations, or extended mixing times, and does not damage the acrylamide-based polymer, described herein. Thus, the process, described herein, can help reduce costs associated with large make down equipment, and time consumed during make down and application to industrial processes (e.g., mining, textiles, or papermaking).

A process for making down a powder comprising one or more acrylamide-based polymer(s) to form a made down powder solution is provided. The process comprises blending a mixture of the powder and a solvent at an impeller tip speed of about for no more than about 15 minutes to yield the made down powder solution, wherein the powder comprises particles having been dry-cut to a median particle size of from about 200 microns to about 10,000 microns.

The process comprises blending a mixture of the powder and the solvent. As used herein, "blending" can refer to any process used to intersperse the powder and the solvent. For example, blending can mean mixing, stirring, whisking, shaking, pumping, or any combination thereof. Any apparatus, and/or make down unit can be used to blend the powder and the solvent, as long as the apparatus, and/or make down unit fulfill the limitations described herein. An exemplary make down unit for blending the powder and the solvent is an IKA T 25 digital UILTRA-TURRAX® high performance dispersing instrument, available from IKA® (Wilmington, N.C.).

In some embodiments, the process comprises blending the mixture of the powder and the solvent at an impeller tip speed of about 5 m/sec to about 25 m/sec (e.g., about 5 m/sec, about 6 m/sec, about 7 m/sec, about 8 m/sec, about 9 m/sec, about 10 m/sec, about 11 m/sec, about 12 m/sec, about 13 m/sec, about 14 m/sec, about 15 m/sec, about 16 m/sec, about 17 m/sec, about 18 m/sec, about 19 m/sec, about 20 m/sec, about 21 m/sec, about 22 m/sec, about 23 m/sec, about 24 m/sec, or about 25 m/sec). As used herein, "impeller tip speed" refers to the tangential velocity (m/sec) of an impeller used in blending the powder and the solvent in a stirred tank. In certain embodiments, the process comprises blending the mixture of the powder and the solvent at an impeller tip speed of about 10 m/sec to about 20 m/sec.

In some embodiments, the process comprises blending the mixture of the powder and the solvent with a rotor frequency of rotation of about 4,000 revolutions per min ("rpm") to about 20,000 rpm (e.g., about 4,000 rpm, about 5,000 rpm, about 6,000 rpm, about 7,000 rpm, about 8,000 rpm, about 9,000 rpm, about 10,000 rpm, about 11,000 rpm, about 12,000 rpm, about 13,000 rpm, about 14,000 rpm, about 15,000 rpm, about 16,000 rpm, about 17,000 rpm, about 18,000 rpm, about 19,000 rpm, or about 20,000 rpm). In some embodiments, the process comprises blending the mixture of the powder and the solvent with a rotor frequency of rotation of about 8,000 rpm to about 20,000 rpm. In certain embodiments, the process comprising blending the mixture of the powder and the solvent with a rotor frequency of rotation of about 8,000 rpm to about 16,000 rpm.

The mixture of the powder and the solvent can be blended for any period of time such that the period of time is sufficient to yield a made down powder solution. In some embodiments, the mixture of the powder and the solvent is blended for no more than about 15 minutes to yield the made down powder solution. For example, the mixture of the powder and the solvent can be blended for about 14 minutes to yield the made down powder solution, for example, about 13 minutes, about 12 minutes, about 11 minutes, about 10 minute, about 9 minutes, about 8 minutes, about 7 minutes, about 6 minutes, about 5 minutes, about 4 minutes, about 3 minutes, about 2 minutes, or about 1 minute. In some embodiments, the mixture of the powder and the solvent is blended for no more than about 10 minutes to yield the made down powder solution. In certain embodiments, the mixture of the powder and the solvent is blended for no more than about 5 minutes to yield the made down powder solution.

In some embodiments, the process comprises a pumping rate of about 10 batch volumes/min to about 40 batch volumes/min (e.g., about 10 batch volumes/min, about 11 batch volumes/min, about 12 batch volumes/min, about 13 batch volumes/min, about 14 batch volumes/min, about 15 batch volumes/min, about 16 batch volumes/min, about 17 batch volumes/min, about 18 batch volumes/min, about 19 batch volumes/min, about 20 batch volumes/min, about 21 batch volumes/min, about 22 batch volumes/min, about 23 batch volumes/min, about 24 batch volumes/min, about 25 batch volumes/min, about 26 batch volumes/min, about 27 batch volumes/min, about 28 batch volumes/min, about 29 batch volumes/min, about 30 batch volumes/min, about 31 batch volumes/min, about 32 batch volumes/min, about 33 batch volumes/min, about 34 batch volumes/min, about 35 batch volumes/min, about 36 batch volumes/min, about 37 batch volumes/min, about 38 batch volumes/min, about 39 batch volumes/min, or about 40 batch volumes/min). As used herein, "pumping rate" refers to the turnover rate of making down a batch of the powder and the solvent. The batch volume is not particularly limited, such that any batch volume can be used. In some embodiments, the process comprises a pumping rate of about 15 batch volumes/min to about 40 batch volumes/min. In certain embodiments, the process comprises a pumping rate of about 20 batch volumes/min to about 40 batch volumes/min.

The powder comprises particles that have been dry cut (e.g., cut or ground) to their median particle size. As used herein, the term "dry cut" refers to a process where the cutting used to achieve the median particle size, described herein, is not facilitated by the addition of water. Without wishing to be bound by any particular theory, it is believed that the process described herein does not require such fine particles that would necessitate "wet cutting" to avoid problems such as dusting.

The powder can have any suitable median particle size (i.e., median particle diameter). The median particle size can be determined by any suitable method known in the art. Generally, the median particle size is determined by a Horiba Laser Scattering Particle Size Distribution Analyzer LA-950. The powder can have a median particle size of about 200 microns or more, for example, about 250 microns or more, about 300 microns or more, about 350 microns or more, about 400 microns or more, about 450 microns or more, or about 500 microns or more. Alternatively, or in addition, the powder can have a median particle size of about 10,000 microns or less, for example, about 8,000 microns or less, about 6,000 microns or less, about 4,000 microns or less, about 2,000 microns or less, or about 1,000 microns or less. Thus, the powder can have a median particle size bounded by any two of the aforementioned endpoints. The powder can have a median particle size of from about 200 micron to about 10,000 microns, for example, from about 200 micron to about 8,000 microns, from about 200 micron to about 6,000 microns, from about 200 micron to about 4,000 microns, from about 200 micron to about 2,000 microns, from about 200 microns to about 1,000 microns, from about 250 microns to about 10,000 microns, from about 300 microns to about 10,000 microns, from about 350 microns to about 10,000 microns, from about 400 microns to about 10,000 microns, from about 450 microns to about 10,000 microns, from about 500 microns to about 10,000 microns, from about, from about 250 microns to about 2,000 microns, from about 300 microns to about 2,000 microns, from about 350 microns to about 2,000 microns, from about 400 microns to about 2,000 microns, from about 450 microns to about 2,000 microns, or from about 500 microns to about 2,000 microns.

In some embodiments, the powder, at a median particle size of at least about 200 microns (e.g., at least 350 microns or at least 500 microns), as up to a 1 wt. % solution in water, will become a fully made down powder solution within about 10 minutes (e.g., within about 8 minutes or within about 5 minutes) at 25° C. and 1 atm with stirring with an impeller at a tip speed of at least about 10 m/s. In some embodiments, the powder, at a median particle size of at least about 200 microns (e.g., at least 350 microns or at least 500 microns), as up to a 2 wt. % solution in water, will become a fully made down powder solution within about 10 minutes (e.g., within about 8 minutes or within about 5 minutes) at 25° C. and 1 atm with stirring with an impeller at a tip speed of at least about 10 m/s. In some embodiments, the powder, at a median particle size of at least about 200 microns (e.g., at least 350 microns or at least 500 microns), as up to a 5 wt. % solution in water, will become a fully made down powder solution within about 10 minutes (e.g., within about 8 minutes or within about 5 minutes) at 25° C. and 1 atm with stirring with an impeller at a tip speed of at least about 10 m/s. In some embodiments, the powder, at a median particle size of at least about 200 microns (e.g., at least 350 microns or at least 500 microns), as up to a 10 wt. % solution in water, will become a fully made down powder solution within about 10 minutes (e.g., within about 8 minutes or within about 5 minutes) at 25° C. and 1 atm with stirring with an impeller at a tip speed of at least about 10 m/s.

The solvent can be any solvent suitable for an industrial process (e.g., mining, textiles, or papermaking) that will not interfere with the performance of the polymer. The solvent can be a single chemical or a mixture of two or more chemicals. In certain embodiments, the solvent is water. In some embodiments, the solvent is fresh water. The fresh water can be surface water or ground water. In certain embodiments, the fresh water is further treated prior to use in the methods provided herein. In certain embodiments, the solvent is process water. The process water can be obtained from any suitable step in the industrial process (e.g., cooling water). In some embodiments, the process water is further treated prior to use in the methods provided herein.

The level of dissolution of the powder can be determined by any suitable method. Generally, the level of dissolution as provided herein is determined using the refractive index of the powder solution/suspension. A fully made down powder solution with known concentration can be obtained (at 25° C. and 1 atmosphere ("atm") of pressure) by mixing a predetermined amount of powder in a predetermined amount of water under shear with a cage stirrer at 400-800 rpm until the mixture of powder and water can easily pass through a 100-mesh screen with a trace amount of insoluble residue (<<0.05 wt. % of original powder added) left on the screen. An aliquot of the filtered made down powder solution (i.e., filtrate) can be placed in the cell of a RM50 refractometer (Mettler Toledo), and the refractive index recorded. The refractive index of a made down powder solution should be linearly correlated with the concentration of dissolved acrylamide-based polymer in solution (see, for example, FIG. 5). Thus, a fully made down powder solution can be considered the point when the refractive index reaches the appropriate refractive index value, within error (e.g., about ±5%) of the expected value, on the linearly correlated acrylamide-based polymer concentration curved.

Similarly, the level of dissolution can be monitored as a function of time. A powder suspension can be obtained (at 25° C. and 1 atmosphere ("atm") of pressure) by dispersing a predetermined amount of powder into a predetermined amount of solvent (up to a 10 wt. % powder concentration). Upon dispersion, the powder starts to hydrate but can take time to reach complete dissolution with sufficient mixing. Generally, a stable refractive index cannot be obtained for a powder suspension due to its heterogeneous nature. However, the suspension can be filtered through a 100-mesh screen to remove any undissolved powder, and the filtered acrylamide-based polymer solution can be placed in the cell of a RM50 refractometer (Mettler Toledo), and the refractive index recorded. Using the refractive index of the filtrate, the concentration of the dissolved acrylamide-based polymer in suspension can be calculated with a linear calibration curve (e.g., FIG. 5). To monitor the change of the refractive index and the concentration of dissolved powder during mixing of the powder suspension, a small aliquot from the suspension can be removed at 30-second intervals and filtered through a 100-mesh screen. The filtrate aliquots can be placed on the cell of a RM50 refractometer (Mettler Toledo), and the refractive index recorded. Once the refractive index reaches a plateau, the powder can be considered a fully made down powder solution (see, for example, FIG. 6 (comparative) and FIG. 7).

As described above, conventional make down processes for paper aids require low shear and extended mixing times to avoid irreparable damage to the polymer. A benefit of the process described herein, is that there is minimal, if any, polymer damage. One way to assess the level of damage is to measure the change in intrinsic viscosity and/or viscosity of a polymer made down under high shear, relative to a powder made down under low shear and extended mixing times. Without wishing to be bound by any particular theory, it is believed that if a polymer degrades (e.g., becomes a lower molecular weight), the intrinsic viscosity and/or viscosity will decrease accordingly. Thus, a polymer can be considered capable of withstanding high shear make down conditions if the polymer maintains an intrinsic viscosity and/or viscosity similar to an identical polymer made down with low shear and extended mixing times.

Accordingly, in some embodiments, a 1 wt. % fully made down powder solution in water at 25° C., made down at a tip speed of about 5 m/sec to about 25 m/sec to yield the fully made down powder solution, has a viscosity (cps) within about 20% (e.g., within about 19%, within about 18%, within about 17%, within about 16%, within about 15%, within about 14%, within about 13%, within about 12%, or within about 11%) deviation of a viscosity (cps) of an identical solution, wherein the identical solution has been made down with a cage stirrer at a tip speed of about 1.26 m/s, and otherwise identical conditions, to yield the fully made down powder solution. In certain embodiments, a 1 wt. % fully made down powder solution in water at 25° C., made down at a tip speed of about 5 m/sec to about 25 m/sec to yield the fully made down powder solution, has a viscosity (cps) within about 10% (e.g., within about 9%, within about 8%, within about 7%, within about 6%, within about 5%, within about 4%, within about 3%, within about 2%, or within about 1%) deviation of a viscosity (cps) of an identical solution, wherein the identical solution has been made down with a cage stirrer at a tip speed of about 1.26 m/s, and otherwise identical conditions, to yield the fully made down powder solution.

Similarly, in some embodiments, a 1 wt. % fully made down powder solution in water at 25° C., made down at a tip speed of about 5 m/sec to about 25 m/sec to yield the fully made down powder solution, has an intrinsic viscosity (dL/g) within about 20% (e.g., within about 19%, within about 18%, within about 17%, within about 16%, within about 15%, within about 14%, within about 13%, within about 12%, or within about 11%) deviation of an intrinsic viscosity (dL/g) of an identical solution, wherein the identical solution has been made down with a cage stirrer at a tip speed of about 1.26 m/s, and otherwise identical conditions, to yield the fully made down powder solution. In certain embodiments, a 1 wt. % fully made down powder solution in water at 25° C. made down at a tip speed of about 5 m/sec to about 25 m/sec to yield the fully made down powder solution has an intrinsic viscosity (dL/g) within about 10% (e.g., within about 9%, within about 8%, within about 7%, within about 6%, within about 5%, within about 4%, within about 3%, within about 2%, or within about 1%) deviation of an intrinsic viscosity (dL/g) of an identical solution, wherein the identical solution has been made down with a cage stirrer at a tip speed of about 1.26 m/s, and otherwise identical conditions, to yield the fully made down powder solution.

The made down powder solution can have any suitable intrinsic viscosity. For example, the made down powder solution can have an intrinsic viscosity of from about 0.05 dL/g to about 15 dL/g (e.g., from about 0.05 dL/g to about 10 dL/g, from about 0.05 dL/g to about 7 dL/g, from about 0.05 dL/g to about 6 dL/g, from about 0.05 dL/g to about 5 dL/g, from about 0.05 dL/g to about 4 dL/g, from about 0.05 dL/g to about 3 dL/g, from about 0.05 dL/g to about 2 dL/g, from about 0.05 dL/g to about 1 dL/g, from about 0.05 dL/g to about 0.5 dL/g, from about 0.1 dL/g to about 7 dL/g, from about 0.1 dL/g to about 6 dL/g, from about 0.1 dL/g to about 5 dL/g, from about 0.1 dL/g to about 10 dL/g, from about 0.5 dL/g to about 10 dL/g, from about 0.1 dL/g to about 15 dL/g, or from about 0.5 dL/g to about 15 dL/g. In some embodiments, the made down powder solution has an intrinsic viscosity from about 0.05 dL/g to about 7. In certain embodiments, the made down powder solution has an intrinsic viscosity of from about 0.5 dL/g to about 5 dL/g.

Intrinsic viscosity ("IV") is defined by a series of reduced specific viscosity ("RSV") measurements extrapolated to the limit of infinite dilution, i.e., when the concentration of powder is equal to zero. The RSV is measured at a given powder concentration and temperature and calculated as follows:

$$RSV = \frac{\left(\frac{\eta}{\eta_0} - 1\right)}{c} = \frac{\left(\frac{t}{t_0} - 1\right)}{c}$$

wherein $\eta$ is viscosity of the powder solution, $\eta_0$ is viscosity of the solvent at the same temperature, an t is elution time of the made down powder solution, $t_0$ is elution time of solvent, and c is concentration (g/dL) of the powder in solution. Thus, intrinsic viscosity is defined by dL/g. Variables t and to are measured using powder solution and solvent that is in 1.0 N sodium nitrate solution with a Cannon Ubbelohde semimicro dilution viscometer (size 75) at 30±0.02° C.

The made down powder solution can have any suitable Huggins constant. For example, the made down powder solution can have a Huggins constant from about 0.1 to about 20 (e.g., from about 0.1 to about 15, from about 0.1 to about 10, from about 0.3 to about 10, from about 0.1 to about 5, from about 0.5 to about 20, from about 0.5 to about 10, from about 1 to about 20, from about 1 to about 10, or from about 1 to about 5). In some embodiments, the made down powder solution can have a Huggins constant of from about 0.3 to about 10 as determined by varying concentrations of the made down powder solution, wherein the concentrations have been chosen such that they produce a value of $$\left(\frac{t}{t_0}\right)$$

between about 1.2 and 2.2, in a 1.0 N sodium nitrate solution. In some embodiments, the made down powder solution can have a Huggins constant of from about 0.3 to about 5 as determined by varying concentrations of the powder, wherein the concentrations have been chosen such that they produce a value of $$\left(\frac{t}{t_0}\right)$$

between about 1.2 and 2.2, in a 1.0 N sodium nitrate solution. In certain embodiments, the made down powder solution has a Huggins constant of from about 0.6 to about 3 as determined by varying concentrations of the powder, wherein the concentrations have been chosen such that they produce a value of $$\left(\frac{t}{t_0}\right)$$

between about 1.2 and 2.2, in a 1.0 N sodium nitrate solution. The Huggins constant is calculated as follows:

$$\text{Huggins constant} = \frac{\text{slope of } (RSV \sim c)}{IV^2}$$

The made down powder solution can be used in any suitable application that requires a powder polymer to be converted to a solution based polymer product. For example, the made down powder solution can be used in the mining industry, textile industry, or papermaking industry. In some embodiments, the made down powder solution is added to a paper sheet precursor. As used herein, the term "paper sheet precursor" refers to any component of the papermaking process upstream of the point at which water removal begins (e.g., the table). As used herein, the terms "upstream" and "downstream" refer to components of the papermaking process that are procedurally towards the pulper, and procedurally towards the reel, respectively. Accordingly, the made down powder solution can be added to pulp (e.g., virgin pulp, recycled pulp, or a combination thereof), pulp slurry, cellulosic fibers, a solution used for any of the aforementioned components, and any combination thereof at any one or more of various locations during the papermaking process, up to and including a headbox. In certain embodiments, the made down powder solution can be added to the pulp slurry in a pulper, latency chest, reject refiner chest, disk filter or Decker feed or accept, whitewater system, pulp stock storage chests (either low density ("LD"), medium consistency ("MC"), or high consistency ("HC")), blend chest, machine chest, headbox, save-all chest, or combinations thereof.

In some embodiments, the made down powder solution is added to the paper sheet precursor upstream of a wet end of a paper machine (e.g., before the wet end). As used herein, the term "wet end" refers to any component of the papermaking process including the headbox and downstream thereof. Accordingly, the made down powder solution can be added to any component of the papermaking process up to but not including the headbox. In certain embodiments, the made down powder solution is added to a stock prep section of the paper machine. As used herein, "stock prep section"

refers to any component of the papermaking process wherein the pulp is refined and/or blended. For example, the made down powder solution can be added to the pulp stock storage chests (either low density ("LD"), medium consistency ("MC"), or high consistency ("HC")), blend chest, machine chest, save-all chest, or a combination thereof.

In some embodiments, the pulp slurry comprises recycled fibers. The recycled fibers can be obtained from a variety of paper products or fiber containing products, such as paperboard, newsprint, printing grades, sanitary or other paper products. In some embodiments, these products can comprise, for example, old corrugated cardboard ("OCC"), old newsprint ("ONP"), mixed office waste ("MOW"), magazines, books, or a combination thereof. In some embodiments, the pulp slurry comprises virgin fibers. In embodiments comprising virgin fibers, the pulp can be derived from softwood, hardwood, or blends thereof. In certain embodiments, the virgin pulp can include bleached or unbleached Kraft, sulfite pulp or other chemical pulps, and groundwood ("GW") or other mechanical pulps such as, for example, thermomechanical pulp ("TMP").

The made down powder solution can be added to the industrial process (e.g., papermaking process) in any suitable amount to achieve the desired weight percentage of polymer actives. The made down powder solution can be added to the industrial process (e.g., papermaking process) in an amount to achieve about 0.01 wt. % or more of polymer actives, for example, about 0.05 wt. % or more, about 0.1 wt. % or more, about 0.2 wt. % or more, about 0.3 wt. % or more, about 0.4 wt. % or more, about 0.5 wt. % or more, about 0.6 wt. % or more, about 0.7 wt. % or more, about 0.8 wt. % or more, about 0.9 wt. % or more, or about 1.0 wt. % or more. Alternatively, or in addition to, the made down powder solution can be added to the industrial process (e.g., papermaking process) in an amount to achieve about 10 wt. % or less of polymer actives, for example, about 9 wt. % or less, about 8 wt. % or less, about 7 wt. % or less, about 6 wt. % or less, about 5 wt. % or less, about 4 wt. % or less, about 3 wt. % or less, about 2 wt. % or less, or about 1 wt. % or less. Thus, the made down powder solution can be added to the industrial process (e.g., papermaking process) in any suitable amount bounded by any two of the aforementioned endpoints to achieve the desired weight percentage of polymer actives. The made down powder solution can be added to the industrial process (e.g., papermaking process) in an amount to achieve from about 0.01 wt. % to about 10 wt. % of polymer actives, for example, from about 0.01 wt. % to about 9 wt. %, from about 0.01 wt. % to about 8 wt. %, from about 0.01 wt. % to about 7 wt. %, from about 0.01 wt. % to about 6 wt. %, from about 0.01 wt. % to about 5 wt. %, from about 0.01 wt. % to about 4 wt. %, from about 0.01 wt. % to about 3 wt. %, from about 0.01 wt. % to about 2 wt. %, from about 0.01 wt. % to about 1 wt. %, from about 0.05 wt. % to about 1 wt. %, from about 0.1 wt. % to about 1 wt. %, from about 0.2 wt. % to about 1 wt. %, from about 0.3 wt. % to about 1 wt. %, from about 0.4 wt. % to about 1 wt. %, from about 0.5 wt. % to about 1 wt. %, from about 0.6 wt. % to about 1 wt. %, from about 0.7 wt. % to about 1 wt. %, from about 0.8 wt. % to about 1 wt. %, from about 0.9 wt. % to about 1 wt. %, from about 1 wt. % to about 10 wt. %, from about 0.01 wt. % to about 2 wt. %, or from about 0.01 wt. % to about 5 wt. %.

The made down powder solution can have any suitable acrylamide-based polymer content prior to treating the industrial process (e.g., papermaking process). The made down powder solution can have an acrylamide-based polymer content of about 10 wt. % or less prior to treating the industrial process (e.g., papermaking process), for example, about 9 wt. % or less, about 8 wt. % or less, about 7 wt. % or less, about 6 wt. % or less, about 5 wt. % or less, about 4 wt. % or less, or about 3 wt. % or less. Alternatively, or in addition to, the made down powder solution can have an acrylamide-based polymer content of about 0.1 wt. % or more prior to treating the industrial process (e.g., papermaking process), for example, about 0.5 wt. % or more, about 1 wt. % or more, about 2 wt. % or more, or about 3 wt. % or more. Thus, the made down powder solution can have an acrylamide-based polymer content bounded by any two of the aforementioned endpoints prior to treating the industrial process (e.g., papermaking process). The made down powder solution can have an acrylamide-based polymer content from about 0.1 wt. % to about 10 wt. % prior to treating the industrial process (e.g., papermaking process), for example, from about 0.5 wt. % to about 10 wt. %, from about 1 wt. % to about 10 wt. %, from about 2 wt. % to about 10 wt. %, from about 3 wt. % to about 10 wt. %, from about 0.1 wt. % to about 9 wt. %, from about 0.1 wt. % to about 8 wt. %, from about 0.1 wt. % to about 7 wt. %, from about 0.1 wt. % to about 6 wt. %, from about 0.1 wt. % to about 5 wt. %, from about 0.1 wt. % to about 4 wt. %, from about 0.1 wt. % to about 3 wt. %, from about 0.5 wt. % to about 5 wt. %, from about 0.5 wt. % to about 3 wt. %, from about 1 wt. % to about 5 wt. %, or from about 1 wt. % to about 4 wt. %.

The made down powder solution can be added to the industrial process (e.g., papermaking process) in any suitable dosage of the acrylamide-based polymer (lbs/ton actives). As used herein, the terms "lbs/ton actives" or "lb/ton actives" refer to the pounds of acrylamide-based polymer actives per ton of fiber. The made down powder solution can be added to the industrial process (e.g., papermaking process) in a dosage of the acrylamide-based polymer of at least about 0.1 lbs/ton actives. For example, the made down powder solution can be added to the industrial process (e.g., papermaking process) in a dosage of the acrylamide-based polymer of at least about 0.5 lbs/ton actives, at least about 1 lbs/ton actives, at least about 2 lbs/ton actives, at least about 3 lbs/ton actives, at least about 4 lbs/ton actives, at least about 5 lbs/ton actives, at least about 6 lbs/ton actives, at least about 7 lbs/ton actives, at least about 8 lbs/ton actives, at least about 9 lbs/ton actives, at least about 10 lbs/ton actives, at least about 11 lbs/ton actives, at least about 12 lbs/ton actives, at least about 13 lbs/ton actives, at least about 14 lbs/ton actives, or at least about 15 lbs/ton actives.

In some embodiments, the acrylamide-based polymer can improve strength of the resulting product (e.g., paper product or fabric). Additionally, in certain embodiments, the acrylamide-based polymer can improve one or more additional properties of the resulting product (e.g., paper product or fabric). For example, in addition to strength, the acrylamide-based polymer can improve opacity, smoothness, porosity, dimensional stability, pore size distribution, linting propensity, density, stiffness, formation, compressibility, or a combination thereof. Without wishing to be bound to any particular theory, many of the aforementioned paper or fabric properties are believed to be dependent on the bonds that exist between the cellulosic fibers in the paper or fabric. It is believed that the networking of these fibers may be enhanced by certain chemical aids and additionally by the mechanical beating and/or refining step(s) of the industrial process (e.g., papermaking process), during which the fibers become more flexible and the available surface area is increased.

In certain embodiments, the acrylamide-based polymer improves dry strength of the product (e.g., paper sheet or fabric), wet strength or rewetted strength of the product (e.g., paper sheet or fabric), wet web strength of the product (e.g., paper sheet or fabric), or a combination thereof. Generally, dry strength is recognized as tensile strength exhibited by a dry product (e.g., paper sheet or fabric), typically conditioned under uniform humidity and room temperature conditions prior to testing. Wet strength, or rewetted strength, is recognized as tensile strength exhibited by a paper sheet or fabric that has been fully dried and then rewetted with water prior to testing. Wet web strength is recognized as the strength of a cellulosic fiber mat prior to drying to a paper product.

In certain embodiments, the acrylamide-based polymer improves the dry strength of the product (e.g., paper sheet or fabric). The acrylamide-based polymer can improve any suitable dry strength property of the product (e.g., paper sheet or fabric). For example, the polymer can improve the tensile strength, the STFI ratio, the burst index, the ring crush, or a combination thereof.

In some embodiments, the acrylamide-based polymer increases the tensile strength (Nm/g), on average, by at least about 0.5% per 1 lb/ton actives. For example, the acrylamide-based polymer can increase the tensile strength (Nm/g), on average, by at least about 1% per 1 lb/ton actives, at least about 2% per 1 lb/ton actives, at least about 3% per 1 lb/ton actives, at least about 4% per 1 lb/ton actives, or at least about 5% per 1 lb/ton actives. In some embodiments, the acrylamide-based polymer increases the tensile strength (Nm/g), on average, by about 2% per 1 lb/ton actives. In certain embodiments, the acrylamide-based polymer increases the tensile strength (Nm/g), on average, by about 3% per 1 lb/ton actives.

In some embodiments, the acrylamide-based polymer increases the STFI ratio, on average, by at least about 0.5% per 1 lb/ton actives. For example, the acrylamide-based polymer can increase the STFI ratio, on average, by at least about 1% per 1 lb/ton actives, at least about 2% per 1 lb/ton actives, at least about 3% per 1 lb/ton actives, at least about 4% per 1 lb/ton actives, or at least about 5% per 1 lb/ton actives. In some embodiments, the acrylamide-based polymer increases the STFI ratio, on average, by about 2% per 1 lb/ton actives. In certain embodiments, the acrylamide-based polymer increases the STFI ratio, on average, by about 3% per 1 lb/ton actives.

In some embodiments, the acrylamide-based polymer increases the burst index (PSI 1,000 ft$^2$/lb), on average, by at least about 0.5% per 1 lb/ton actives. For example, the acrylamide-based polymer can increase the burst index (PSI 1,000 ft$^2$/lb), on average, by at least about 1% per 1 lb/ton actives, at least about 2% per 1 lb/ton actives, at least about 3% per 1 lb/ton actives, at least about 4% per 1 lb/ton actives, or at least about 5% per 1 lb/ton actives. In some embodiments, the acrylamide-based polymer increases the burst index (PSI 1,000 ft$^2$/lb), on average, by about 2% per 1 lb/ton actives. In certain embodiments, the acrylamide-based polymer increases the burst index (PSI 1,000 ft$^2$/lb), on average, by about 3% per 1 lb/ton actives.

In some embodiments, the acrylamide-based polymer increases the ring crush (kN/m), on average, by at least about 0.5% per 1 lb/ton actives. For example, the acrylamide-based polymer can increase the ring crush (kN/m), on average, by at least about 1% per 1 lb/ton actives, at least about 2% per 1 lb/ton actives, at least about 3% per 1 lb/ton actives, at least about 4% per 1 lb/ton actives, or at least about 5% per 1 lb/ton actives. In some embodiments, the acrylamide-based polymer increases the ring crush (kN/m), on average, by about 2% per 1 lb/ton actives. In certain embodiments, the acrylamide-based polymer increases the ring crush (kN/m), on average, by about 3% per 1 lb/ton actives.

The acrylamide-based polymer can improve the dry strength of any suitable product (e.g., paper sheet or fabric). In some embodiments, the acrylamide-based polymer improves the dry strength of Kraft paper, tissue paper, testliner paper, duplex topside white paper, cardboard and shaped or molded paperboard, or a combination thereof. In certain embodiments, the acrylamide-based polymer does not require a supplemental strength aid.

In some embodiments, the made down powder solution is used with any suitable conventional papermaking product. For example, the made down powder solution may be used along with one or more inorganic filler(s), dye(s), retention aid(s), drainage aid(s), sizing agent(s), coagulant(s), or combinations thereof.

In some embodiments, the made down powder solution is used with one or more inorganic filler(s). The inorganic filler can be any suitable inorganic filler, capable of increasing opacity or smoothness, decreasing the cost per mass of the paper, or combinations thereof. For example, the made down powder solution can be used with kaolin, chalk, limestone, talc, titanium dioxide, calcined clay, urea formaldehyde, aluminates, aluminosilicates, silicates, calcium carbonate (e.g., ground and/or precipitated), or combinations thereof.

In some embodiments, the made down powder solution is used with one or more dye(s). The dye can be any suitable dye, capable of controlling the coloration of paper. For example, the dye can be a direct dye, a cationic direct dye, acidic dye, basic dye, insoluble colored pigment, or combinations thereof.

In some embodiments, the made down powder solution is used with one or more drainage and/or retention aid(s). The drainage and/or retention aids can be any suitable drainage and/or retention aids, capable of helping to maintain efficiency and drainage of the industrial process, while improving uniformity, and retaining additives. For example, the drainage and/or retention aid can be a cationic polyacrylamide ("PAM") polymer, an anionic polyacrylamide ("PAM") polymer, a cationic polyethylenimine ("PEI") polymer, polyamines, ammonium-based polymers (e.g., polydiallyldimethylammonium chloride ("DADMAC"), colloidal silica, bentonite, polyethylene oxide ("PEO"), starch, polyaluminum sulfate, polyaluminum chloride, or combinations thereof.

In some embodiments, the made down powder solution is used with one or more sizing agent(s). The sizing agent can be any suitable sizing agent, capable of increasing the resistance to water and other liquids, exhibited by the product (e.g., paper sheet or fabric). For example, the sizing agent can be a rosin, alkenylsuccinic anhydride ("ASA"), alkylylketene dimer ("AKD"), or combinations thereof.

In some embodiments, the made down powder solution is used with one or more coagulant(s). The coagulant can be any suitable coagulant. As it relates to the present application, "coagulant" refers to a water treatment chemical used in a solid-liquid separation stage to neutralize charges of suspended particles so that the particles can agglomerate. Generally, coagulants may be categorized as cationic, anionic, amphoteric, or zwitterionic. Furthermore, coagulants may be categorized as inorganic coagulants, organic coagulants, and blends thereof. Exemplary inorganic coagulants include, e.g., aluminum or iron salts, such as aluminum sulfate, aluminum chloride, ferric chloride, ferric sulfate, polyaluminum chloride, and/or aluminum chloride hydrate. Exemplary organic coagulants include, e.g., diallyldimethylammonium chloride ("DADMAC"), dialkylaminoalkyl acrylate and/or a dialkylaminoalkyl methacrylate, or their quaternary or acid salts.

In some embodiments, the powder comprises one or more acrylamide-based polymer(s). For example, the powder can comprise a plurality (e.g., at least two polymer molecules) of acrylamide-based polymer(s), wherein the acrylamide-based polymer(s) have the same molecular structure (i.e., one acrylamide-based polymer), or the powder can comprise a plurality of acrylamide-based polymer(s), wherein the acrylamide-based polymer(s) have varying molecular structures (i.e., more than one acrylamide-based polymer(s)). The one or more acrylamide-based polymer(s) can be any suitable polymer. For example, the one or more acrylamide-based polymer(s) can be homopolymers, copolymers, terpolymers, or greater, or a combination thereof. In certain embodiments, the one or more acrylamide-based polymer(s) are terpolymers.

The acrylamide-based polymer(s) can be cationic, anionic, amphoteric, non-ionic, or zwitterionic. In some embodiments, the acrylamide-based polymer(s) are cationic. As used herein, "cationic" polymers refer to polymers containing cationic monomer units or a combination of cationic monomer units and non-ionic monomer units. In some embodiments, the acrylamide-based polymer(s) are anionic. As used herein, "anionic" polymers refer to polymers containing anionic monomer units or a combination of anionic monomer units and non-ionic monomer units. In some embodiments, the acrylamide-based polymer(s) are amphoteric. As used herein, "amphoteric" polymers refer to polymers containing cationic monomer units and anionic monomer units, or cationic monomer units, anionic monomer units, and non-ionic monomer units. In some embodiments, the acrylamide-based polymer(s) are non-ionic. As used herein, "non-ionic" polymers refer to polymers containing non-ionic monomer units. In some embodiments, the acrylamide-based polymer(s) are zwitterionic. As used herein, "zwitterionic" polymers refer to polymers containing zwitterionic monomer units or a combination of zwitterionic monomer units and cationic monomer units, anionic monomer units, and/or non-ionic monomer units.

The acrylamide-based polymer(s) can exist as any suitable structure type. For example, the acrylamide-based polymer(s) can exist as alternating polymers, random polymers, block polymers, graft polymers, linear polymers, branched polymers, cyclic polymers, or a combination thereof. The acrylamide-based polymer(s) can contain a single monomer unit, or any suitable number of different monomer units. For example, the acrylamide-based polymer(s) can contain 2 different monomer units, 3 different monomer units, 4 different monomer units, 5 different monomer units, or 6 different monomer units. The acrylamide-based polymer(s)' monomer units can exist in any suitable concentration and any suitable proportion.

In certain embodiments, the powder comprises one or more acrylamide-based polymer(s), wherein the acrylamide-based polymer(s) (i.e., absent of networking) have a weight average molecular weight of from about 10 kDa to about 5,000 kDa. The acrylamide-based polymer(s) can have a weight average molecular weight of about 5,000 kDa or less, for example, about 4,000 kDa or less, about 3,000 kDa or less, about 2,500 kDa or less, about 2,000 kDa or less, about 1,800 kDa or less, about 1,600 kDa or less, about 1,400 kDa or less, about 1,200 kDa or less, about 1,000 kDa or less, about 900 kDa, or less, about 800 kDa, or less, about 700 kDa or less, about 600 kDa or less, or about 500 kDa or less. Alternatively, or in addition, the acrylamide-based polymer(s) can have a weight average molecular weight of about 10 kDa or more, for example, about 50 kDa or more, about 100 kDa or more, about 200 kDa or more, about 300 kDa or more, or about 400 kDa or more. Thus, the acrylamide-based polymer(s) can have a weight average molecular weight bounded by any two of the aforementioned endpoints. For example, the acrylamide-based polymer(s) can have a weight average molecular weight of from about 10 kDa to about 500 kDa, from about 50 kDa to about 500 kDa, from about 100 kDa to about 500 kDa, from about 200 kDa to about 500 kDa, from about 300 kDa to about 500 kDa, from about 400 kDa to about 500 kDa, from about 400 kDa to about 600 kDa, from about 400 kDa to about 700 kDa, from about 400 kDa to about 800 kDa, from about 400 kDa to about 900 kDa, from about 400 kDa to about 1,000 kDa, from about 400 kDa to about 1,200 kDa, from about 400 kDa to about 1,400 kDa, from about 400 kDa to about 1,600 kDa, from about 400 kDa to about 1,800 kDa, from about 400 kDa to about 2,000 kDa, from about 10 kDa to about 2,000 kDa, from about 200 kDa to about 2,000 kDa, from about 500 kDa to about 2,000 kDa, from about 800 kDa to about 2,000 kDa, from about 200 kDa to about 2,500 kDa, from about 500 kDa to about 2,500 kDa, from about 800 kDa to about 2,500 kDa, from about 200 kDa to about 3,000 kDa, from about 500 kDa to about 3,000 kDa, from about 800 kDa to about 3,000 kDa, from about 200 kDa to about 4,000 kDa, from about 500 kDa to about 4,000 kDa, from about 800 kDa to about 4,000 kDa, from about 200 kDa to about 5,000 kDa, from about 500 kDa to about 5,000 kDa, or from about 800 kDa to about 5,000 kDa.

Weight average molecular weight can be determined by any suitable technique. While alternate techniques are envisioned, in some embodiments, the weight average molecular weight is determined using size exclusion chromatography (SEC) equipped with a set of TSKgel PW columns (TSKgel Guard+ GMPW+GMPW+G1000PW), Tosoh Bioscience LLC, Cincinnati, Ohio) and a Waters 2414 (Waters Corporation, Milford, Mass.) refractive index detector or a DAWN HELEOS II multi-angle light scattering (MALS) detector (Wyatt Technology, Santa Barbara, Calif.). Moreover, the weight average molecular weight is determined from either calibration with polyethylene oxide/polyethylene glycol standards ranging from 150-875,000 Daltons or directly using light scattering data with known refractive index increment ("dn/dc").

In certain embodiments, the weight average molecular weight is determined by hydrolysis of the acrylamide-based polymer to remove the hydrolysable side chains and then further analyzed with size exclusion chromatography (SEC). The acrylamide-based polymer can be hydrolyzed by any suitable technique. For example, the acrylamide-based polymer can be hydrolyzed by treatment with a 0.1 wt. % solution of NaOH at pH 12 with a cage stirrer at 400 rpm for one hour. As used herein, "hydrolysable side chains" refer to any side chain on an associative monomer unit or an additional monomer unit that can be cleaved through hydrolysis. Without wishing to be bound to any particular theory, the acrylamide-based polymer, comprising an associative monomer unit, may need to be hydrolyzed prior to size exclusion chromatography due to low recovery rate from the column. Generally, hydrolysis of the acrylamide-based polymer does not cleave the polymer backbone and preserves the degree of polymerization of the acrylamide-based polymer(s).

In certain embodiments, the associative monomer unit does not contain a hydrolysable side chain. In embodiments where the associative monomer unit does not contain a hydrolysable side chain, the weight average molecular weight can be determined by analyzing a surrogate of the acrylamide-based polymer. For example, the weight average molecular weight can be determined by synthesizing a polymer using the exact same formulation in the absence of the associative monomer unit. Without wishing to be bound to any particular theory, the polymer synthesized with the same formulation maintains a similar degree of polymerization and results in a weight average molecular weight similar to an acrylamide-based polymer wherein the associative monomer unit is present.

Illustrative embodiments of the acrylamide-based polymer(s) generally include one or more associative monomer unit(s) and one or more additional monomer unit(s). As used herein, "additional monomer unit" refers to any monomer unit other than the associative monomer unit. In certain embodiments, the one or more additional monomer units are derived from a water-soluble monomer (e.g., acrylamide, diallyldimethylammonium chloride ("DADMAC"), 2-(acryloyloxy)-N,N,N-trimethylethanaminium chloride ("DMAEA.MCQ"), etc.). As used herein, "derived" when referring to a monomer unit, means that the monomer unit has substantially the same structure of a monomer from which it was made, wherein the terminal olefin has been transformed during the process of polymerization. In some embodiments, the acrylamide-based polymer(s) include one or more associative monomer unit(s), a monomer unit derived from a monomer of Formula I, and one or more additional monomer unit(s). In certain embodiments, the acrylamide-based polymer(s) include an associative monomer unit, a monomer unit derived from a monomer of Formula I, and an additional monomer unit.

In some embodiments, the one or more associative monomer unit(s), and the one or more additional monomer unit(s) can be incorporated into the acrylamide-based polymer(s) using monomers, dimers, trimers, oligomers, adducts, or a combination thereof of the monomers structures from which they are derived. For example, the one or more associative monomer unit(s), or the one or more additional monomer unit(s) can exist as a dimer, trimer, oligomer, or adduct prior to incorporation into the acrylamide-based polymer(s).

The acrylamide-based polymer(s) can comprise any one or more suitable additional monomer unit(s) selected from a cationic monomer unit, an anionic monomer unit, a nonionic monomer unit, a zwitterionic monomer unit, and a combination of two or more thereof. For example, the acrylamide-based polymer(s) can comprise a cationic monomer unit and an anionic monomer unit, an anionic monomer unit and a nonionic monomer unit, a cationic monomer unit and a nonionic monomer unit, or a cationic monomer unit, an anionic monomer unit, and a nonionic monomer unit. In certain embodiments, the acrylamide-based polymer(s) comprise and/or further comprise a zwitterionic monomer unit. The acrylamide-based polymer(s) can be synthesized by any suitable polymerization method. For example, the acrylamide-based polymer(s) can be made through free radical polymerization, addition polymerization, free radical addition polymerization, cationic addition polymerization, anionic addition polymerization, emulsion polymerization, solution polymerization, suspension polymerization, precipitation polymerization, or a combination thereof. In certain embodiments, polymerization occurs through free radical polymerization.

Thus, a suitable additional monomer unit can be derived from any one or more suitable monomers capable of participating in free radical polymerization. For example, the acrylamide-based polymer(s) can comprise one or more additional monomer units derived from a monomer selected from a monomer of Formula I, 2-(dimethylamino)ethyl acrylate ("DMAEA"), 2-(dimethylamino)ethyl methacrylate ("DMAEM"), 3-(dimethylamino)propyl methacrylamide ("DMAPMA"), 3-(dimethylamino)propyl acrylamide ("DMAPA"), 3-methacrylamidopropyl-trimethyl-ammonium chloride ("MAPTAC"), 3-acrylamidopropyl-trimethyl-ammonium chloride ("APTAC"), N-vinyl pyrrolidone ("NVP"), N-vinyl acetamide, hydroxyethyl methacrylate, hydroxyethyl acrylate, diallyldimethylammonium chloride ("DADMAC"), diallylamine, vinylformamide, 2-(acryloyloxy)-N,N,N-trimethylethanaminium chloride ("DMAEA.MCQ"), 2-(methacryloyloxy)-N,N,N-trimethylethanaminium chloride ("DMAEM.MCQ"), N,N-dimethylaminoethyl acrylate benzyl chloride ("DMAEA.BCQ"), N,N-dimethylaminoethyl methacrylate benzyl chloride ("DMAEM.BCQ"), 2-acrylamido-2-methylpropane sulfonic acid ("AMPS"), 2-acrylamido-2-methylbutane sulfonic acid ("AMBS"), [2-methyl-2-[(1-oxo-2-propenyl)amino] propyl]-phosphonic acid, methacrylic acid, acrylic acid, salts thereof, and combinations thereof.

In some embodiments, the acrylamide-based polymer(s) comprise a monomer unit derived from a monomer of Formula I:

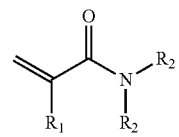

wherein $R_1$ is H or $C_1$-$C_4$ alkyl (e.g., methyl, ethyl, n-propyl, iso-propyl, n-butyl, sec-butyl, or tert-butyl) and each $R_2$ is independently H or an organic group. As used herein, the term "organic group" refers to an alkyl group, an aryl group, a fluoroalkyl group, or a fluoroaryl group. In certain embodiments, the monomer unit derived from a monomer of Formula I is considered an additional monomer unit.

In certain embodiments of the substituent $R_2$, the organic group is a $C_1$-$C_6$ alkyl group (i.e., 1, 2, 3, 4, 5, or 6 carbon units in length). In some embodiments, the $C_1$-$C_6$ alkyl group is saturated, unsaturated, branched, straight-chained, cyclic, or a combination thereof. An exemplary list of $C_1$-$C_6$ alkyl groups is methyl, ethyl, n-propyl, iso-propyl, n-butyl, sec-butyl, tert-butyl, n-pentyl, sec-pentyl, neo-pentyl, or hexyl. In certain embodiments, the $C_1$-$C_6$ alkyl group is substituted with one or more alkyl substituents, aryl substituents, heteroatoms, or combinations thereof (e.g., benzyl, phenylethyl, phenylpropyl, etc.). In some embodiments, the $C_1$-$C_6$ alkyl group can be a $C_1$-$C_6$ heteroalkyl group (i.e., 1, 2, 3, 4, 5, or 6 carbon units in length). As used herein, "heteroalkyl group" refers to a saturated or unsaturated, substituted or unsubstituted, straight-chained, branched, or cyclic aliphatic group that contains at least 1 heteroatom (e.g., O, S, N, and/or P) in the core of the molecule (i.e., the carbon backbone).

In certain embodiments of the substituent $R_2$, the organic group is an aryl group. The aryl group can be any substituted or unsubstituted aryl or heteroaryl group, wherein the heteroaryl group is an aromatic 5- or 6-membered monocyclic group that has at least one heteroatom (e.g., O, S, or N) in at least one of the rings. The heteroaryl group can contain one or two oxygen or sulfur atoms and/or from one to four nitrogen atoms, provided that the total number of heteroatoms in the ring is four or less and the ring has at least one carbon atom. Optionally, the nitrogen, oxygen, and sulfur atoms can be oxidized (i.e., has undergone a process of losing electrons), and the nitrogen atoms optionally can be quaternized. In some embodiments, the aryl compound is phenyl, pyrrolyl, furanyl, thiophenyl, pyridyl, isoxazolyl, oxazolyl, isothiazolyl, thiazolyl, imidazolyl, thiadiazolyl, tetrazolyl, triazolyl, oxadiazolyl, pyrazolyl, pyrazinyl, triazinyl, pyrimidinyl, or pyridazinyl.

In certain embodiments of the substituent $R_2$, the organic group is a $C_1$-$C_6$ fluoroalkyl group or a $C_1$-$C_6$ fluoroaryl group. As used herein, the terms "fluoroalkyl" and "fluoroaryl" refer to any alkyl group or aryl group, respectively, with one or more fluorine atoms.

In certain embodiments, the monomer of Formula I is acrylamide or methacrylamide.

The acrylamide-based polymer(s) can comprise the one or more additional monomer unit(s) in any suitable concentration, so long as the acrylamide-based polymer(s) include a suitable portion of one or more associative monomer unit(s) as provided herein. The acrylamide-based polymer(s) can comprise a sum total of about 90 mol % or more of the one or more additional monomer unit(s), for example, about 91 mol % or more, about 92 mol % or more, about 93 mol % or more, about 94 mol % or more, about 95 mol % or more, about 96 mol % or more, about 97 mol % or more, about 98 mol % or more, or about 99 mol % or more. Alternatively, or in addition to, the acrylamide-based polymer(s) can comprise a sum total of about 99.995 mol % or less of the one or more additional monomer unit(s), for example, about 99.99 mol % or less, about 99.9 mol % or less, about 99.75 mol % or less, about 99.5 mol % or less, about 99.4 mol % or less, about 99.3 mol % or less, about 99.2 mol % or less, or about 99.1 mol % or less. Thus, the acrylamide-based polymer(s) can comprise the one or more additional monomer unit(s) in a sum total concentration bounded by any two of the aforementioned endpoints. The acrylamide-based polymer(s) can comprise a sum total from about 90 mol % to about 99.995 mol % of the one or more additional monomer unit(s), for example, from about 91 mol % to about 99.995 mol %, from about 92 mol % to about 99.995 mol %, from about 93 mol % to about 99.995 mol %, from about 94 mol % to about 99.995 mol %, from about 95 mol % to about 99.995 mol %, from about 97 mol % to about 99.995 mol %, from about 98 mol % to about 99.995 mol %, from about 99 mol % to about 99.995 mol %, from about 99 mol % to about 99.99 mol %, from about 99 mol % to about 99.9 mol %, from about 99 mol % to about 99.75 mol %, from about 99 mol % to about 99.5 mol %, from about 99 mol % to about 99.4 mol %, from about 99 mol % to about 99.3 mol %, from about 99 mol % to about 99.2 mol %, from about 99 mol % to about 99.1 mol %, from about 99.5 mol % to about 99.99 mol %, from about 99.5 mol % to about 99.995 mol %, from about 99.75 mol % to about 99.99 mol %, or from about 99.75 mol % to about 99.995 mol %.

The acrylamide-based polymer(s) can comprise one or more associative monomer unit(s) of any suitable type(s). As described herein, "associative monomer unit" refers to any monomer unit capable of coordinating with itself, other associative monomer units, surfactants, or a combination thereof. The coordination can occur through any suitable interaction. For example, the coordination can occur through ionic bonding, hydrogen bonding, hydrophobic interactions, dipolar interactions, Van der Waals forces, or a combination of two or more such coordination types.

In some embodiments, the associative monomer unit is formed post polymerization by attaching an associative moiety to a polymer. As used herein, "associative moiety" refers to any pendant chemical structure capable of coordinating with itself, other associative monomer units, surfactants, or a combination thereof. The coordination can occur through any suitable interaction. For example, the coordination can occur through ionic bonding, hydrogen bonding, hydrophobic interactions, dipolar interactions, Van der Waals forces, or a combination of two or more such coordination types. In some embodiments, the associative moiety is attached directly to the terminal end of a polymer, attached through a linker to the terminal end of a polymer, attached directly to the polymer backbone, attached to the polymer backbone through a linker, or a combination thereof.

In certain embodiments, the one or more associative monomer unit(s) of the one or more acrylamide-based polymer(s) are structurally similar. As used herein, "structurally similar" means that the associative monomer unit(s) have similar chemical functional groups. In some embodiments, the associative monomer unit(s) each comprise at least one hydroxyl substituent. In some embodiments, the associative monomer unit(s) each comprise at least one amine substituent. In some embodiments, the associative monomer unit(s) each comprise a polyether chain. In some embodiments, the associative monomer unit(s) each comprise a polyether chain, wherein the length of the polyether chains are separated by six carbon units or less (i.e., 6, 5, 4, 3, 2, 1, or 0). For example, if an associative monomer unit has a polyether chain length of 16 carbon units, then a structurally similar associative monomer unit will have a polyether chain length from 10-22 carbon units (i.e., 10, 11, 12, 13, 14, 15, 16, 17, 18, 19, 20, 21, or 22). In certain embodiments, the polyether chains each comprise the same number of carbon units. In some embodiments, the associative monomer unit(s) each comprise an alkyl chain. In some embodiments, the associative monomer unit(s) each comprise alkyl chains, wherein the length of the alkyl chains are separated by six carbon units or less (i.e., 6, 5, 4, 3, 2, 1, or 0). For example, if an associative monomer unit has an alkyl chain length of 16 carbon units, then a structurally similar associative monomer unit will have an alkyl chain length from 10-22 carbon units (i.e., 10, 11, 12, 13, 14, 15, 16, 17, 18, 19, 20, 21, or 22). In certain embodiments, the alkyl chains each comprise the same number of carbon units. In certain embodiments, the associative monomer unit(s) are the same.

In certain embodiments, the one or more associative monomer unit(s) are incorporated into the polymer through polymerization with one or more associative monomer(s). Thus, the one or more associative monomer unit(s) can be derived from any one or more suitable associative monomer(s) selected from a nonionic associative monomer, a cationic associative monomer, an anionic associative monomer, a zwitterionic associative monomer, and a combination thereof. The one or more associative monomer(s) are capable of participating in polymerization. In certain embodiments, the one or more associative monomer(s) comprise an unsaturated subunit (e.g., acrylate, acrylamide, etc.), separate from the associative moiety, capable of participating in free radical polymerization. Generally, the one or more associative monomer(s) are selected from an acrylate, an acrylamide, or a combination thereof.

In an embodiment, the associative monomer unit is a nonionic associative monomer unit. Generally, the nonionic associative monomer unit is derived from an acrylate and/or an acrylamide monomer of Formula II:

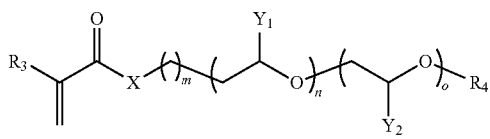

wherein $R_3$ is H or $C_1$-$C_{10}$ alkyl (e.g., $(CH_2)_kCH_3$), wherein k is an integer from 0 to 9 (i.e., 0, 1, 2, 3, 4, 5, 6, 7, 8, or 9), X is O or NH, m, n, and o are independently integers from 0 to 100, wherein when (n+o)≤3, m is at least 7, each $Y_1$ and $Y_2$ are independently H or $C_1$-$C_4$ alkyl (e.g., methyl, ethyl, n-propyl, iso-propyl, n-butyl, sec-butyl, or tert-butyl), and $R_4$ is H or a hydrophobic group. In some embodiments, "$C_1$-$C_{10}$ alkyl" refers to a branched $C_1$-$C_{10}$ alkyl group. In certain embodiments, each $Y_1$ and $Y_2$ is independently chosen to produce block or random copolymers of ethylene oxide ("EO"), propylene oxide ("PO"), or a combination thereof. In some embodiments, m, n, and o refer to an average (rounded to the nearest integer) chain length of the designated subunits (i.e., average carbon chain length or average EO/PO chain length). As used herein, the term "hydrophobic group" refers to an alkyl group, an aryl group, a fluoroalkyl group, or a fluoroaryl group.

In certain embodiments of the substituent $R_4$, the hydrophobic group is a $C_1$-$C_{32}$ alkyl group (i.e., 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, or 32 carbon units in length). In some embodiments, the $C_1$-$C_{32}$ alkyl group is saturated, unsaturated, branched, straight-chained, cyclic, or a combination thereof. An exemplary list of $C_1$-$C_{32}$ alkyl groups is methyl, ethyl, n-propyl, iso-propyl, n-butyl, sec-butyl, tert-butyl, n-pentyl, sec-pentyl, neo-pentyl, hexyl, heptyl, octyl, nonyl, lauryl, stearyl, cetyl, behenyl, cyclopentyl, cyclohexyl, propenyl, 2-butenyl, 3-butenyl, 2-pentenyl, 3-pentenyl, or 4-pentenyl. In certain embodiments, the $C_1$-$C_{32}$ alkyl carbon group is further substituted with one or more alkyl substituents, aryl substituents, heteroatoms, or combinations thereof. In some embodiments, the $C_1$-$C_{32}$ alkyl group can be a $C_1$-$C_{32}$ heteroalkyl group (i.e., 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, or 32 carbon units in length). As used herein, "heteroalkyl group" refers to a saturated or unsaturated, substituted or unsubstituted, straight-chained, branched, or cyclic aliphatic group that contains at least 1 heteroatom (e.g., O, S, N, and/or P) in the core of the molecule (i.e., the carbon backbone).

As used herein, the term "substituted" means that one or more hydrogens on the designated atom or group are replaced with another group provided that the designated atom's normal valence is not exceeded. For example, when the substituent is oxo (i.e., =O), then two hydrogens on the carbon atom are replaced. Combinations of substituents are permissible provided that the substitutions do not significantly adversely affect synthesis or use of the acrylamide-based polymer.

In certain embodiments of the substituent $R_4$, the hydrophobic group is an aryl group. The aryl group can be any substituted or unsubstituted aryl or heteroaryl group, wherein the heteroaryl group is an aromatic 5- or 6-membered monocyclic group, 9- or 10-membered bicyclic group, or an 11- to 14-membered tricyclic group, which has at least one heteroatom (e.g., O, S, or N) in at least one of the rings. Each ring of the heteroaryl group containing a heteroatom can contain one or two oxygen or sulfur atoms and/or from one to four nitrogen atoms, provided that the total number of heteroatoms in each ring is four or less and each ring has at least one carbon atom. The fused rings completing the bicyclic and tricyclic groups may contain only carbon atoms and may be saturated, partially saturated, or unsaturated. The nitrogen, oxygen, and sulfur atoms optionally can be oxidized, and the nitrogen atoms optionally can be quaternized. Heteroaryl groups that are bicyclic or tricyclic must include at least one fully aromatic ring, but the other fused ring or rings can be aromatic or non-aromatic. In some embodiments, the aryl group is phenyl, naphthyl, pyrrolyl, isoindolyl, indolizinyl, indolyl, furanyl, benzofuranyl, benzothiophenyl, thiophenyl, pyridyl, acridinyl, naphthyridinyl, quinolinyl, isoquinolinyl, isoxazolyl, oxazolyl, benzoxazolyl, isothiazolyl, thiazolyl, benzthiazolyl, imidazolyl, thiadiazolyl, tetrazolyl, triazolyl, oxadiazolyl, benzimidazolyl, purinyl, pyrazolyl, pyrazinyl, pteridinyl, quinoxalinyl, phthalazinyl, quinazolinyl, triazinyl, phenazinyl, cinnolinyl, pyrimidinyl, or pyridazinyl.

In certain embodiments of the substituent $R_4$, the hydrophobic group is a $C_1$-$C_{32}$ fluoroalkyl group or a $C_1$-$C_{32}$ fluoroaryl group. As used herein, the terms "fluoroalkyl" and "fluoroaryl" refer to any alkyl group or aryl group, respectively, with one or more fluorine atoms.

In certain embodiments, the nonionic associative monomer unit is derived from an acrylate monomer comprising an acrylate head group of Formula III:

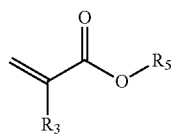

wherein $R_5$ is —$CH_2(CH_2)_pCH_3$, $R_3$ is H or $C_1$-$C_{10}$ alkyl (e.g., $(CH_2)_kCH_3$), wherein k is an integer from 0 to 9 (i.e., 0, 1, 2, 3, 4, 5, 6, 7, 8, or 9)), and p is an integer from 3 to 100 (e.g., from 4 to 50, from 6 to 50, from 8 to 50, from 10 to 50, from 12 to 50, from 16 to 50, or from 18 to 50. In some embodiments, the acrylate monomer of Formula III is a mixture of two or more such acrylates, such that the average (rounded to the nearest integer) value of p is an integer from 3 to 100 (e.g., from 4 to 50, from 6 to 50, from 8 to 50, from 10 to 50, from 12 to 50, from 16 to 50, or from 18 to 50). In some embodiments, "$C_1$-$C_{10}$ alkyl" refers to a branched $C_1$-$C_{10}$ alkyl group. In certain embodiments, $R_5$ is a branched alkyl group from 3 to 100 carbon units in length. Generally, the nonionic associative monomer is selected from laurylacrylate, cetylacrylate, stearylacrylate, behenylacrylate, or a combination thereof. In certain embodiments, the nonionic associative monomer unit is laurylacrylate, i.e., $R_3$=H and p=10.

In certain embodiments, the nonionic associative monomer unit is derived from an acrylate monomer comprising an acrylate head group of Formula IV:

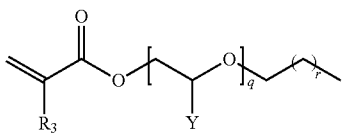

wherein $R_3$ is H or $C_1$-$C_{10}$ alkyl (e.g., $(CH_2)_kCH_3$), wherein k is an integer from 0 to 9 (i.e., 0, 1, 2, 3, 4, 5, 6, 7, 8, or 9), q is an integer from 2 to 100 (e.g., from 4 to 50, from 6 to 50, from 8 to 50, from 10 to 50, from 12 to 50, from 16 to 50, from 18 to 50, from 16 to 100, from 18 to 100, or from 50 to 100), r is an integer from 0 to 30 (e.g., from 2 to 30, from 4 to 30, from 6 to 30, from 8 to 30, from 10 to 30, from 12 to 30, from 16 to 30, from 18 to 30, from 20 to 30, from 22 to 30, or from 24 to 30), and each Y is independently H or $CH_3$. In some embodiments, "$C_1$-$C_{10}$ alkyl" refers to a branched $C_1$-$C_{10}$ alkyl group. In certain embodiments, each Y is independently selected to produce block or random copolymers of ethylene oxide ("EO"), propylene oxide ("PO"), or a combination thereof. In some embodiments, the acrylate monomer of Formula IV is a mixture of two or more such acrylates, such that the average (rounded to the nearest integer) value of q is an integer from 2 to 100, (e.g., from 4 to 50, from 6 to 50, from 8 to 50, from 10 to 50, from 12 to 50, from 16 to 50, from 18 to 50, from 16 to 100, from 18 to 100, or from 50 to 100), and the average (rounded to the nearest integer) value of r is an integer from 0 to 30 (e.g., from 2 to 30, from 4 to 30, from 6 to 30, from 8 to 30, from 10 to 30, from 12 to 30, from 16 to 30, from 18 to 30, from 20 to 30, from 22 to 30, or from 24 to 30). In some embodiments, the acrylate monomer of Formula IV is lauryl polyethoxy (25) methacrylate, cetyl polyethoxy (25) methacrylate, stearyl polyethoxy (25) methacrylate, behenyl polyethoxy (25) methacrylate, or a combination thereof. In certain embodiments, the nonionic associative monomer unit is a VISIOMER® ether methacrylate commercially available from Evonik Industries (Essen, Germany). In some embodiments, the nonionic associative monomer unit is cetyl and/or stearyl polyethoxy (25) methacrylic ester, marketed under the product name methacrylic ester (25 EO) C16-C18 fatty alcohol ("C18PEG1105MA"), commercially available from Evonik Industries (Essen, Germany).

In certain embodiments, the nonionic associative monomer unit is derived from an acrylate monomer comprising an acrylate head group of Formula V:

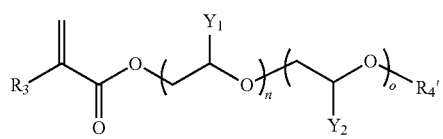

wherein $R_3$ is H or $C_1$-$C_{10}$ alkyl (e.g., $(CH_2)_kCH_3$), wherein k is an integer from 0 to 9 (i.e., 0, 1, 2, 3, 4, 5, 6, 7, 8, or 9), each $Y_1$ and $Y_2$ are independently H or $C_1$-$C_4$ alkyl (e.g., methyl, ethyl, n-propyl, iso-propyl, n-butyl, sec-butyl, or tert-butyl), and n and o are independently integers ranging from 0 to about 100 (e.g., from about 0 to about 90, from about 0 to about 80, from about 0 to about 70, from about 0 to about 60, from about 0 to about 50, from about 10 to about 100, or from about 10 to about 50), $R_4'$ is $C_8$-$C_{30}$ alkyl group (i.e., 8, 9, 10, 11, 12, 13, 14, 15, 16, 17, 18, 19, 20, 21, 22, 23, 24, 25, 26, 27, 28, 29, or 30 carbon units in length), wherein n and o cannot both be 0. In some embodiments, "$C_1$-$C_{10}$ alkyl" refers to a branched $C_1$-$C_{10}$ alkyl group. In certain embodiments, each $Y_1$ and $Y_2$ are independently selected to produce block or random copolymers of ethylene oxide ("EO"), propylene oxide ("PO"), or a combination thereof. In some embodiments, the acrylate monomer of Formula V is a mixture of two or more such acrylates, such that the average (rounded to the nearest integer) values of n and o are independently integers from 0 to 100, (e.g., from 0 to 50, from 6 to 50, from 8 to 50, from 10 to 50, from 12 to 50, from 16 to 50, from 18 to 50, from 16 to 100, from 18 to 100, or from 50 to 100). In certain embodiments, the acrylate monomer of Formula V contains a side chain derived from a Plurafac® surfactant, commercially available from BASF Corporation (Florham Park, N.J.).

In another embodiment, the associative monomer unit is a cationic associative monomer unit. Generally, the cationic associative monomer unit is derived from an acrylate salt monomer and/or an acrylamide salt monomer of Formula VI:

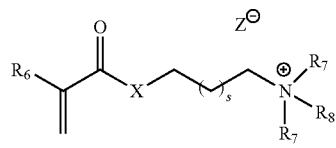

wherein $R_6$ and $R_7$ are each independently H or $C_1$-$C_{10}$ alkyl (e.g., $(CH_2)_tCH_3$) wherein t is an integer from 0 to 9 (i.e., 0, 1, 2, 3, 4, 5, 6, 7, 8, or 9), X is O or NH, s is an integer from 0 to 20 (e.g., from 2 to 20, from 4 to 20, from 6 to 20, from 8 to 20, from 5 to 10, from 10 to 20, from 5 to 15, from 12 to 20, from 0 to 10, from 0 to 8, from 0 to 6, or from 0 to 4), Z is any anion, and $R_8$ is a hydrophobic group. In some embodiments, the acrylate and/or acrylamide salt of Formula VI is a mixture of two or more such acrylates and/or acrylamides, such that the average (rounded to the nearest integer) value of s is an integer from 0 to 20 (e.g., from 2 to 20, from 4 to 20, from 6 to 20, from 8 to 20, from 5 to 10, from 10 to 20, from 5 to 15, from 12 to 20, from 0 to 10, from 0 to 8, from 0 to 6, or from 0 to 4). In some embodiments, "$C_1$-$C_{10}$ alkyl" refers to a branched $C_1$-$C_{10}$ alkyl group. As used herein, the term "hydrophobic group" refers to an alkyl group, an aryl group, a fluoroalkyl group, or a fluoroaryl group.

In certain embodiments of the substituent $R_8$, the hydrophobic group is a $C_1$-$C_{32}$ alkyl group (i.e., 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, or 32 carbon units in length). In some embodiments, the $C_1$-$C_{32}$ alkyl group is saturated, unsaturated, branched, straight-chained, cyclic, or a combination thereof. An exemplary list of $C_1$-$C_{32}$ alkyl groups is methyl, ethyl, n-propyl, iso-propyl, n-butyl, sec-butyl, tert-butyl, n-pentyl, sec-pentyl, neo-pentyl, hexyl, heptyl, octyl, nonyl, lauryl, stearyl, cetyl, behenyl, cyclopentyl, cyclohexyl, propenyl, 2-butenyl, 3-butenyl, 2-pentenyl, 3-pentenyl, or 4-pentenyl. In certain embodiments, the $C_1$-$C_{32}$ alkyl group is further substituted with one or more alkyl substituents, aryl substituents, heteroatoms, or combinations thereof. In some embodiments, the $C_1$-$C_{32}$ alkyl group can be a $C_1$-$C_{32}$ heteroalkyl group (i.e., 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, or 32 carbon units in length). As used herein, "heteroalkyl group" refers to a saturated or unsaturated, substituted or unsubstituted, straight-chained, branched, or cyclic aliphatic chain that contains at least 1 heteroatom (e.g., O, S, N, and/or P) in the core of the molecule (i.e., the carbon backbone).

In certain embodiments of the substituent $R_8$, the hydrophobic group is an aryl group. The aryl group can be any substituted or unsubstituted aryl or heteroaryl group, wherein the heteroaryl group is an aromatic 5- or 6-membered monocyclic group, 9- or 10-membered bicyclic group, and 11- to 14-membered tricyclic group, which has at least one heteroatom (e.g., O, S, or N) in at least one of the rings. Each ring of the heteroaryl group containing a heteroatom can contain one or two oxygen or sulfur atoms and/or from one to four nitrogen atoms, provided that the total number of heteroatoms in each ring is four or less and each ring has at least one carbon atom. The fused rings completing the bicyclic and tricyclic groups may contain only carbon atoms and may be saturated, partially saturated, or unsaturated. The nitrogen, oxygen, and sulfur atoms optionally can be oxidized, and the nitrogen atoms optionally can be quaternized. Heteroaryl groups that are bicyclic or tricyclic must include at least one fully aromatic ring, but the other fused ring or rings can be aromatic or non-aromatic. In some embodiments, the aryl compound is phenyl, naphthyl, pyrrolyl, isoindolyl, indolizinyl, indolyl, furanyl, benzofuranyl, benzothiophenyl, thiophenyl, pyridyl, acridinyl, naphthyridinyl, quinolinyl, isoquinolinyl, isoxazolyl, oxazolyl, benzoxazolyl, isothiazolyl, thiazolyl, benzthiazolyl, imidazolyl, thiadiazolyl, tetrazolyl, triazolyl, oxadiazolyl, benzimidazolyl, purinyl, pyrazolyl, pyrazinyl, pteridinyl, quinoxalinyl, phthalazinyl, quinazolinyl, triazinyl, phenazinyl, cinnolinyl, pyrimidinyl, or pyridazinyl.

In certain embodiments of the substituent $R_8$, the hydrophobic group is a $C_1$-$C_{32}$ fluoroalkyl group or a $C_1$-$C_{32}$ fluoroaryl group. As used herein, the terms "fluoroalkyl" and "fluoroaryl" refer to any alkyl group or aryl group, respectively, with one or more fluorine atoms.

The ammonium salt of Formula VI can have any suitable anion counter ion (i.e., "Z"). In some embodiments, the anion counter ion ("Z") comprises an element selected from a halogen (e.g., fluoride, chloride, bromide, or iodide), sulfur, carbon, nitrogen, phosphorous, and a combination thereof. An exemplary list of anions comprises fluoride, chloride, bromide, iodide, sulfide, sulfite, sulfate, sulfonated, bisulfate, bisulfite, thiosulfate, carbonate, bicarbonate, nitrate, nitrite, phosphate, hydrogen phosphate, dihydrogen phosphate, phosphite, hydrogen phosphite, dihydrogen phosphite, hexafluorophosphate, carboxylate, acetate, mesylate, tosylate, or triflate. In certain embodiments, Z is selected from fluoride, chloride, bromide, mesylate, tosylate, or a combination thereof.

In certain embodiments, the cationic associative monomer unit is derived from an acrylamide salt monomer of Formula VII:

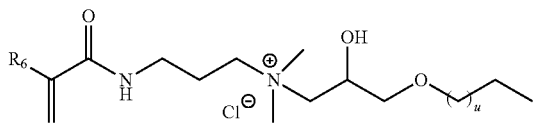

wherein $R_6$ is H or $C_1$-$C_{10}$ alkyl (e.g., $(CH_2)_tCH_3$) wherein t is an integer from 0 to 9 (i.e., 0, 1, 2, 3, 4, 5, 6, 7, 8, or 9), and u is an integer from 0 to 30 (e.g., from 2 to 30, from 4 to 30, from 6 to 30, from 8 to 30, from 5 to 25, from 10 to 30, from 12 to 30, from 15 to 25, from 16 to 30, from 18 to 30, from 20 to 30, from 22 to 30, or from 24 to 30). In some embodiments, "$C_1$-$C_{10}$ alkyl" refers to a branched $C_1$-$C_{10}$ alkyl group. In some embodiments, the acrylamide salt of Formula VII is a mixture of two or more such acrylamides, such that the average (rounded to the nearest integer) value of u is an integer from 0 to 30 (e.g., from 2 to 30, from 4 to 30, from 6 to 30, from 8 to 30, from 5 to 25, from 10 to 30, from 12 to 30, from 15 to 25, from 16 to 30, from 18 to 30, from 20 to 30, from 22 to 30, or from 24 to 30). In certain embodiments, the acrylamide salt of Formula VII is "MAP-TAC-C12 derivative" (i.e., where $R_6$ is $CH_3$ and u is 10).

In another embodiment, the associative monomer unit is an anionic associative monomer unit. Generally, the anionic associative monomer unit is derived from an acrylate and/or an acrylamide monomer of Formula VIII:

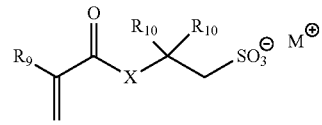

wherein $R_9$ is H or $C_1$-$C_{10}$ alkyl (e.g., $(CH_2)_vCH_3$) wherein v is an integer from 0 to 9 (i.e., 0, 1, 2, 3, 4, 5, 6, 7, 8, or 9), X is O or NH, M is any cation, and each $R_{10}$ is independently H or a hydrophobic group. In some embodiments, "$C_1$-$C_{10}$ alkyl" refers to a branched $C_1$-$C_{10}$ alkyl group. As used herein, the term "hydrophobic group" refers to an alkyl group, an aryl group, a fluoroalkyl group, or a fluoroaryl group.

In certain embodiments of the substituent $R_{10}$, the hydrophobic group is a $C_1$-$C_{32}$ alkyl group (i.e., 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, or 32 carbon units in length). In some embodiments, the $C_1$-$C_{32}$ alkyl group is saturated, unsaturated, branched, straight-chained, cyclic, or a combination thereof. An exemplary list of $C_1$-$C_{32}$ alkyl groups is methyl, ethyl, n-propyl, iso-propyl, n-butyl, sec-butyl, tert-butyl, n-pentyl, sec-pentyl, neo-pentyl, hexyl, heptyl, octyl, nonyl, lauryl, stearyl, cetyl, behenyl, cyclopentyl, cyclohexyl, propenyl, 2-butenyl, 3-butenyl, 2-pentenyl, 3-pentenyl, or 4-pentenyl. In certain embodiments, the $C_1$-$C_{32}$ alkyl group is further substituted with one or more alkyl substituents, aryl substituents, heteroatoms, or combinations thereof. In some embodiments, the $C_1$-$C_{32}$ alkyl group can be a $C_1$-$C_{32}$ heteroalkyl group (i.e., 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, or 32 carbon units in length). As used herein, "heteroalkyl group" refers to a saturated or unsaturated, substituted or unsubstituted, straight-chained, branched, or cyclic aliphatic group that contains at least 1 heteroatom (e.g., O, S, N, and/or P) in the core of the molecule (i.e., the carbon backbone).

In certain embodiments of the substituent $R_{10}$, the hydrophobic group is an aryl group. The aryl group can be any substituted or unsubstituted aryl or heteroaryl group, wherein the heteroaryl group is an aromatic 5- or 6-membered monocyclic group, 9- or 10-membered bicyclic group, and 11- to 14-membered tricyclic group, which has at least one heteroatom (e.g., O, S, or N) in at least one of the rings.

Each ring of the heteroaryl group containing a heteroatom can contain one or two oxygen or sulfur atoms and/or from one to four nitrogen atoms, provided that the total number of heteroatoms in each ring is four or less and each ring has at least one carbon atom. The fused rings completing the bicyclic and tricyclic groups may contain only carbon atoms and may be saturated, partially saturated, or unsaturated. The nitrogen, oxygen, and sulfur atoms optionally can be oxidized, and the nitrogen atoms optionally can be quaternized. Heteroaryl groups that are bicyclic or tricyclic must include at least one fully aromatic ring, but the other fused ring or rings can be aromatic or non-aromatic. In some embodiments, the aryl compound is phenyl, naphthyl, pyrrolyl, isoindolyl, indolizinyl, indolyl, furanyl, benzofuranyl, benzothiophenyl, thiophenyl, pyridyl, acridinyl, naphthyridinyl, quinolinyl, isoquinolinyl, isoxazolyl, oxazolyl, benzoxazolyl, isothiazolyl, thiazolyl, benzthiazolyl, imidazolyl, thiadiazolyl, tetrazolyl, triazolyl, oxadiazolyl, benzimidazolyl, purinyl, pyrazolyl, pyrazinyl, pteridinyl, quinoxalinyl, phthalazinyl, quinazolinyl, triazinyl, phenazinyl, cinnolinyl, pyrimidinyl, or pyridazinyl.

In certain embodiments of the substituent $R_{10}$, the hydrophobic group is a $C_1$-$C_{32}$ fluoroalkyl group or a $C_1$-$C_{32}$ fluoroaryl group. As used herein, the terms "fluoroalkyl" and "fluoroaryl" refer to any alkyl group or aryl group, respectively, with one or more fluorine atoms.

The sulfonate salt can have any suitable cation counter ion (i.e., "M"). For example, the cation counter ion ("M") can be a proton, ammonium, a quaternary amine, a cation of an alkali metal, a cation of an alkaline earth metal, a cation of a transition metal, a cation of a rare-earth metal, a main group element cation, or a combination thereof. In some embodiments, the cation counter ion is a proton or a cation of lithium, sodium, potassium, magnesium, calcium, manganese, iron, zinc, or a combination thereof. In certain embodiments, M is selected from hydrogen, lithium, sodium, potassium, or a combination thereof.

The one or more associative monomer unit(s) can be present in the acrylamide-based polymer in any suitable amount. The acrylamide-based polymer can comprise a sum total of about 10 mol % or less of the one or more associative monomer unit(s), for example, about 9 mol % or less, about 8 mol % or less, about 7 mol % or less, about 6 mol % or less, about 5 mol % or less, about 4 mol % or less, about 3 mol % or less, about 2 mol % or less, or about 1 mol % or less. Alternatively, or in addition to, the acrylamide-based polymer can comprise about 0.005 mol % or more of the one or more associative monomer unit(s), for example, about 0.01 mol % or more, about 0.1 mol % or more, about 0.25 mol % or more, about 0.3 mol % or more, about 0.4 mol % or more, or about 0.5 mol % or more. Thus, the acrylamide-based polymer can comprise the one or more associative monomer unit(s) in a concentration bounded by any two of the aforementioned endpoints. The acrylamide-based polymer can comprise from about 0.005 mol % to about 10 mol % of the one or more associative monomer unit(s), for example, from about 0.005 mol % to about 9 mol %, from about 0.005 mol % to about 8 mol %, from about 0.005 mol % to about 7 mol %, from about 0.005 mol % to about 6 mol %, from about 0.005 mol % to about 5 mol %, from about 0.005 mol % to about 4 mol %, from about 0.005 mol % to about 3 mol %, from about 0.005 mol % to about 2 mol %, from about 0.005 mol % to about 1 mol %, from about 0.01 mol % to about 1 mol %, from about 0.1 mol % to about 1 mol %, from about 0.25 mol % to about 1 mol %, from about 0.3 mol % to about 1 mol %, from about 0.4 mol % to about 1 mol %, from about 0.5 mol % to about 1.0 mol %, from about 0.01 mol % to about 0.5 mol %, or from about 0.01 mol % to about 0.25 mol %.

In some embodiments, the acrylamide-based polymer comprises an associative monomer unit derived from a monomer of Formula II, a monomer unit derived from a monomer of Formula I, and an additional cationic monomer unit. In some embodiments, the acrylamide-based polymer(s) comprises an associative monomer unit derived from a monomer of Formula II, a monomer unit derived from a monomer of Formula I, and an additional monomer unit derived from DMAEA.MCQ. In some embodiments, the acrylamide-based polymer comprises an associative monomer unit derived from a monomer of Formula II, an additional monomer unit derived from acrylamide, and an additional monomer unit derived from DMAEA.MCQ. In certain embodiments, the acrylamide-based polymer comprises an associative monomer unit derived from VISIOMER® monomer C18PEG1105MA, an additional monomer unit derived from acrylamide, and an additional monomer unit derived from DMAEA.MCQ.

In some embodiments, the acrylamide-based polymer comprises an associative monomer unit derived from a monomer of Formula II, a monomer unit derived from a monomer of Formula I, and an additional anionic monomer unit. In some embodiments, the acrylamide-based polymer comprises an associative monomer unit derived from a monomer of Formula II, a monomer unit derived from a monomer of Formula I, and an additional monomer unit derived from sodium acrylate. In some embodiments, the acrylamide-based polymer comprises an associative monomer unit derived from a monomer of Formula II, an additional monomer unit derived from acrylamide, and an additional monomer unit derived from sodium acrylate. In certain embodiments, the acrylamide-based polymer comprises an associative monomer unit derived from VISIOMER® monomer C18PEG1105MA, an additional monomer unit derived from acrylamide, and an additional monomer unit derived from sodium acrylate.

In some embodiments, the acrylamide-based polymer comprises an associative monomer unit derived from a monomer of Formula VI, a monomer unit derived from a monomer of Formula I, and an additional cationic monomer unit. In some embodiments, the acrylamide-based polymer comprises an associative monomer unit derived from a monomer of Formula VI, a monomer unit derived from a monomer of Formula I, and an additional monomer unit derived from DMAEA.MCQ. In some embodiments, the acrylamide-based polymer comprises an associative monomer unit derived from a monomer of Formula VI, an additional monomer unit derived from acrylamide, and an additional monomer unit derived from DMAEA.MCQ. In certain embodiments, the acrylamide-based polymer comprises an associative monomer unit derived from MAPTAC-C12 derivative of Formula VII, an additional monomer unit derived from acrylamide, and an additional monomer unit derived from DMAEA.MCQ.

In some embodiments, the acrylamide-based polymer comprises an associative monomer unit derived from a monomer of Formula VI, a monomer unit derived from a monomer of Formula I, and an additional anionic monomer unit. In some embodiments, the acrylamide-based polymer comprises an associative monomer unit derived from a monomer of Formula VI, a monomer unit derived from a monomer of Formula I, and an additional monomer unit derived from sodium acrylate. In some embodiments, the acrylamide-based polymer comprises an associative monomer unit derived from a monomer of Formula VI, an additional monomer unit derived from acrylamide, and an additional monomer unit derived from sodium acrylate. In certain embodiments, the acrylamide-based polymer comprises an associative monomer unit derived from MAPTAC-C12 derivative of Formula VII, an additional monomer unit derived from acrylamide, and an additional monomer unit derived from sodium acrylate.

In some embodiments, the acrylamide-based polymer comprises an associative monomer unit derived from a monomer of Formula VIII, a monomer unit derived from a monomer of Formula I, and an additional cationic monomer unit. In some embodiments, the acrylamide-based polymer comprises an associative monomer unit derived from a monomer of Formula VIII, a monomer unit derived from a monomer of Formula I, and an additional monomer unit derived from DMAEA.MCQ.

In some embodiments, the acrylamide-based polymer comprises an associative monomer unit derived from a monomer of Formula VIII, a monomer unit derived from a monomer of Formula I, and an additional anionic monomer unit. In some embodiments, the acrylamide-based polymer comprises an associative monomer unit derived from a monomer of Formula VIII, a monomer unit derived from a monomer of Formula I, and an additional monomer unit derived from sodium acrylate.

In some embodiments, the acrylamide-based polymer is of Formula $AP_1$:

$$AP_1$$

wherein E is one or more associative monomer unit(s), F is one or more additional monomer unit(s), G is one or more monomer unit(s) derived from a monomer of Formula I, H is optionally present and is one or more piperidine-2,6-dione unit(s), wherein the one or more piperidine-2,6-dione(s) are formed upon cyclization of an acrylamide nitrogen of the monomer unit derived from the monomer of Formula I ("G") on a carbonyl of the additional monomer unit ("F"), wherein the acrylamide-based polymer has a weight average molecular weight of from about 10 kDa to about 2,000 kDa.

In some embodiments, the acrylamide-based polymer is of formula $AP_2$:

$$AP_2$$

wherein E is one or more associative monomer unit(s), E' is a mole percentage value of from about 0.005 to about 10, F is one or more additional monomer unit(s), F' is a mole percentage value of from about 0.005 to about 90, G is one or more monomer unit(s) derived from a monomer of Formula I, and G' is a mole percentage value of from about 10 to about 99.99. Monomer unit E is defined by the associative monomer units described herein. Monomer units F and G are defined by the additional monomer units and monomer units derived from the monomer of Formula I, respectively, described herein.

As described herein, the acrylamide-based polymer of formula $AP_2$ can exist as an alternating polymer, random polymer, block polymer, graft polymer, linear polymer, branched polymer, cyclic polymer, or a combination thereof. Thus, E, F, and G can exist in any suitable order (e.g., EGF, EFG, GEF, GFE, FEG, or FGE), including repeating individual units (e.g., EEFFFGG, EFGGEFEE, EFGEEE, EEEEFG, etc.).

The amount of one or more associative monomer unit(s) ("E'"), and the sum total of one or more additional monomer unit(s) ("F'"+"G'") are as described previously for the one or more associative monomer unit(s) and the sum total of one or more additional monomer unit(s).

In some embodiments, the acrylamide-based polymer of formula $AP_2$ undergoes charge degradation to provide an acrylamide-based polymer of formula $AP_3$:

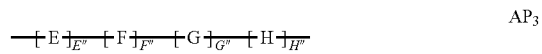

$$AP_3$$

wherein E is one or more associative monomer unit(s), E" is a mole percentage value of from about 0.005 to about 10, F is one or more additional monomer unit(s), F" is a mole percentage value of from about 0.005 to about 90, G is one or more monomer unit(s) derived from a monomer of Formula I, G" is a mole percentage value of from about 10 to about 99.99, H is one or more piperidine-2,6-dione unit(s), wherein the one or more piperidine-2,6-dione(s) are formed upon cyclization of an acrylamide nitrogen of the monomer unit derived from a monomer of Formula I ("G") on a carbonyl of the additional monomer unit ("F"), and H" is a mole percentage value of from about 0 (i.e., trace amounts) to about 10. As used herein, "charge degradation" refers to the process of a monomer unit derived from a monomer of Formula I cyclizing on a charged additional monomer unit (i.e., a cationic and/or anionic monomer unit), such that the charged substituent of the additional monomer unit is displaced, and thus, the polymer has less cationic monomer units and/or less anionic monomer units. Without wishing to be bound by any particular theory, it is believed that the charge degradation can occur spontaneously, or can be facilitated by one or more components in the polymer solution.

In certain embodiments, the acrylamide-based polymer(s) is of formula $AP_3$:

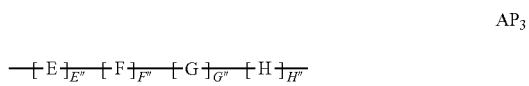

$$AP_3$$

wherein E is one or more associative monomer unit(s), E" is a mole percentage value of from about 0.005 to about 10, F is one or more additional monomer unit(s), F" is a mole percentage value of from about 0.005 to about 90, G is one or more monomer unit(s) derived from a monomer of Formula I, G" is a mole percentage value of from about 10 to about 99.99, H is one or more units of the formula

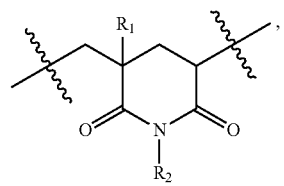

wherein $R_1$ is H or $C_1$-$C_4$ alkyl (e.g., methyl, ethyl, n-propyl, iso-propyl, n-butyl, sec-butyl, or tert-butyl) and $R_2$ is H or an organic group, and H" is a mole percentage value of from about 0 (i.e., trace amounts) to about 10. In certain embodiments, $R_1$ and $R_2$ are hydrogen.

As described herein, the acrylamide-based polymer of formula $AP_3$ can exist as an alternating polymer, random polymer, block polymer, graft polymer, linear polymer, branched polymer, cyclic polymer, or a combination thereof. Thus, E, F, G, and H can exist in any suitable order (e.g., EGFH, EGHF, EHFG, EHGF, EFGH, EFHG, FEGH, FEHG, FHEG, FHGE, FGEH, FGHE, GHFE, GHEF, GEFH, GEHF, GFHE, GFEH, HEFG, HEGF, HGEF, HGFE, HFEG, or HFGE), including repeating individual units (e.g., EEFFFGGHHH, EFGGEFEEH, EFGEEEHH, HHHEEEEFG, etc.).

In certain embodiments, the acrylamide-based polymer is of formula $AP_4$:

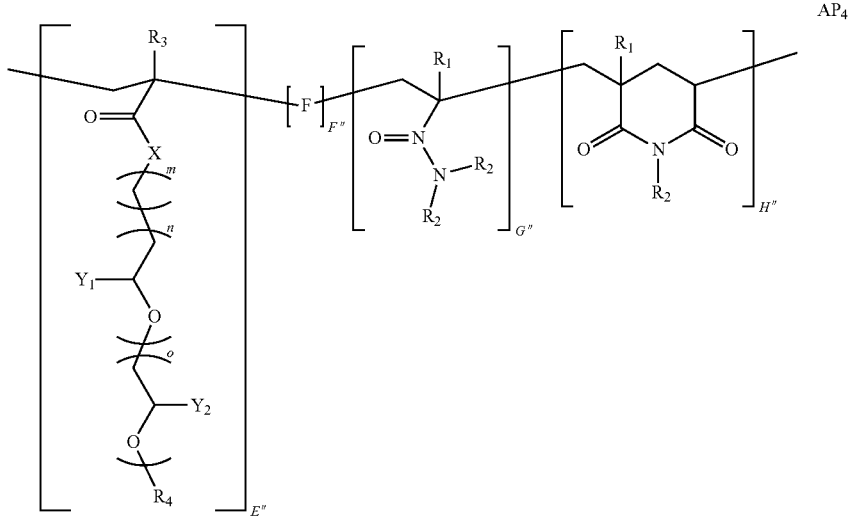

wherein each $R_1$ is independently H or $C_1$-$C_4$ alkyl (e.g., methyl, ethyl, n-propyl, iso-propyl, n-butyl, sec-butyl, or tert-butyl), each $R_2$ is independently H or an organic group, $R_3$ is H or $C_1$-$C_{10}$ alkyl (e.g., $(CH_2)_kCH_3$), wherein k is an integer from 0 to 9 (i.e., 0, 1, 2, 3, 4, 5, 6, 7, 8, or 9), X is O or NH, m, n, and o are independently integers from 0 to 100, wherein when (n+o)≤3, m is at least 7, each $Y_1$ and $Y_2$ are independently H or $C_1$-$C_4$ alkyl (e.g., methyl, ethyl, n-propyl, iso-propyl, n-butyl, sec-butyl, or tert-butyl), and $R_4$ is H or a hydrophobic group, E" is a mole percentage value of from about 0.005 to about 10, F is one or more additional monomer unit(s), F" is a mole percentage value of from about 0.005 to about 90, G" is a mole percentage value of from about 10 to about 99.99, and H" is a mole percentage value of from about 0 (i.e., trace amounts) to about 10. In some embodiments, "$C_1$-$C_{10}$ alkyl" refers to a branched $C_1$-$C_{10}$ alkyl group.

In certain embodiments of the acrylamide-based polymer of formula $AP_4$, F is derived from a diallyldimethylammonium chloride ("DADMAC") monomer. In certain embodiments of the acrylamide-based polymer of formula $AP_4$, F is derived from a 2-(acryloyloxy)-N,N,N-trimethylethanaminium chloride ("DMAEA.MCQ") monomer.

In certain embodiments, the acrylamide-based polymer is of formula $AP_5$:

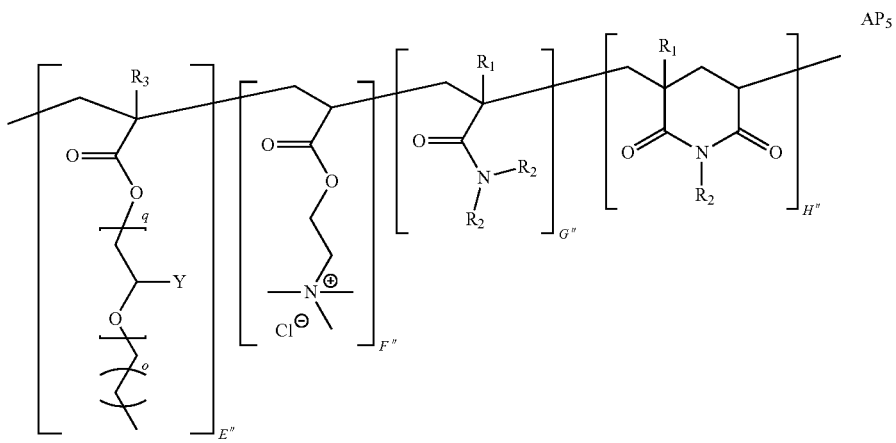

wherein each $R_1$ is independently H or $C_1$-$C_4$ alkyl (e.g., methyl, ethyl, n-propyl, iso-propyl, n-butyl, sec-butyl, or tert-butyl), each $R_2$ is independently H or an organic group, $R_3$ is H or $C_1$-$C_{10}$ alkyl (e.g., $(CH_2)_kCH_3$), wherein k is an integer from 0 to 9, q is an integer from 2 to 100, r is an integer from 0 to 30, each Y is independently H or $CH_3$, E" is a mole percentage value of from about 0.005 to about 10, F" is a mole percentage value of from about 0.005 to about 90, G" is a mole percentage value of from about 10 to about 99.99, and H" is a mole percentage value of from about 0

(i.e., trace amounts) to about 10. In some embodiments, "$C_1$-$C_{10}$ alkyl" refers to a branched $C_1$-$C_{10}$ alkyl group.

In certain embodiments, the acrylamide-based polymer is of formula $AP_6$:

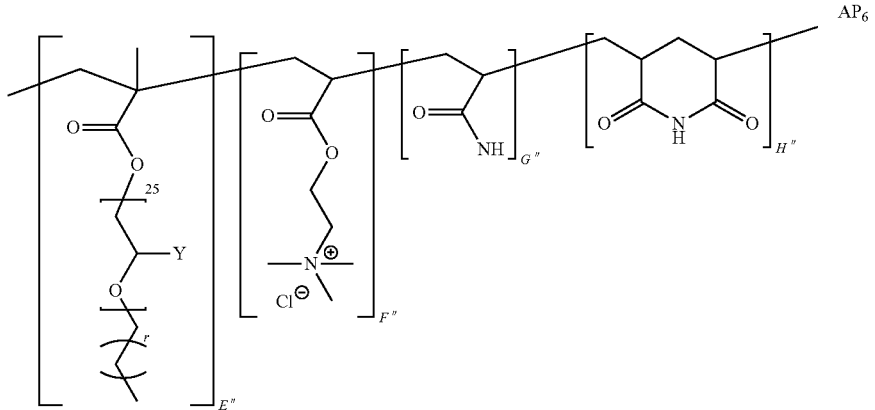

wherein r is an integer from 0 to 30 (e.g., from 2 to 30, from 4 to 30, from 6 to 30, from 8 to 30, from 10 to 30, from 12 to 30, from 16 to 30, from 18 to 30, from 20 to 30, from 22 to 30, or from 24 to 30), each Y is independently H or $CH_3$, E" is a mole percentage value of from about 0.005 to about 10, F" is a mole percentage value of from about 0.005 to about 90, G" is a mole percentage value of from about 10 to about 99.99, and H" is a mole percentage value of from about 0 (i.e., trace amounts) to about 10. In certain embodiments, r is an integer from 14 to 16.

In certain embodiments, the acrylamide-based polymer is of formula $AP_7$:

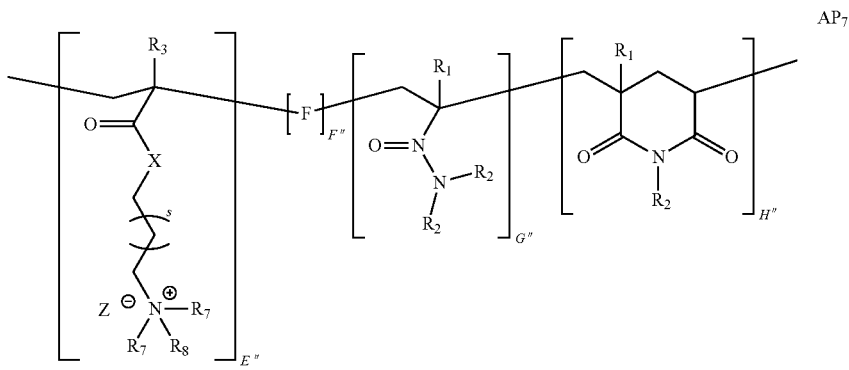

wherein each $R_1$ is independently H or $C_1$-$C_4$ alkyl (e.g., methyl, ethyl, n-propyl, iso-propyl, n-butyl, sec-butyl, or tert-butyl), each $R_2$ is independently H or an organic group, $R_6$ and $R_7$ are each independently H or $C_1$-$C_{10}$ alkyl (e.g., $(CH_2)_tCH_3$) wherein t is an integer from 0 to 9, X is O or NH, s is an integer from 0 to 20, Z is any anion, and $R_8$ is a hydrophobic group, E" is a mole percentage value of from about 0.005 to about 10, F is one or more additional monomer unit(s), F" is a mole percentage value of from about 0.005 to about 90, G" is a mole percentage value of from about 10 to about 99.99, and H" is a mole percentage value of from about 0 (i.e., trace amounts) to about 10. In some embodiments, "$C_1$-$C_{10}$ alkyl" refers to a branched $C_1$-$C_{10}$ alkyl group.

In certain embodiments, the acrylamide-based polymer is of formula $AP_8$:

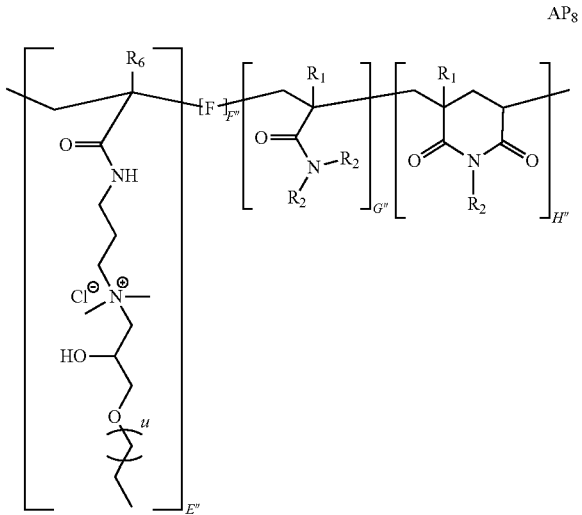

wherein each $R_1$ is independently H or $C_1$-$C_4$ alkyl (e.g., methyl, ethyl, n-propyl, iso-propyl, n-butyl, sec-butyl, or tert-butyl), each $R_2$ is independently H or an organic group, $R_6$ is H or $C_1$-$C_{10}$ alkyl (e.g., $(CH_2)_tCH_3$) wherein t is an integer from 0 to 9, and u is an integer from 0 to 30, E" is a mole percentage value of from about 0.005 to about 10, F" is a mole percentage value of from about 0.005 to about 90, G" is a mole percentage value of from about 10 to about 99.99, and H" is a mole percentage value of from about 0 (i.e., trace amounts) to about 10. In some embodiments, "$C_1$-$C_{10}$ alkyl" refers to a branched $C_1$-$C_{10}$ alkyl group.

In certain embodiments, the acrylamide-based polymer is of formula $AP_9$:

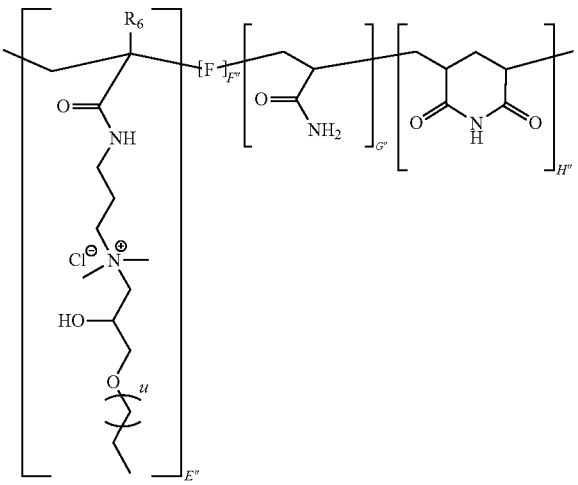

wherein $R_6$ is H or $C_1$-$C_{10}$ alkyl (e.g., $(CH_2)_tCH_3$) wherein t is an integer from 0 to 9, and u is an integer from 0 to 30, E" is a mole percentage value of from about 0.005 to about 10, F" is a mole percentage value of from about 0.005 to about 90, G" is a mole percentage value of from about 10 to about 99.99, and H" is a mole percentage value of from about 0 (i.e., trace amounts) to about 10. In some embodiments, "$C_1$-$C_{10}$ alkyl" refers to a branched $C_1$-$C_{10}$ alkyl group.

In certain embodiments of the acrylamide-based polymers of formula $AP_{7-9}$ (i.e., $AP_7$, $AP_8$, or $AP_9$), F is derived from one or more monomers selected from acrylic acid, methacrylic acid, or salts thereof.

In certain embodiments, the acrylamide-based polymer is of formula $AP_{10}$:

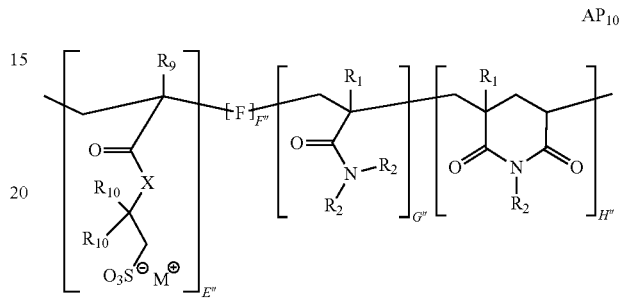

wherein each $R_1$ is independently H or $C_1$-$C_4$ alkyl (e.g., methyl, ethyl, n-propyl, iso-propyl, n-butyl, sec-butyl, or tert-butyl), each $R_2$ is independently H or an organic group, $R_9$ is H or $C_1$-$C_{10}$ alkyl (e.g., $(CH_2)_vCH_3$) wherein v is an integer from 0 to 9, X is O or NH, M is any cation, and each $R_{10}$ is independently H or a hydrophobic group, E" is a mole percentage value of from about 0.005 to about 10, F is one or more additional monomer unit(s), F" is a mole percentage value of from about 0.005 to about 90, G" is a mole percentage value of from about 10 to about 99.99, and H" is a mole percentage value of from about 0 (i.e., trace amounts) to about 10. In some embodiments, "$C_1$-$C_{10}$ alkyl" refers to a branched $C_1$-$C_{10}$ alkyl group.

In certain embodiments, the acrylamide-based polymer is of formula $AP_{11}$:

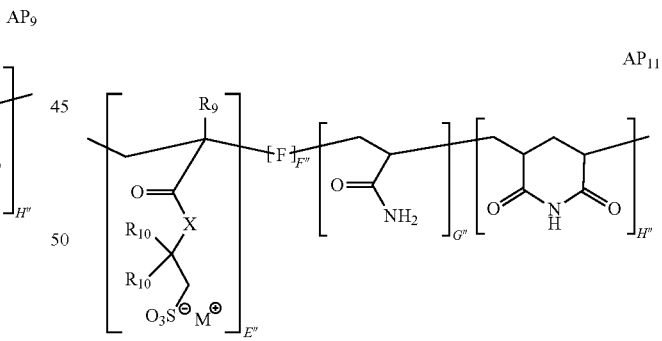

wherein $R_9$ is H or $C_1$-$C_{10}$ alkyl (e.g., $(CH_2)_vCH_3$) wherein v is an integer from 0 to 9, X is O or NH, M is any cation, and each $R_{10}$ is independently H or a hydrophobic group, E" is a mole percentage value of from about 0.005 to about 10, F is one or more additional monomer unit(s), F" is a mole percentage value of from about 0.005 to about 90, G" is a mole percentage value of from about 10 to about 99.99, and H" is a mole percentage value of from about 0 (i.e., trace amounts) to about 10. In some embodiments, "$C_1$-$C_{10}$ alkyl" refers to a branched $C_1$-$C_{10}$ alkyl group.

As described herein, the acrylamide-based polymers of formula $AP_4$-$AP_{11}$ (i.e., $AP_4$, $AP_5$, $AP_6$, $AP_7$, $AP_8$, $AP_9$, $AP_{10}$, or $AP_{11}$) can exist as an alternating polymer, random polymer, block polymer, graft polymer, linear polymer, branched polymer, cyclic polymer, or a combination thereof. Thus, the monomer units can exist in any suitable order, including repeating individual units.

The presence of the monomer unit H can be detected by any suitable method. In some embodiments, monomer H is detected by $^{13}CNMR$, $^{1}HNMR$, IR spectroscopy, or a combination thereof.

The abundance of the monomer unit H can be determined by any suitable method. In some embodiments, the abundance of the monomer unit H can be determined by relative comparison of the peak integrations of a $^{13}CNMR$ spectrum, $^{1}HNMR$ spectrum, IR spectrum, or a combination thereof.

In some embodiments of the acrylamide-based polymers of formula $AP_{3-11}$ (i.e., $AP_3$, $AP_4$, $AP_5$, $AP_6$, $AP_7$, $AP_8$, $AP_9$, $AP_{10}$, or $AP_{11}$), E" is from about 0.005 mol % to about 10 mol % (e.g., from about 0.005 mol % to about 9 mol %, from about 0.005 mol % to about 8 mol %, from about 0.005 mol % to about 7 mol %, from about 0.005 mol % to about 6 mol %, from about 0.005 mol % to about 5 mol %, from about 0.005 mol % to about 4 mol %, from about 0.005 mol % to about 3 mol %, or from about 0.005 mol % to about 2 mol %), F" is from about 0.005 mol % to about 90 mol % (e.g., from about 0.005 mol % to about 80 mol %, from about 0.005 mol % to about 70 mol %, from about 0.005 mol % to about 60 mol %, from about 0.005 mol % to about 50 mol %, from about 0.005 mol % to about 40 mol %, from about 0.005 mol % to about 35 mol %, from about 0.005 mol % to about 30 mol %, from about 0.005 mol % to about 25 mol %, from about 0.005 mol % to about 20 mol %, from about 0.005 mol % to about 16 mol %, from about 0.005 mol % to about 12 mol %, from about 0.005 mol % to about 10 mol %, from about 2 mol % to about 20 mol %, from about 4 mol % to about 20 mol %, from about 6 mol % to about 20 mol %, from about 4 mol % to about 16 mol %, from about 4 mol % to about 12 mol %, or from about 4 mol % to about 10 mol %), G" is from about 10 mol % to about 99.99 mol % (e.g., from about 10 mol % to about 99.99 mol %, from about 20 mol % to about 99.99 mol %, from about 30 mol % to about 99.99 mol %, from about 40 mol % to about 99.99 mol %, from about 50 mol % to about 99.99 mol %, from about 60 mol % to about 99.99 mol %, from about 70 mol % to about 99.99 mol %, from about 80 mol % to about 99.99 mol %, from about 80 mol % to about 99.95 mol %, from about 80 mol % to about 99.9 mol %, from about 80 mol % to about 99.5 mol %, from about 80 mol % to about 99 mol %, from about 80 mol % to about 97 mol %, from about 80 mol % to about 95 mol %, from about 80 mol % to about 92 mol %, from about 80 mol % to about 90 mol %, from about 84 mol % to about 99 mol %, from about 84 mol % to about 94 mol %, from about 84 mol % to about 95 mol %, from about 84 mol % to about 92 mol %, or from about 84 mol % to about 90 mol %), and H" is from about 0 mol % (i.e., trace amounts) to about 10 mol % (e.g., from about 0.001 mol % to about 10 mol %, from about 0.001 mol % to about 9 mol %, from about 0.001 mol % to about 8 mol %, from about 0.001 mol % to about 7 mol %, from about 0.001 mol % to about 6 mol %, from about 0.001 mol % to about 5 mol %, from about 0.001 mol % to about 4 mol %, from about 0.001 mol % to about 3 mol %, or from about 0.001 mol % to about 2 mol %).

In certain embodiments of the acrylamide-based polymers of formula ($AP_{3-11}$) (i.e., $AP_3$, $AP_4$, $AP_5$, $AP_6$, $AP_7$, $AP_8$, $AP_9$, $AP_{10}$, or $AP_{11}$), E" is from about 0.005 mol % to about 1 mol % (e.g., from about 0.01 mol % to about 1 mol %, from about 0.1 mol % to about 1 mol %, from about 0.25 mol % to about 1 mol %, from about 0.3 mol % to about 1 mol %, from about 0.4 mol % to about 1 mol %, from about 0.5 mol % to about 1.0 mol %, from about 0.01 mol % to about 0.5 mol %, or from about 0.01 mol % to about 0.25 mol %), F" is from about 4 mol % to about 10 mol % (e.g., from about 4 mol % to about 9 mol %, from about 4 mol % to about 8 mol %, from about 4 mol % to about 7 mol %, from about 4 mol % to about 6 mol %, from about 4 mol % to about 5 mol %, from about 5 mol % to about 10 mol %, from about 6 mol % to about 10 mol %, from about 7 mol % to about 10 mol %, from about 8 mol % to about 10 mol %, from about 9 mol % to about 10 mol %, or from about 6 mol % to about 8 mol %), G" is from about 84 mol % to about 90 mol % (e.g., from about 85 mol % to about 90 mol %, from about 86 mol % to about 90 mol %, from about 87 mol % to about 90 mol %, from about 88 mol % to about 90 mol %, from about 89 mol % to about 90 mol %, from about 84 mol % to about 89 mol %, from about 84 mol % to about 88 mol %, from about 84 mol % to about 87 mol %, from about 84 mol % to about 86 mol %, from about 84 mol % to about 85 mol %, or from about 86 mol % to about 88 mol %), and H" is from about 0 mol % (i.e., trace amounts) to about 6 mol % (e.g., from about 0.001 mol % to about 5 mol %, from about 0.001 mol % to about 4 mol %, from about 0.001 mol % to about 3 mol %, or from about 0.001 mol % to about 2 mol %, from about 0.001 mol % to about 1 mol %, from about 0.01 mol % to about 1 mol %, from about 0.1 mol % to about 1 mol %, from about 0.25 mol % to about 1 mol %, from about 0.3 mol % to about 1 mol %, from about 0.4 mol % to about 1 mol %, from about 0.5 mol % to about 1.0 mol %, from about 0.01 mol % to about 0.5 mol %, or from about 0.01 mol % to about 0.25 mol %).

In some embodiments, the process for making the powder comprises networking one or more acrylamide-based polymer(s). As used herein, "networking" refers to chemical coordination of one polymer chain to an adjacent polymer chain to promote a different physical property. The networking technique can comprise any suitable chemical coordination. Generally, the networking of one or more acrylamide-based polymer(s) does not comprise covalently linking adjacent polymer chains. For example, the chemical coordination can occur through ionic bonding, hydrogen bonding, hydrophobic interactions, dipolar interactions, Van der Waals forces, or a combination thereof.

In an embodiment, at least a portion of the networking occurs between the associative monomer units of different polymer chains (i.e., intermolecular interactions). Without wishing to be bound by any particular theory, it is believed that associative monomer units interact momentarily through weak chemical interactions (i.e., ionic bonding, hydrogen bonding, hydrophobic interactions, dipolar interactions, Van der Waals forces, or a combination thereof), resulting in networking adjacent acrylamide-based polymer(s) temporarily. As used herein, "networking adjacent acrylamide-based polymer(s) temporarily" refers to an interaction, which can be controlled by the level of dilution, the presence of a surfactant, or a combination thereof. Thus, the networking of acrylamide-based polymer(s) is reversible, thereby allowing for powders, gels, or low viscosity liquid media to be prepared and/or subsequently dispersed in a solvent.

In another embodiment, at least a portion of the networking occurs between the associative monomer units and one or more surfactant(s). Without wishing to be bound by any particular theory, it is believed that associative monomer units can interact momentarily through weak chemical interactions (i.e., ionic bonding, hydrogen bonding, hydrophobic interactions, dipolar interactions, Van der Waals forces, or a combination thereof) with the one or more surfactant(s), resulting in networking the acrylamide-based polymer(s) and surfactant(s) temporarily. As used herein, "networking adjacent acrylamide-based polymer(s) and surfactant(s) temporarily" refers to an interaction, which can be controlled by the level of dilution, the amount of a surfactant, or a combination thereof. Thus, the networking of acrylamide-based polymer(s) and surfactant(s) is reversible, and allows for powder, gels, or low viscosity liquid media to be prepared and/or subsequently dispersed in a solvent.

In some embodiments, at least a portion of the networking occurs through micellar copolymerization. As used herein, "micellar copolymerization" refers to concurrent formation of micelles comprising associative monomers and/or surfactant(s), and associative polymer(s) comprising associative monomer units. Without wishing to be bound by any particular theory, it is believed that associative monomer units of adjacent polymers can become incorporated into micelles formed from associative monomers and/or surfactant(s), thereby networking the adjacent acrylamide-based polymer(s) temporarily.

As used herein, "temporary networking" refers to an associative interaction (e.g., within the solution of acrylamide-based polymer(s), the wet gel, and the powder) which can be controlled by the level of dilution, the presence of a surfactant, or a combination thereof. Contrary to more permanent cross-linking practice known in the art, e.g., cross-linking via covalent bonds, temporary networking can be momentary. As used herein, "temporary" can refer to any length of time extending from the initial formation of the solution of acrylamide-based polymer(s) to dispersion of the powder in solution. For example, temporary networking provides sufficient structure of the wet gel to allow for machine processing and conversion into a powder. In addition, temporary networking helps to produce a powder that is stable yet maintains reasonable levels of water solubility. Upon dilution in water, the associative interactions (i.e., the temporary networking) decrease, and the powder becomes dispersed in the water or other solvent.

In certain embodiments, the process for making the powder comprises networking one or more acrylamide-based polymer(s) and one or more surfactant(s) wherein the one or more associative monomer unit(s) and the one or more surfactant(s) are structurally similar. As used herein, "structurally similar" means that the associative monomer unit(s) and the surfactant(s) have the same or similar chemical functional groups. In some embodiments, the associative monomer unit(s) and the surfactant(s) each comprise at least one hydroxyl substituent. In some embodiments, the associative monomer unit(s) and the surfactant(s) each comprise at least one amine substituent. In some embodiments, the associative monomer unit(s) and the surfactant(s) each comprise a polyether ether chain. In some embodiments, the associative monomer unit(s) and the surfactant(s) each comprise a polyether chain, wherein the length of the polyether chains are separated by six carbon units or less (i.e., 6, 5, 4, 3, 2, 1, or 0). For example, if an associative monomer unit has a polyether chain length of 16 carbon units, then a structurally similar surfactant will have a polyether chain length from 10-22 carbon units (i.e., 10, 11, 12, 13, 14, 15, 16, 17, 18, 19, 20, 21, or 22). In certain embodiments, the polyether chains comprise the same number of carbon units. In some embodiments, the associative monomer unit(s) and the surfactant(s) each comprise an alkyl chain. In some embodiments, the associative monomer unit(s) and the surfactant(s) each comprise alkyl chains, wherein the length of the alkyl chains are separated by six carbon units or less (i.e., 6, 5, 4, 3, 2, 1, or 0). For example, if an associative monomer unit has an alkyl chain length of 16 carbon units, then a structurally similar surfactant will have an alkyl chain length from 10-22 carbon units (i.e., 10, 11, 12, 13, 14, 15, 16, 17, 18, 19, 20, 21, or 22). In certain embodiments, the alkyl chains each comprise the same number of carbons. In certain embodiments, the associative monomer unit(s) and the surfactant(s) comprise the same structural subunit.

In some embodiments, the process for making the powder further comprises one or more surfactant(s). The surfactant can be any suitable surfactant selected from an anionic surfactant, a cationic surfactant, a nonionic surfactant, and a combination thereof. In some embodiments, the one or more surfactant(s) may exist as a dimer. For example, the surfactant can have one polar head group and two non-polar tails, or two polar head groups and one non-polar tail, or two polar head groups and two non-polar tails. Without wishing to be bound to any particular theory, it is believed that the surfactant helps to provide structure to the wet gel and increases solubility of the resulting powder upon dilution in water or other solvent.

In an embodiment, the surfactant is a cationic surfactant. In certain embodiments, the cationic surfactant is an ammonium salt of Formula IX:

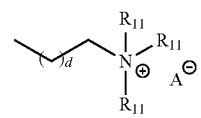

wherein each $R_{11}$ is independently H or $C_1$-$C_{10}$ alkyl (e.g., $(CH_2)_e CH_3$) wherein e is an integer from 0 to 9 (i.e., 0, 1, 2, 3, 4, 5, 6, 7, 8, or 9), A is any anion, and d is an integer from 6 to 34 (e.g., from 6 to 30, from 6 to 24, from 6 to 20, from 6 to 16, from 6 to 12, from 5 to 25, from 10 to 20, from 15 to 25, from 10 to 24, or from 10 to 30). In some embodiments, "$C_1$-$C_{10}$ alkyl" refers to a branched $C_1$-$C_{10}$ alkyl group. In some embodiments, the ammonium salt of Formula IX is a mixture of two or more such ammonium salts, such that the average (rounded to the nearest integer) value of d is an integer from 6 to 34 (e.g., from 6 to 30, from 6 to 24, from 6 to 20, from 6 to 16, from 6 to 12, from 5 to 25, from 10 to 20, from 15 to 25, from 10 to 24, or from 10 to 30). In certain embodiments, the cationic surfactant is hexadecyltrimethylammonium p-toluenesulfonate or hexadecyltrimethylammonium chloride.

The ammonium salt can have any suitable anion counter ion (i.e., "A"). In some embodiments, the anion counter ion ("A") comprises an element selected from a halogen (i.e., fluoride, chloride, bromide, or iodide), sulfur, carbon, nitrogen, phosphorous, and a combination thereof. An exemplary list of anions comprises fluoride, chloride, bromide, iodide, sulfide, sulfite, sulfate, bisulfate, bisulfite, thiosulfate, carbonate, bicarbonate, nitrate, nitrite, phosphate, hydrogen phosphate, dihydrogen phosphate, phosphite, hydrogen phosphite, dihydrogen phosphite, hexafluorophosphate, carboxylate, acetate, mesylate, tosylate, or triflate. In certain embodiments, A is selected from fluoride, chloride, bromide, mesylate, tosylate, or a combination thereof.

In some embodiments, the surfactant is an anionic surfactant. In certain embodiments, the anionic surfactant is a sulfate salt of Formula X:

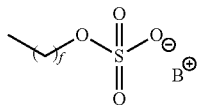

X wherein B is any cation, and f is an integer from 7 to 35 (e.g., from 7 to 29, from 7 to 23, from 7 to 19, from 7 to 15, from 7 to 11, from 11 to 19, from 11 to 23, or from 11 to 29). In some embodiments, the sulfate salt of Formula X is a mixture of two or more such sulfate salts, such that the average (rounded to the nearest integer) value of f is an integer from 7 to 35 (e.g., from 7 to 29, from 7 to 23, from 7 to 19, from 7 to 15, from 7 to 11, from 11 to 19, from 11 to 23, or from 11 to 29). In certain embodiments, the anionic surfactant is sodium dodecylsulfate (i.e., f is 11).

The sulfate salt can have any suitable cation counter ion (i.e., "B"). For example, the cation counter ion ("B") can be a proton, ammonium, a quaternary amine, a cation of an alkali metal, a cation of an alkaline earth metal, a cation of a transition metal, a cation of a rare-earth metal, a main group element cation, or a combination thereof. In some embodiments, the cation counter ion is hydrogen or a cation of lithium, sodium, potassium, magnesium, calcium, manganese, iron, zinc, or a combination thereof. In certain embodiments, B is selected from hydrogen, lithium, sodium, potassium, or a combination thereof.

In some embodiments, the surfactant is a nonionic surfactant. The nonionic surfactant can be any suitable nonionic surfactant. In some embodiments, the nonionic surfactant comprises repeating units of ethylene oxide, propylene oxide, or ethylene oxide and propylene oxide. In certain embodiments, the surfactant comprises block or random copolymers of ethylene oxide ("E0"), propylene oxide ("PO"), or a combination thereof.

In certain embodiments, the nonionic surfactant is of Formula XI:

$$HO(C_2H_4O)_a(C_3H_6O)_b(C_2H_4O)_cH \quad \text{XI}$$

wherein a, b, and c are independently integers ranging from about 2 to about 200 (e.g., from about 2 to about 175, from about 2 to about 150, from about 2 to about 125, from about 2 to about 100, from about 50 to about 200, from about 50 to about 150, or from about 50 to about 100), and a, b, and c are the same or different. In some embodiments, the nonionic surfactant of Formula X is a mixture of two or more such surfactants, such that a, b, and c refer to an average (rounded to the nearest integer) chain length of the designated subunits (i.e., average chain length of EO and PO) wherein a, b, and c are independently integers from about 2 to about 200 (e.g., from about 2 to about 175, from about 2 to about 150, from about 2 to about 125, from about 2 to about 100, from about 50 to about 200, from about 50 to about 150, or from about 50 to about 100). In certain embodiments, the nonionic surfactant is PLURONIC® F-127 surfactant, i.e.,$HO(C_2H_4O)_{101}(C_3H_6O)_{56}(C_2H_4O)_{101}H$, marketed by BASF Corporation (Florham Park, N.J.).

In some embodiments, the nonionic surfactant is of Formula XII:

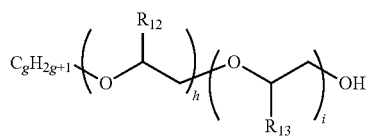

XII wherein g is an integer ranging from about 6 to about 50 (e.g., from about 6 to about 42, from about 6 to about 36, from about 6 to about 30, from about 6 to about 24, from about 6 to about 18, from about 6 to about 12, from about 8 to about 30, from about 12 to about 50, from about 12 to about 36, or from about 12 to about 24), each $R_{12}$ and $R_{13}$ are independently H or $C_1$-$C_4$ alkyl (e.g., methyl, ethyl, n-propyl, iso-propyl, n-butyl, sec-butyl, or tert-butyl), and h and i are independently integers ranging from 0 to about 100 (e.g., from about 0 to about 90, from about 0 to about 80, from about 0 to about 70, from about 0 to about 60, from about 0 to about 50, from about 10 to about 100, or from about 10 to about 50). In some embodiments, the surfactant of Formula XII is a mixture of two or more such surfactants, such that g, h, and i refer to an average (rounded to the nearest integer) chain length of the designated subunits (i.e., average carbon chain length or average EO (or substituted EO) chain length), wherein g is an integer from about 6 to about 50 (e.g., from about 6 to about 42, from about 6 to about 36, from about 6 to about 30, from about 6 to about 24, from about 6 to about 18, from about 6 to about 12, from about 8 to about 30, from about 12 to about 50, from about 12 to about 36, or from about 12 to about 24), and h and i are independently integers ranging from 0 to about 100 (e.g., from about 0 to about 90, from about 0 to about 80, from about 0 to about 70, from about 0 to about 60, from about 0 to about 50, from about 10 to about 100, or from about 10 to about 50).

In certain embodiments, the nonionic surfactant is of Formula XII:

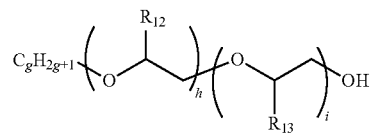

XII wherein g is an integer ranging from about 6 to about 50 (e.g., from about 6 to about 42, from about 6 to about 36, from about 6 to about 30, from about 6 to about 24, from about 6 to about 18, from about 6 to about 12, from about 12 to about 50, from about 12 to about 36, or from about 12 to about 24), $R_{12}$ and $R_{13}$ are H, and h and i are independently integers ranging from 0 to about 100 (e.g., from about 0 to about 90, from about 0 to about 80, from about 0 to about 70, from about 0 to about 60, from about 0 to about 50, from about 10 to about 100, or from about 10 to about 50). In certain embodiments, the surfactant is BRIJ® S20, i.e., a polyethylene glycol octadecyl ether of the formula $C_{18}H_{37}(OC_2H_4)_{h'}OH$, wherein h' is an integer ranging from about 2 to about 200, marketed by Croda International PLC (East Yorkshire, United Kingdom).

In certain embodiments, the nonionic surfactant is of Formula XII:

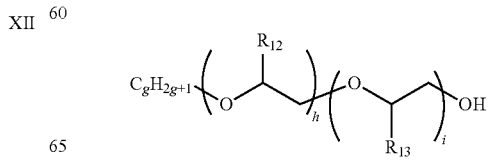

XII wherein g is an integer ranging from about 6 to about 50 (e.g., from about 6 to about 42, from about 6 to about 36, from about 6 to about 30, from about 6 to about 24, from about 6 to about 18, from about 6 to about 12, from about 12 to about 50, from about 12 to about 36, or from about 12 to about 24), i is 0, $R_{12}$ is H, and h is an integer ranging from about 2 to about 30 (e.g., from 2 to 30, from 4 to 30, from 6 to 30, from 8 to 30, from 10 to 30, from 12 to 30, from 16 to 30, from 18 to 30, from 20 to 30, from 22 to 30, or from 24 to 30). In certain embodiments, the surfactant is a Lutensol® fatty alcohol ethoxylate commercially available from BASF Corporation (Florham Park, N.J.). More preferably, the surfactant is polyethoxy (25) cetyl and/or stearyl alcohol, marketed under the product name (25 EO) C16-C18 fatty alcohol ("LutensolAT®25"), commercially available from BASF Corporation (Florham Park, N.J.).

In certain embodiments, the nonionic surfactant is of Formula XII:

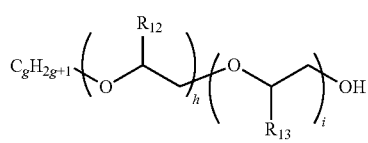

XII wherein g is an integer ranging from about 8 to about 30 (e.g., from 10 to 30, from 12 to 30, from 16 to 30, from 18 to 30, from 20 to 30, from 22 to 30, or from 24 to 30), each $R_{12}$ and $R_{13}$ are independently H or $C_1$-$C_4$ alkyl (e.g., methyl, ethyl, n-propyl, iso-propyl, n-butyl, sec-butyl, or tert-butyl), and h and i are independently integers ranging from 0 to about 50 (e.g., from about 0 to about 40, from about 0 to about 30, from about 0 to about 20, from about 10 to about 50, from about 10 to about 40, from about 10 to about 30, or from about 10 to about 20). In certain embodiments, the surfactant is a Plurafac® surfactant, commercially available from BASF Corporation (Florham Park, N.J.).

In certain embodiments, the nonionic surfactant is of Formula XIII:

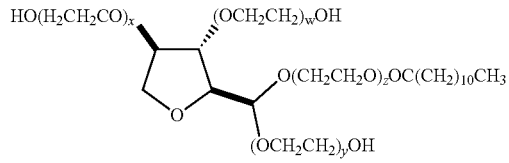

XIII wherein w, x, y, and z are integers from about 0 to about 50 (e.g., from about 0 to about 40, from about 0 to about 30, from about 0 to about 20, from about 0 to about 16, from about 0 to about 12, or from about 0 to about 8), and w, x, y, and z are the same or different. In some embodiments, the nonionic surfactant of Formula XIII is a mixture of two or more such surfactants, such that w, x, y, and z refer to an average (rounded to the nearest integer) chain length of the designated subunits (i.e., average chain length of EO) wherein w, x, y, and z are integers from about 0 to about 50 (e.g., from about 0 to about 40, from about 0 to about 30, from about 0 to about 20, from about 0 to about 16, from about 0 to about 12, or from about 0 to about 8). In certain embodiments, the nonionic surfactant is TWEEN® 20 surfactant, i.e., w+x+y+z=20, marketed by Croda International PLC (East Yorkshire, United Kingdom).

When the one or more surfactant(s) is present in the powder, the one or more surfactant(s) can be present in the powder at any suitable concentration. The powder can comprise a sum total of about 20 wt. % or less of the surfactant(s), for example, about 15 wt. % or less, about 10 wt. % or less, about 9 wt. % or less, about 8 wt. % or less, about 7 wt. % or less, about 6 wt. % or less, or about 5 wt. % or less. Alternatively, or in addition to, the powder can comprise a sum total of about 0.001 wt. % or more of the surfactant(s), for example, about 0.01 wt. %, about 0.1 wt. %, about 0.25 wt. % or more, about 0.5 wt. % or more, about 1 wt. % or more, about 2 wt. % or more, about 3 wt. % or more, or about 4 wt. % or more. Thus, the powder can comprise the one or more surfactant(s) in a concentration bounded by any two of the aforementioned endpoints. The powder can comprise a sum total of from about 0.001 wt. % to about 5 wt. %, from about 0.01 wt. % to about 5 wt. %, from about 0.1 wt. % to about 5 wt. % surfactant, for example, from about 0.25 wt. % to about 5 wt. %, from about 0.5 wt. % to about 5 wt. %, from about 1 wt. % to about 5 wt. %, from about 2 wt. % to about 5 wt. %, from about 3 wt. % to about 5 wt. %, from about 4 wt. % to about 5 wt. %, from about 4 wt. % to about 10 wt. %, from about 4 wt. % to about 9 wt. %, from about 4 wt. % to about 8 wt. %, from about 4 wt. % to about 7 wt. %, from about 4 wt. % to about 6 wt. %, from about 0.001 wt. % to about 10 wt. %, from about 0.01 wt. % to about 10 wt. %, from about 0.1 wt. % to about 10 wt. %, from about 0.001 wt. % to about 15 wt. %, from about 0.01 wt. % to about 15 wt. %, from about 0.1 wt. % to about 15 wt. %, from about 0.001 wt. % to about 20 wt. %, from about 0.01 wt. % to about 20 wt. %, from about 0.1 wt. % to about 20 wt. %, or from about 0.001 wt. % to about 1 wt. %.

In an embodiment, the one or more surfactant(s) are added before the formation of the powder (e.g., to the polymer solution, before or after polymerization, or to the wet gel). When the surfactant(s) are added before the formation of the powder, the surfactant(s) are incorporated into the wet gel, and thereby the powder. Generally, the surfactant(s) improve the processability of the wet gel into a powder. Typically the surfactant(s) further improve the solubility or dispersibility of the resulting powder in aqueous media or other solvent.

In some embodiments, the one or more surfactant(s) is added to the powder after being processed from the wet gel. In some embodiments, the one or more surfactant(s) are not necessary for the wet gel to be processed. In particular, the chemical interactions of the associative monomer units may be strong enough to network the acrylamide-based polymer(s) in the absence of surfactant(s). While the surfactant is not always necessary for the formation of the powder, the resulting powder (absent of one or more surfactant(s)) is generally less soluble in an aqueous medium. For example, the one or more surfactant(s) tend to facilitate re-wetting of the acrylamide-based polymer(s) and speed up the process of forming a solution in water. Thus, a surfactant can be added after formation of the powder in order to improve solubility and dispersibility of the resulting powder in an aqueous medium or other solvent.

The polymerization to form the acrylamide-based polymer(s) can be carried out according to any suitable polymerization known in the art. For example, the acrylamide-based polymer(s) can be made by emulsion polymerization, dispersion polymerization, solution polymerization, gel polymerization, or a combination thereof. The polymerization to form the acrylamide-based polymer(s) can occur through any suitable mechanism. For example, the polymerization can occur through cationic polymerization, anionic polymerization, free-radical polymerization, coordination polymerization, or combinations thereof. Typically, polymerization occurs through free radical polymerization.

In some embodiments, the polymerization to form the acrylamide-based polymer(s) comprises one or more polymerization component(s). In certain embodiments, the one or more polymerization component(s) are not removed from the reaction mixture such that one or more of the polymerization component(s) remains in the polymer solution, the polymer wet gel, and/or the powder. In other embodiments, the one or more polymerization component(s) are removed such that the one or more polymerization component(s) are not present in the polymer solution, the polymer wet gel, and/or the powder. In some embodiments, the one or more polymerization component(s) are transformed such that one or more transformed polymerization components are present in the polymer solution, the polymer wet gel, and/or the powder. An exemplary list of polymerization components is an initiator, a chain transfer agent, a chelant, a redox agent, a buffer, and a combination thereof.

In some embodiments, the polymerization comprises one or more initiator(s). The initiator can be any suitable initiator. In some embodiments, the initiator is a free radical initiator. In certain embodiments, the initiator is selected from the group of azobis compounds. An exemplary list of initiators is 2,2'-azobis(2,4-dimethyl valeronitrile), 2,2'-azobis(4-methoxy-2,4-dimethyl valeronitrile), 1,1'-azobis(cyclohexane-1-carbonitrile), 2,2'-azobis(2-methylbutyronitrile), 2,2'-azobis(2-methylpropionamidine)dihydrochloride, 2,2'-azobis[2-(2-imidazolin-2-yl)propane]dihydrochloride, 2,2'-azobis[N-(2-carboxyethyl)-2-methylpropionamidine] hydrate (anhydride), and 2,2'-azobis[2-(2-imidazolin-2-yl) propane].

In some embodiments, the polymerization comprises one or more chain transfer agent(s). The chain transfer agent can be any suitable chain transfer agent. An exemplary list of chain transfer agents is carbon tetrachloride, carbon tetrabromide, bromotrichloromethane, pentaphenylethane, sodium formate, sodium hypophosphite, thiophenol, 4,4'-thiobisbenzenethiol, 4-methylbenzenethiol, and aliphatic thiols such as isooctyl 3-mercaptopropionate, tert-nonyl mercaptan, and N-acetyl-L-cysteine, N-2-mercaptoethyl)acetamide, glutathione, N-(2-mercaptopropionyl)glycine, and 2-mercaptoethanol.

In some embodiments, the polymerization comprises one or more chelant(s). The chelant can be any suitable chelant. In certain embodiments, the chelant is a polydentate organic compound. An exemplary list of chelating agents is diethylenetriaminepentaacetic acid ("DTPA"), ethylenediaminetetraacetic acid ("EDTA"), nitrilotriacetic acid ("NTA"), diethylenetriaminepentaacetic acid, N,N-bis(carboxymethyl)-L-glutamic acid, trisodium N-(hydroxyethyl)-ethylenediaminetriacetate, adipic acid, and salts thereof.

In some embodiments, the polymerization comprises one or more redox agent(s). The redox agent can be any suitable redox agent. In some embodiments, the redox agent aids in terminating the polymerization. In certain embodiments, the redox reagent is an organic peroxide, an inorganic peroxide, or a combination thereof. An exemplary list of redox agents is sodium bisulfate; a thiosulfate, ferrous ammonium sulfate; ascorbic acid, an amine, a hypophosphite, sodium bromate, a chlorate, a permanganate, ammonium persulfate, potassium persulfate, sodium persulfate, t-butyl hydrogen peroxide, hydrogen peroxide, ozone, and salts thereof. In some embodiments, the redox agent is added as a redox pair such that one agent participates in reduction and one agent participates in oxidation. In certain embodiments, the redox agent is the initiator.

In some embodiments, the polymerization comprises a buffer system. The buffer system can be any suitable organic and/or inorganic buffer system. In certain embodiments, the buffer system comprises an organic and/or inorganic acid and/or base capable of controlling the pH lower than about 6 (e.g., from about 0 to about 6, from about 1 to about 6, from about 2 to about 6, from about 3 to about 6, from about 4 to about 6, from about 5 to about 6, from about 0 to about 1, from about 0 to about 2, from about 0 to about 3, from about 0 to about 4, or from about 0 to about 5). An exemplary list of buffers is adipic acid, pimelic acid, glutaric acid, citric acid, acetic acid, an inorganic acid (e.g., phosphoric acid), an amine, and salts thereof.

The solution of one or more acrylamide-based polymer(s) and optionally one or more surfactant(s) can be converted to a wet gel by any suitable technique. In some embodiments, the solution of one or more acrylamide-based polymer(s) and optionally one or more surfactant(s) spontaneously becomes a wet gel. For example, the solution-based monomers can polymerize in the presence of the one or more surfactant(s) and polymerization results in a transition from solution-based monomers to solution-based polymers which spontaneously begin to solidify to form the polymer wet gel. In some embodiments, the solution of one or more acrylamide-based polymer(s) and optionally one or more surfactant(s) may need to be dried prior to formation of a wet gel. For example, the solution of one or more acrylamide-based polymer(s) and optionally one or more surfactant(s) can be converted to a wet gel through drying (e.g., placing in an oven and/or ambient temperature evaporation), cooling, change in pressure, or a combination thereof. As used herein, "wet gel" refers to any material produced when a solution of one or more acrylamide-based polymer(s) and optionally one or more surfactant(s) transitions from a fluid-like to solid-like state. In certain embodiments, the wet gel maintains a taffy-like consistency and is not sticky.

The wet gel comprises the resulting acrylamide-based polymer(s), optionally one or more surfactant(s), and a solvent. Generally, the wet gel contains about 20 wt. % to about 80 wt. % of the acrylamide-based polymer. In an embodiment, the polymer wet gel comprises from about 25 wt. % to about 50 wt. % polymer. In certain embodiments, the polymer wet gel comprises from about 30 wt. % to about 40 wt. % polymer.

The wet gel can be processed to a powder by any suitable process. In some embodiments, the wet gel is processed to a powder by cutting the wet gel to form granules, drying the granules, and converting the dried granules to form a powder. In some embodiments, the wet gel is processed to a powder by drying the wet gel, cutting the dried wet gel into granules, and converting the granules to a powder. In some embodiments, the wet gel is process to a powder by drying the wet gel, cutting the dried wet gel to granules, drying the granules, and converting the dried granules to form a powder. The wet gel can be cut by any suitable method. In certain embodiments, the wet gel is machine processed (for example, using a Retsch Mill Cutter) to form wet gel granules. In certain embodiments, the wet gel is cut with the aid of a lubricant. The lubricant can be any suitable lubricant (e.g., a petroleum oil based lubricant). The wet gel granules can be converted to a powder by any suitable method. In some embodiments, "converting the granules to form a powder" refers to the process of, for example, optionally drying the granules further, grinding the granules, or drying and grinding the granules to produce a powder, though the converting may include other processing steps. For example, converting the granules to a powder can further comprise sifting.

The powder can have any suitable particle shape. In some embodiments, the powder particles are non-spherical. Without wishing to be bound to any particular theory, it is believed that non-spherical particles are generally formed when the powder has been manufactured by a gel-, spray-, or drum-based process (e.g., via cutting and drying). In some embodiments, the powder particles are spherical. Without wishing to be bound to any particular theory, it is believed that spherical particles are generally formed when the powder has been manufactured by a bead-based process.

The powder can have any suitable moisture content. Generally, the moisture content is from about 0 wt. % to about 30 wt. % (e.g., from about 0.01 wt. % to about 30 wt. %, from about 0.1 wt. % to about 30 wt. %, or from about 1 wt. % to about 30 wt. %). In certain embodiments of the powder, the moisture content is from about 0 wt. % to about 25 wt. % (e.g., from about 0.01 wt. % to about 25 wt. %, from about 0.1 wt. % to about 25 wt. %, or from about 1 wt. % to about 25 wt. %). In certain embodiments of the powder, the moisture content is from about 0 wt. % to about 20 wt. % (e.g., from about 0.01 wt. % to about 20 wt. %, from about 0.1 wt. % to about 20 wt. %, from about 1 wt. % to about 20 wt. %, from about 0.01 wt. % to about 15 wt. %, from about 0.1 wt. % to about 15 wt. %, from about 1 wt. % to about 15 wt. %, from about 0.01 wt. % to about 12 wt. %, from about 0.1 wt. % to about 12 wt. %, from about 1 wt. % to about 12 wt. %, from about 0.01 wt. % to about 10 wt. %, from about 0.1 wt. % to about 10 wt. %, or from about 1 wt. % to about 10 wt. %). In certain embodiments, the moisture content is about 10 wt. %.

The powder can have any suitable intrinsic viscosity. For example, the powder can have an intrinsic viscosity of from about 0.05 dL/g to about 15 dL/g (e.g., from about 0.05 dL/g to about 10 dL/g, from about 0.05 dL/g to about 7 dL/g, from about 0.05 dL/g to about 6 dL/g, from about 0.05 dL/g to about 5 dL/g, from about 0.05 dL/g to about 4 dL/g, from about 0.05 dL/g to about 3 dL/g, from about 0.05 dL/g to about 2 dL/g, from about 0.05 dL/g to about 1 dL/g, from about 0.05 dL/g to about 0.5 dL/g, from about 0.1 dL/g to about 7 dL/g, from about 0.1 dL/g to about 6 dL/g, from about 0.5 dL/g to about 5 dL/g, from about 0.1 dL/g to about 10 dL/g, from about 0.5 dL/g to about 10 dL/g, from about 0.1 dL/g to about 15 dL/g, or from about 0.5 dL/g to about 15 dL/g. In some embodiments, the powder has an intrinsic viscosity from about 0.05 dL/g to about 7. In certain embodiments, the powder has an intrinsic viscosity of from about 0.5 dL/g to about 5 dL/g.

The resulting powder can have any suitable Huggins constant. For example, the resulting powder can have a Huggins constant from about 0.1 to about 20 (e.g., from about 0.1 to about 15, from about 0.1 to about 10, from about 0.3 to about 10, from about 0.1 to about 5, from about 0.5 to about 20, from about 0.5 to about 10, from about 1 to about 20, from about 1 to about 10, or from about 1 to about 5). In some embodiments, the powder can have a Huggins constant of from about 0.3 to about 10 as determined by varying concentrations of the powder, wherein the concentrations have been chosen such that they produce a value of $$\left(\frac{t}{t_0}\right)$$

between about 1.2 and 2.2, in a 1.0 N sodium nitrate solution. In some embodiments, the powder can have a Huggins constant of from about 0.3 to about 5 as determined by varying concentrations of the powder, wherein the concentrations have been chosen such that they produce a value of $$\left(\frac{t}{t_0}\right)$$

between about 1.2 and 2.2, in a 1.0 N sodium nitrate solution. In certain embodiments, the powder has a Huggins constant of from about 0.6 to about 3 as determined by varying concentrations of the powder, wherein the concentrations have been chosen such that they produce a value of $$\left(\frac{t}{t_0}\right)$$

between about 1.2 and 2.2, in a 1.0 N sodium nitrate solution. The Huggins constant is calculated as follows:

In some embodiments, the powder comprises one or more acrylamide-based polymer(s) comprising one or more associative monomer unit(s) and one or more monomer units selected from at least one of a cationic monomer unit, an anionic monomer unit, a nonionic monomer unit, a zwitterionic monomer unit, or a combination thereof, and optionally one or more surfactant(s), wherein the acrylamide-based polymer(s) have a weight average molecular weight of from about 10 kDa to about 2,000 kDa. In some embodiments, the powder comprises one or more low molecular weight acrylamide-based polymer(s) that are reversibly associated in a polymer network, wherein the association is controllable via degree of dilution in aqueous media, or amount of surfactant present.

In some embodiments, the powder comprises a nonionic surfactant and an acrylamide-based polymer comprising an associative monomer unit derived from a monomer of Formula II, a monomer unit derived from a monomer of Formula I, and an additional cationic monomer unit. In some embodiments, the powder comprises a nonionic surfactant and an acrylamide-based polymer comprising an associative monomer unit derived from a monomer of Formula II, a monomer unit derived from a monomer of Formula I, and an additional monomer unit derived from DMAEA.MCQ. In some embodiments, the powder comprises a nonionic surfactant and an acrylamide-based polymer comprising an associative monomer unit derived from a monomer of Formula II, an additional monomer unit derived from acrylamide, and an additional monomer unit derived from DMAEA.MCQ. In certain embodiments, the powder comprises a nonionic surfactant and an acrylamide-based polymer comprising an associative monomer unit derived from VISIOMER® monomer C18PEG1105MA, an additional monomer unit derived from acrylamide, and an additional monomer unit derived from DMAEA.MCQ. In certain embodiments, the powder comprises a nonionic surfactant of Formula XII, and an acrylamide-based polymer comprising an associative monomer unit derived from VISIOMER® monomer C18PEG1105MA, an additional monomer unit derived from acrylamide, and an additional monomer unit derived from DMAEA.MCQ. In certain embodiments, the powder comprises PLURONIC® F-127 surfactant and/or LutensolAT® 25 surfactant, and an acrylamide-based polymer comprising an associative monomer unit derived from VISIOMER® monomer C18PEG1105MA, an additional monomer unit derived from acrylamide, and an additional monomer unit derived from DMAEA.MCQ.

In some embodiments, the powder comprises a nonionic surfactant and an acrylamide-based polymer comprising an associative monomer unit derived from a monomer of Formula II, a monomer unit derived from a monomer of Formula I, and an additional anionic monomer unit. In some embodiments, the powder comprises a nonionic surfactant and an acrylamide-based polymer comprising an associative monomer unit derived from a monomer of Formula II, a monomer unit derived from a monomer of Formula I, and an additional monomer unit derived from sodium acrylate. In some embodiments, the powder comprises a nonionic surfactant and an acrylamide-based polymer comprising an associative monomer unit derived from a monomer of Formula II, an additional monomer unit derived from acrylamide, and an additional monomer unit derived from sodium acrylate. In certain embodiments, the powder comprises a nonionic surfactant and an acrylamide-based polymer comprising an associative monomer unit derived from VISIOMER® monomer C18PEG1105MA, an additional monomer unit derived from acrylamide, and an additional monomer unit derived from sodium acrylate. In certain embodiments, the powder comprises a nonionic surfactant of Formula XII, and an acrylamide-based polymer comprising an associative monomer unit derived from VISIOMER® monomer C18PEG1105MA, an additional monomer unit derived from acrylamide, and an additional monomer unit derived from sodium acrylate. In certain embodiments, the powder comprises PLURONIC® F-127 surfactant and/or LutensolAT® 25 surfactant, and an acrylamide-based polymer comprising an associative monomer unit derived from VISIOMER® monomer C18PEG1105MA, an additional monomer unit derived from acrylamide, and an additional monomer unit derived from sodium acrylate.

In some embodiments, the powder comprises a cationic surfactant and an acrylamide-based polymer comprising an associative monomer unit derived from a monomer of Formula VI, a monomer unit derived from a monomer of Formula I, and an additional cationic monomer unit. In some embodiments, the powder comprises a cationic surfactant and an acrylamide-based polymer comprising an associative monomer unit derived from a monomer of Formula VI, a monomer unit derived from a monomer of Formula I, and an additional monomer unit derived from DMAEA.MCQ. In some embodiments, the powder comprises a cationic surfactant and an acrylamide-based polymer comprising an associative monomer unit derived from a monomer of Formula VI, an additional monomer unit derived from acrylamide, and an additional monomer unit derived from DMAEA.MCQ. In certain embodiments, the powder comprises a cationic surfactant and an acrylamide-based polymer comprising an associative monomer unit derived from MAPTAC-C12 derivative of Formula VII, an additional monomer unit derived from acrylamide, and an additional monomer unit derived from DMAEA.MCQ. In certain embodiments, the powder comprises a cationic surfactant of Formula IX, and an acrylamide-based polymer comprising an associative monomer unit derived from MAPTAC-C12 derivative of Formula VII, an additional monomer unit derived from acrylamide, and an additional monomer unit derived from DMAEA.MCQ. In certain embodiments, the powder comprises cetyltrimethylammonium chloride and/or hexadecyltrimethylammonium p-toluenesulfonate, and an acrylamide-based polymer comprising an associative monomer unit derived from MAPTAC-C12 derivative of Formula VII, an additional monomer unit derived from acrylamide, and an additional monomer unit derived from DMAEA.MCQ.

In some embodiments, the powder comprises a cationic surfactant and an acrylamide-based polymer comprising an associative monomer unit derived from a monomer of Formula VI, a monomer unit derived from a monomer of Formula I, and an additional anionic monomer unit. In some embodiments, the powder comprises a cationic surfactant and an acrylamide-based polymer comprising an associative monomer unit derived from a monomer of Formula VI, a monomer unit derived from a monomer of Formula I, and an additional monomer unit derived from sodium acrylate. In some embodiments, the powder comprises a cationic surfactant and an acrylamide-based polymer comprising an associative monomer unit derived from a monomer of Formula VI, an additional monomer unit derived from acrylamide, and an additional monomer unit derived from sodium acrylate. In certain embodiments, the powder comprises a cationic surfactant and an acrylamide-based polymer comprising an associative monomer unit derived from MAPTAC-C12 derivative of Formula VII, an additional monomer unit derived from acrylamide, and an additional monomer unit derived from sodium acrylate. In certain embodiments, the powder comprises a cationic surfactant of Formula IX, and an acrylamide-based polymer comprising an associative monomer unit derived from MAPTAC-C12 derivative of Formula VII, an additional monomer unit derived from acrylamide, and an additional monomer unit derived from sodium acrylate. In certain embodiments, the powder comprises cetyltrimethylammonium chloride and/or hexadecyltrimethylammonium p-toluenesulfonate, and an acrylamide-based polymer comprising an associative monomer unit derived from MAPTAC-C12 derivative of Formula VII, an additional monomer unit derived from acrylamide, and an additional monomer unit derived from sodium acrylate.

In some embodiments, the powder comprises an anionic surfactant and an acrylamide-based polymer comprising an associative monomer unit derived from a monomer of Formula VIII, a monomer unit derived from a monomer of Formula I, and an additional cationic monomer unit. In some embodiments, the powder comprises an anionic surfactant and an acrylamide-based polymer comprising an associative monomer unit derived from a monomer of Formula VIII, a monomer unit derived from a monomer of Formula I, and an additional monomer unit derived from DMAEA.MCQ. In some embodiments, the powder comprises an anionic surfactant and an acrylamide-based polymer comprising an associative monomer unit derived from a monomer of Formula VIII, an additional monomer unit derived from acrylamide, and an additional monomer unit derived from DMAEA.MCQ. In certain embodiments, the powder comprises an anionic surfactant of formula X, and an acrylamide-based polymer comprising an associative monomer unit derived from a monomer of Formula VIII, an additional monomer unit derived from acrylamide, and an additional monomer unit derived from DMAEA.MCQ. In certain embodiments, the powder comprises sodium dodecyl sulfate, and an acrylamide-based polymer comprising an associative monomer unit derived from a monomer of Formula VIII, an additional monomer unit derived from acrylamide, and an additional monomer unit derived from DMAEA.MCQ.

In some embodiments, the powder comprises an anionic surfactant and an acrylamide-based polymer comprising an associative monomer unit derived from a monomer of Formula VIII, a monomer unit derived from a monomer of Formula I, and an additional anionic monomer unit. In some embodiments, the powder comprises an anionic surfactant and an acrylamide-based polymer comprising an associative monomer unit derived from a monomer of Formula VIII, a monomer unit derived from a monomer of Formula I, and an additional monomer unit derived from sodium acrylate. In some embodiments, the powder comprises an anionic surfactant and an acrylamide-based polymer comprising an associative monomer unit derived from a monomer of Formula VIII, an additional monomer unit derived from acrylamide, and an additional monomer unit derived from sodium acrylate. In certain embodiments, the powder comprises an anionic surfactant of formula X, and an acrylamide-based polymer comprising an associative monomer unit derived from a monomer of Formula VIII, an additional monomer unit derived from acrylamide, and an additional monomer unit derived from sodium acrylate. In certain embodiments, the powder comprises sodium dodecyl sulfate, and an acrylamide-based polymer comprising an associative monomer unit derived from a monomer of Formula VIII, an additional monomer unit derived from acrylamide, and an additional monomer unit derived from sodium acrylate.

The individual components of the powder, for example, the one or more acrylamide-based polymers(s) and one or more optional surfactant(s), are as defined by the parameters set forth herein.

The individual structures of the one or more acrylamide-based polymers(s), for example, the one or more acrylamide-based polymers(s) and one or more monomer unit(s) selected from at least one of a cationic monomer unit, an anionic monomer unit, a nonionic monomer unit, a zwitterionic monomer unit, or a combination thereof, are as defined by the parameters set forth herein.

The individual structures of the one or more surfactant(s) are as defined by the parameters set forth herein.

The quantities of the individual components of the powder, for example, the amount of the one or more acrylamide-based polymers(s) and optionally one or more surfactant(s), are as defined by the parameters set forth herein.

The quantities of the individual monomer units of the acrylamide-based polymers(s), for example, the amount of the one or more associative monomer unit(s) and one or more monomer unit(s) selected from at least one of a cationic monomer unit, an anionic monomer unit, a nonionic monomer unit, a zwitterionic monomer unit, or a combination thereof, are as defined by the parameters set forth herein.

In certain embodiments, the physical characteristics of the powder are as defined by the parameters set forth herein.

The invention is further illustrated by the following embodiments.

(1) A process for making down a powder comprising one or more acrylamide-based polymer(s) to form a made down powder solution, comprising blending a mixture of the powder and a solvent for no more than about 15 minutes to yield the made down powder solution, wherein the powder comprises particles having been dry-cut to a median particle size of from about 200 microns to about 10,000 microns.

(2) The process of embodiment (1), wherein the solvent is water.

(3) The process of embodiment (1) or (2), wherein the particles have a median particle size of from about 350 microns to about 10,000 microns.

(4) The process of embodiment (3), wherein the particles have a median particle size of from about 500 microns to about 10,000 microns.

(5) The process of any one of embodiments (1)-(4), wherein the mixture of the powder and the solvent is blended at an impeller tip speed of about 5 m/sec to about 25 m/sec.

(6) The process of embodiment (5), wherein the mixture of the powder and the solvent is blended at an impeller tip speed of about 10 m/sec to about 20 m/sec.

(7) The process of embodiment (6), wherein the mixture of the powder and the solvent is blended at an impeller tip speed of about 15 m/sec.

(8) The process of any one of embodiments (1)-(7), wherein the mixture of the powder and the solvent is blended for no more than about 10 minutes to yield the made down powder solution.

(9) The process of embodiment (8), wherein the mixture of the powder and the solvent is blended for no more than about 5 minutes to yield the made down powder solution.

(10) The process of any one of embodiments (1)-(9), wherein a 1 wt. % fully made down powder solution in water at 25° C. made down at a tip speed of about 5 m/sec to about 25 m/sec to yield the fully made down powder solution has a viscosity (cps) within about 20% deviation of a viscosity (cps) of an identical solution, wherein the identical solution has been made down with a cage stirrer at a tip speed of about 1.26 m/s, and otherwise identical conditions, to yield the fully made down powder solution.

(11) The process of embodiment (10), wherein a 1 wt. % fully made down powder solution in water at 25° C. made down at a tip speed of about 5 m/sec to about 25 m/sec to yield the fully made down powder solution has a viscosity (cps) within about 10% deviation of a viscosity (cps) of an identical solution, wherein the identical solution has been made down with a cage stirrer at a tip speed of about 1.26 m/s, and otherwise identical conditions, to yield the fully made down powder solution.

(12) The process of any one of embodiments (1)-(11), wherein a 1 wt. % fully made down powder solution in water at 25° C. made down at a tip speed of about 5 m/sec to about 25 m/sec to yield the fully made down powder solution has an intrinsic viscosity (dL/g) within about 20% deviation of an intrinsic viscosity (dL/g) of an identical solution, wherein the identical solution has been made down with a cage stirrer at a tip speed of about 1.26 m/s, and otherwise identical conditions, to yield the fully made down powder solution.

(13) The process of embodiment (12), wherein a 1 wt. % fully made down powder solution in water at 25° C. made down at a tip speed of about 5 m/sec to about 25 m/sec to yield the fully made down powder solution has an intrinsic viscosity (dL/g) within about 10% deviation of an intrinsic viscosity (dL/g) of an identical solution, wherein the identical solution has been made down with a cage stirrer at a tip speed of about 1.26 m/s, and otherwise identical conditions, to yield the fully made down powder solution.

(14) The process of any one of embodiments (1)-(13), wherein the made down powder solution has an intrinsic viscosity of from about 0.05 dL/g to about 15 dL/g.

(15) The process of embodiment (14), wherein the made down powder solution has an intrinsic viscosity of from about 0.05 dL/g to about 7 dL/g.

(16) The process of any one of embodiments (1)-(15), wherein the one or more acrylamide-based polymer(s) have a weight average molecular weight of from about 10 kDa to about 5,000 kDa.

(17) The process of embodiment (16), wherein the one or more acrylamide-based polymer(s) have a weight average molecular weight of from about 200 kDa to about 2,000 kDa.

(18) The process of embodiment (17), wherein the one or more acrylamide-based polymer(s) have a weight average molecular weight of from about 800 kDa to about 2,000 kDa.

(19) The process of any one of embodiments (1)-(18), wherein the made down powder solution comprises at least about 0.25 wt. % of the one or more acrylamide-based polymer(s).

(20) The process of embodiment (19), wherein the made down powder solution comprises at least about 0.5 wt. % of the one or more acrylamide-based polymer(s).

(21) The process of embodiment (20), wherein the made down powder solution comprises at least about 1 wt. % of the one or more acrylamide-based polymer(s).

(22) The process of any one of embodiments (1)-(21), wherein the powder further comprises one or more surfactant(s).

(23) The process of any one of embodiments (1)-(22), wherein the made down powder solution further comprises one or more surfactant(s).

(24) The process of any one of embodiments (1)-(23), wherein at least one of the one or more acrylamide-based polymer(s) is of formula $AP_1$:

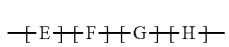

$AP_1$ wherein E is one or more associative monomer units(s), F is one or more additional monomer unit(s), G is one or more additional monomer unit(s) of Formula I:

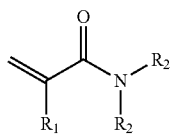

I wherein $R_1$ is H or $C_1$-$C_4$ alkyl and each $R_2$ is independently H or an alkyl group, an aryl group, a fluoroalkyl group, or a fluoroaryl group, and H is optionally present and is one or more piperidine-2,6-dione unit(s), wherein the one or more piperidine-2,6-dione(s) are formed upon cyclization of an acrylamide nitrogen of the additional monomer unit of Formula I ("G") on a carbonyl of the additional monomer unit ("F").

(25) The process of any one of embodiments (1)-(24), wherein the powder comprises one or more acrylamide-based polymer(s) and one or more surfactant(s) that are associatively networked.

(26) The process of embodiment (25), wherein at least one of the one or more acrylamide-based polymer(s) have one or more monomer unit(s) that are structurally similar to the surfactant(s).

The following examples further illustrate the invention but, of course, should not be construed as in any way limiting its scope.

EXAMPLE 1

This example, provided as a control, demonstrates the effect on the inability to be machine processed into a powder, exhibited by a low molecular weight polymer without networking via an associative monomer unit or a surfactant.

Polymer 1 (control) comprising 95/5 mol % acrylamide/DMAEA.MCQ was synthesized in the following manner:

An 1,000 g aqueous solution at pH 2-5 containing 34 wt. % monomer mixture of 95/5 mol % acrylamide/DMAEA.MCQ, azo initiator, chain transfer agent, buffer agent, and chelant was chilled to approximately −5° C. and de-gassed with nitrogen. Polymerization was initiated with a pair of redox agents and proceeded adiabatically until the conversion of monomer reached more than 99.99% to get the targeted molecular weight of $1\times10^6$ g/mol. The resulting polymer gel was too soft and sticky to be processed with the aid of 1 wt. % (relative to weight of polymer gel) petroleum oil based lubricant in a cutting mill (Restch Mill Cutter) at 1500 rpm. The resulting polymer gel was manually divided into small pieces on a tray and dried in an oven at 85° C. to remove the moisture and then ground to powder with an intrinsic viscosity of 3.20 dg/L and Huggins constant of 0.31 in 1.0 N $NaNO_3$ solution at 30° C. The weight average molecular weight was determined by hydrolysis (using 0.1 wt. % solution of NaOH at pH 12 with a cage stirrer at 400 rpm for one hour) of the resulting polymer, followed by size exclusion chromatography.

As is apparent from the results set forth in Table 1, low molecular weight Polymer 1, lacking temporary networking via an associative monomer, was incapable of being machine processed to form a powder. This was further evidenced by the procedure requiring manual division of the soft and sticky polymer.

TABLE 1

| Polymer | Intrinsic Viscosity (dg/L) | Huggins Constant | Weight Average Molecular Weight (kDa) | Wet Gel Processable |
|---|---|---|---|---|
| 1 | 3.20 | 0.31 | 930 | No |
| 2 | 2.91 | 1.05 | 820 | Yes |
| 3 | 1.96 | 1.36 | 490 | Yes |

EXAMPLE 2

This example demonstrates the effect on the ability to be machine processed into a powder, exhibited by a low molecular weight polymer comprising temporary networking via an associative monomer unit and a surfactant.

Polymer 2 comprising 94.94/5/0.06 mol % acrylamide/DMAEA.MCQ/C18PEG1105MA was synthesized in the following manner:

An 1,000 g aqueous solution at pH 2-5 containing 34 wt. % monomer mixture of 94.94/5/0.06 mol % acrylamide/DMAEA.MCQ/C18PEG1105MA (VISIOMER® monomer; 55% active; Evonik Industries, Essen, Germany), 1 wt. % of PLURONIC° F.127 surfactant (BASF Corporation, Florham Park, N.J.), azo initiator, chain transfer agent, buffer agent, and chelant was chilled to approximately −5° C. and de-gassed with nitrogen. Polymerization was initiated with a pair of redox agents and proceeded adiabatically until the conversion of monomer reached more than 99.99% to get the targeted molecular weight of $1\times10^6$ g/mol. The resulting wet gel, which maintained a taffy like consistency and was not sticky, was processed with the aid of 1 wt. % (relative to weight of polymer gel) petroleum oil based lubricant in a cutting mill (Retsch Mill Cutter) at 1500 rpm to form granules. The wet gel granules were dried in a mesh tray in an oven at 85° C. to decrease the moisture content to about 10 wt. % and then ground to powder having an intrinsic viscosity of 2.91 dg/L and Huggins constant of 1.05 in 1 N NaNO$_3$ solution at 30° C. The weight average molecular weight was determined by hydrolysis (using 0.1 wt. % solution of NaOH at pH 12 with a cage stirrer at 400 rpm for one hour) of the resulting polymer, followed by size exclusion chromatography.

As is apparent from the results set forth in Table 1, low molecular weight Polymer 2, comprising temporary networking, was capable of being machine processed to form a powder. This was further evidenced by the procedure allowing for use of a cutting mill to process the wet gel.

EXAMPLE 3

This example demonstrates the effect on the ability to be processed into a powder, exhibited by a low molecular weight polymer comprising temporary networking via an associative monomer unit and surfactant.

Polymer 3 comprising 94.84/5/0.12 mol % acrylamide/DMAEA.MCQ/C18PEG1105MA was synthesized in the following manner:

An 1,000 g aqueous solution at pH 2-5 containing 34 wt. % monomer mixture of 94.8/5/0.12 mol % acrylamide/DMAEA.MCQ/C18PEG1105MA (VISIOMER® monomer; 55% active; Evonik Industries, Essen, Germany), 1 wt. % of PLURONIC® F127 surfactant (BASF Corporation, Florham Park, N.J.), azo initiator, chain transfer agent, buffer agent, and chelant was chilled to approximately −5° C. and de-gassed with nitrogen. Polymerization was initiated with a pair of redox agents and proceeded adiabatically until the conversion of monomer reached more than 99.99% to get the targeted molecular weight of 0.5×10$^6$ g/mol. The resulting wet gel, which maintained a taffy like consistency and was not sticky, was processed with the aid of 1 wt. % (relative to weight of polymer gel) petroleum oil based lubricant in a cutting mill (Retsch Mill Cutter) at 1500 rpm to form granules. The wet gel granules were dried in a mesh tray in an oven at 85° C. to decrease the moisture content to about 10 wt. % and then ground to powder having an intrinsic viscosity of 1.96 dg/L and Huggins constant of 1.36 in 1 N NaNO$_3$ solution at 30° C. The weight average molecular weight was determined by hydrolysis (using 0.1 wt. % solution of NaOH at pH 12 with a cage stirrer at 400 rpm for one hour) of the resulting polymer, followed by size exclusion chromatography.

As is apparent from the results set forth in Table 1, low molecular weight Polymer 3, comprising temporary networking, was capable of being machine processed to form a powder. This was further evidenced by the procedure allowing for use of a cutting mill to process the wet gel.

EXAMPLE 4

This example demonstrates the effect on the ability to be machine processed into a powder, exhibited by a low molecular weight polymer comprising temporary networking via an associative monomer unit only (i.e., not further comprising a surfactant in the monomer phase).

Polymer 4 comprising 89.965/10/0.035 mol % acrylamide/DMAEA.MCQ/C18PEG1105MA was synthesized in the following manner:

An 1,000 g aqueous solution at pH 2-5 containing 37 wt. % monomer mixture of 89.965/10/0.035 mol % acrylamide/DMAEA.MCQ/C18PEG1105MA (VISIOMER® monomer; 55% active; Evonik Industries, Essen, Germany), azo initiator, chain transfer agent, buffer agent, and chelant was chilled to approximately −5° C. and de-gassed with nitrogen. Polymerization was initiated with a pair of redox agents and proceeded adiabatically until the conversion of monomer reached more than 99.99% to get the targeted molecular weight of 1.0×10$^6$ g/mol. The resulting wet gel, which maintained a taffy like consistency and was not sticky, was marginally processed with the aid of 1 wt. % (relative to weight of polymer gel) petroleum oil based lubricant in a cutting mill (Retsch Mill Cutter) at 1500 rpm to form granules. The wet gel granules were dried in a mesh tray in an oven at 85° C. to decrease the moisture content to about 10 wt. % and then ground to powder. The resulting powder had a median particle size of 568.9 microns (the mean particle size was 634.4), as determined using a Horiba Laser Scattering Particle Size Distribution Analyzer LA-950 with the setting of refractive index of powder at 1.5000. The powder did not completely dissolve as a 1 wt. % solution in synthetic tap water with stirring of cage stirrer at 400 rpm within one hour. The powder, as a 1 wt. % solution in synthetic tap water, had a viscosity of 744 cps, as measured on a Brookfield Model DV-E Viscometer with Spindle 62 at 30 rpm. The weight average molecular weight was determined by hydrolysis (using 0.1 wt. % solution of NaOH at pH 12 with a cage stirrer at 400 rpm for one hour) of the resulting polymer, followed by size exclusion chromatography.

As is apparent from the results set forth in Table 2, low molecular weight Polymer 4, not comprising a surfactant, was marginally capable of being machine processed to form a powder. The resulting powder was sparingly soluble in water (i.e., did not completely dissolve as a 1 wt. % solution in local tap water with stirring of cage stirrer at 400 rpm within one hour).

TABLE 2

| Polymer | Weight Average MW (kDa) | Surfactant in powder (wt. %) | Wet Gel Processable | Solubility | Viscosity of 1 wt. % solution in water (cps) |
| --- | --- | --- | --- | --- | --- |
| 4 | 840 | 0 | Yes (marginal) | Poor | 744 |
| 5 | 930 | 2.2 | Yes | Good | 317 |

EXAMPLE 5

This example demonstrates the effect on the ability to be machine processed into a powder, exhibited by a low molecular weight polymer comprising temporary networking via an associative monomer unit and surfactant.

Polymer 5 comprising 89.965/10/0.035 mol % acrylamide/DMAEA.MCQ/C18PEG1105MA was synthesized in the following manner:

An 1,000 g aqueous solution at pH 2-5 containing 37 wt. % monomer mixture of 89.965/10/0.035 mol % acrylamide/DMAEA.MCQ/C18PEG1105MA (VISIOMER® monomer; 55% active; Evonik Industries, Essen, Germany), 1 wt. % LutensolAT® 25 surfactant, or ethoxylated (25 mol EO) C16-18 fatty alcohol (BASF Corporation, Florham Park, N.J.), azo initiator, chain transfer agent, buffer agent, and chelant was chilled to approximately −5° C. and de-gassed with nitrogen. Polymerization was initiated with a pair of redox agents and proceeded adiabatically until the conversion of monomer reached more than 99.99% to get the targeted molecular weight of 1.0×10$^6$ g/mol. The resulting wet gel, which maintained a taffy like consistency and was not sticky, was processed with the aid of 1 wt. % (relative to weight of polymer gel) petroleum oil based lubricant in a cutting mill (Retsch Mill Cutter) at 1500 rpm to form granules. The wet gel granules were dried in a mesh tray in an oven at 85° C. to decrease the moisture content to about 10 wt. % and then ground to powder. The resulting powder had a median particle size of 559.7 microns (the mean particle size was 609.3), as determined using a Horiba Laser Scattering Particle Size Distribution Analyzer LA-950 with the setting of refractive index of powder at 1.5000. The powder completely dissolved as a 1 wt. % solution in synthetic tap water with stirring of cage stirrer at 400 rpm within one hour. The powder polymer, as a 1 wt. % solution in synthetic tap water, had a viscosity of 317 cps, as measured on a Brookfield Model DV-E Viscometer with Spindle 62 at 30 rpm. The weight average molecular weight was determined by hydrolysis (using 0.1 wt. % solution of NaOH at pH 12 with a cage stirrer at 400 rpm for one hour) of the resulting polymer, followed by size exclusion chromatography. The structure of Polymer 5 was further analyzed by $^{13}$C NMR spectroscopy (FIG. 1) to quantify the amount of piperidine-2,6-dione present in the polymer. The $^{13}$C NMR sample was prepared in deuterated water and the carbon spectrum was acquired using an Agilent Inova 500 Mhz spectrometer equipped with a Z-gradient and broadband 10 mm probe.

As is apparent from the results set forth in Table 2, low molecular weight Polymer 5, comprising a surfactant, was easily machine processed to form a powder. In addition, the resulting powder, comprising 2.2 wt. % surfactant, was completely soluble as a 1 wt. % solution in local tap water with stirring of cage stirrer at 400 rpm within one hour.

In addition, the presence of the piperidine-2,6-dione monomer unit can be verified by $^{13}$C NMR spectroscopy with a signature peak at 177 ppm in the $^{13}$C NMR spectrum (FIG. 1). The relative amount of the piperidine-2,6-dione monomer unit can be quantified by integration of the peak at 177 ppm, followed by a relative comparison to the integration of other $^{13}$C NMR signals indicative of other monomer units. Integration analysis demonstrates that Polymer 5 comprises 7.8/90/2.1 mol % DMAEA.MCQ-acrylamide-piperidine-2,6-dione. Note that the associative monomer unit is present in such low concentrations that signature peaks of the associative monomer unit are not visible by $^{13}$C NMR spectroscopy.

EXAMPLE 6

This example, provided as a control, demonstrates the effect on the inability to be machine processed into a powder, exhibited by a low molecular weight polymer without networking via an associative monomer unit or a surfactant.

Polymer 6 (control) comprising 50/50 mol % acrylamide/sodium acrylate was synthesized in the following manner:

An 1,000 g aqueous solution at neutral pH containing 37 wt. % monomer mixture of 50/50 mol % acrylamide/sodium acrylate, azo initiator, chain transfer agent, and chelant was chilled to approximately −5° C. and de-gassed with nitrogen. Polymerization was initiated with a pair of redox agents and proceeded adiabatically until the conversion of monomer reached more than 99.99% to get the targeted molecular weight of $1.0 \times 10^6$ g/mol. The resulting polymer wet gel was too soft and sticky to be processed with the aid of 1 wt. % (relative to weight of polymer gel) petroleum oil based lubricant in a cutting mill (Retsch Mill Cutter) at 1500 rpm. The resulting wet gel was manually divided small pieces on a tray and dried in an oven at 85° C. to remove the moisture and then ground to powder with an intrinsic viscosity of 5.80 dg/L and Huggins constant of 0.24 in 1 N NaNO$_3$ solution at 30° C. The weight average molecular weight was determined by size exclusion chromatography.

As is apparent from the results set forth in Table 3, low molecular weight Polymer 6, lacking temporary networking via an associative monomer unit, was incapable of being machine processed to form a powder. This was further evidenced by the procedure requiring manual division of the soft and sticky polymer.

TABLE 3

| Polymer | Intrinsic Viscosity (dg/L) | Huggins Constant | Weight Average MW of Surrogate (kDa) | Wet Gel Processable |
|---|---|---|---|---|
| 6 | 5.80 | 0.24 | 1,100 | No |
| 7 | 5.83 | 0.84 | 1,100 | Yes |
| 8 | 3.49 | 2.49 | 1,100 | Yes |
| 9 | 5.84 | 0.98 | 1,100 | Yes |

EXAMPLE 7

This example demonstrates the effect on the ability to be machine processed into a powder, exhibited by a low molecular weight polymer comprising temporary networking via an associative monomer unit and surfactant.

Polymer 7 comprising 49.9/50/0.1 mol % acrylamide/sodium acrylate/MAPTAC-C12 derivative synthesized in the following manner:

An 1,000 g aqueous solution at neutral pH containing 37 wt. % monomer mixture of 49.9/50/0.1 mol % acrylamide/sodium acrylate/MAPTAC-C12 derivative, 0.5 wt. % of hexadecyltrimethylammonium p-toluenesulfonate (Sigma-Aldrich, St. Louis, Mo.), azo initiator, chain transfer agent, and chelant was chilled to approximately −5° C. and de-gassed with nitrogen. Polymerization was initiated with a pair of redox agents and proceeded adiabatically until the conversion of monomer reached more than 99.99% to get the targeted molecular weight of $1.0 \times 10^6$ g/mol. The resulting wet gel, which maintained a taffy like consistency and was not sticky, was processed with the aid of 1 wt. % (relative to weight of polymer gel) petroleum oil based lubricant in a cutting mill (Retsch Mill Cutter) at 1500 rpm to form granules. The wet gel granules were dried in a mesh tray in an oven at 85° C. to decrease the moisture content to about 10 wt. % and then ground to powder. The resulting powder had a median particle size of 357.1 microns (the mean particle size was 420.1), as determined using a Horiba Laser Scattering Particle Size Distribution Analyzer LA-950 with the setting of refractive index of powder at 1.5000. The powder had an intrinsic viscosity of 5.83 dg/L and Huggins constant of 0.84 in 1.0 N NaNO$_3$ solution at 30° C. The powder completely dissolved as a 1 wt. % solution in synthetic tap water with stirring of cage stirrer at 400 rpm within one hour. The powder, as a 1 wt. % solution in synthetic tap water, had a viscosity of 1976 cps, as measured on a Brookfield Model DV-E Viscometer with Spindle 63 at 30 rpm. The weight average molecular weight was determined by size exclusion chromatography using surrogate, Polymer 6.

As is apparent from the results set forth in Table 3, low molecular weight Polymer 7, comprising a surfactant, was easily machine processed to form a powder. In addition, Table 4 shows that the resulting powder, comprising 1.3 wt. % surfactant, was completely soluble as a 1 wt. % solution in local tap water with stirring of cage stirrer at 400 rpm within one hour.

EXAMPLE 8

This example demonstrates the effect on the ability to be machine processed into a powder, exhibited by a low molecular weight polymer comprising temporary networking via an associative monomer unit and a surfactant.

Polymer 8 comprising 89.9/10/0.1 mol % acrylamide/sodium acrylate/MAPTAC-C12 derivative synthesized in the following manner:

An 1,000 g aqueous solution at neutral pH containing 33 wt. % monomer mixture of 89.9/10/0.1 mol % acrylamide/sodium acrylate/MAPTAC-C12 derivative, 0.5 wt. % of hexadecyltrimethylammonium p-toluenesulfonate (Sigma-Aldrich, St. Louis, Mo.), azo initiator, chain transfer agent, and chelant was chilled to approximately −5° C. and de-gassed with nitrogen. Polymerization was initiated with a pair of redox agents and proceeded adiabatically until the conversion of monomer reached more than 99.99% to get the targeted molecular weight of $1.0 \times 10^6$ g/mol. The resulting wet gel, which maintained a taffy like consistency and was not sticky, was processed with the aid of 1 wt. % (relative to weight of polymer gel) petroleum oil based lubricant in a cutting mill (Retsch Mill Cutter) at 1500 rpm to form granules. The wet gel granules were dried in a mesh tray in an oven at 85° C. to decrease the moisture content to about 10 wt. % and then ground to powder. The resulting powder had a median particle size of 396.2 microns (the mean particle size was 463.6), as determined using a Horiba Laser Scattering Particle Size Distribution Analyzer LA-950 with the setting of refractive index of powder at 1.5000. The powder had an intrinsic viscosity of 3.49 dg/L and Huggins constant of 2.49 in 1 N $NaNO_3$ solution at 30° C. The powder completely dissolved as a 1 wt. % solution in synthetic tap water with stirring of cage stirrer at 400 rpm within one hour. The powder, as a 1 wt. % solution in tap water, had a viscosity of 2748 cps, as measured on a Brookfield Model DV-E Viscometer with Spindle 63 at 30 rpm. The weight average molecular weight was determined by size exclusion chromatography using a surrogate polymer formed with the same synthetic procedure containing 90/10 mol % acrylamide/sodium acrylate in the absence of the MAPTAC-C12 derivative.

As is apparent from the results set forth in Table 3, low molecular weight Polymer 8, comprising a surfactant, was easily machine processed to form a powder. In addition, Table 4 shows that the resulting powder, comprising 1.3 wt. % surfactant, was completely soluble as a 1 wt. % solution in local tap water with stirring of cage stirrer at 400 rpm within one hour.

TABLE 4

| Polymer | Weight Aveargе MW of Surrogate (kDa) | Surfactant in powder (wt. %) | Wet Gel Processable | Solubility | Viscosity of 1 wt. % solution in water (cps) |
|---|---|---|---|---|---|
| 7 | 1,100 | 1.3 | Yes | Good | 1976 |
| 8 | 1,100 | 1.3 | Yes | Good | 2748 |
| 9 | 1,100 | 0 | Yes | Poor | 1588 |

EXAMPLE 9

This example demonstrates the effect on the ability to be machine processed into a powder, exhibited by a low molecular weight polymer comprising temporary networking via an associative monomer only (i.e., not further comprising a surfactant in the monomer phase).

Polymer 9 comprising 49.9/50/0.1 mol % acrylamide/sodium acrylate/MAPTAC-C12 derivative synthesized in the following manner:

An 1,000 g aqueous solution at neutral pH containing 37 wt. % monomer mixture of 49.9/50/0.1 mol % acrylamide/sodium acrylate/MAPTAC-C12 derivative, azo initiator, chain transfer agent, and chelant was chilled to approximately −5° C. and de-gassed with nitrogen. Polymerization was initiated with a pair of redox agents and proceeded adiabatically until the conversion of monomer reached more than 99.99% to get the targeted molecular weight of $1.0 \times 10^6$ g/mol. The resulting wet gel, which maintained a taffy like consistency and was not sticky, was processed with the aid of 1 wt. % (relative to weight of polymer gel) petroleum oil based lubricant in a cutting mill (Retsch Mill Cutter) at 1500 rpm to form granules. The wet gel granules were dried in a mesh tray in an oven at 85° C. to remove (i.e., to achieve a moisture content of about 10 wt. %) the moisture and then ground to powder. The resulting powder had a median particle size of 385.4 microns (the mean particle size was 446.4), as determined using a Horiba Laser Scattering Particle Size Distribution Analyzer LA-950 with the setting of refractive index of powder at 1.5000. The powder had an intrinsic viscosity of 5.84 dg/L and Huggins constant of 0.98 in 1 N $NaNO_3$ solution at 30° C. The powder polymer did not completely dissolve as a 1 wt. % solution in synthetic tap water with stirring of cage stirrer at 400 rpm within one hour. The powder, as a 1 wt. % solution in synthetic tap water, had a viscosity of 1588 cps, as measured on a Brookfield Model DV-E Viscometer with Spindle 63 at 30 rpm. The weight average molecular weight was determined by size exclusion chromatography using surrogate, Polymer 6.

As is apparent from the results set forth in Table 4, low molecular weight Polymer 9, not comprising a surfactant, was capable of being machine processed to form a powder. The resulting powder was sparingly soluble in water (i.e., did not completely dissolve as a 1 wt. % solution in local tap water with stirring of cage stirrer at 400 rpm within one hour).

EXAMPLE 10

This example demonstrates the effect on paper dry strength exhibited by a sheet of paper treated with a powder comprising acrylamide-based polymers(s) networked via an associative monomer unit and a surfactant.

Polymer 2 (prepared according to Example 2) and Polymer 3 (prepared according to Example 3) were dissolved in water and dosed at various concentrations into cellulose fiber slurry. The treated fibers were then added to a handsheet mold and drained through a screen to form wet fiber pads. The pads were couched from the screen, pressed, and dried to yield finished paper sheets. The sheets were tested for tensile strength and compressive strength and the results set forth in FIG. 2 and FIG. 3, respectively. In addition, the tensile strength and compressive strength results for Nalco 64114 (i.e., a glyoxylated polyacrylamide polymer), an established commercial strength agent, are provided for comparison.

Figure 2:
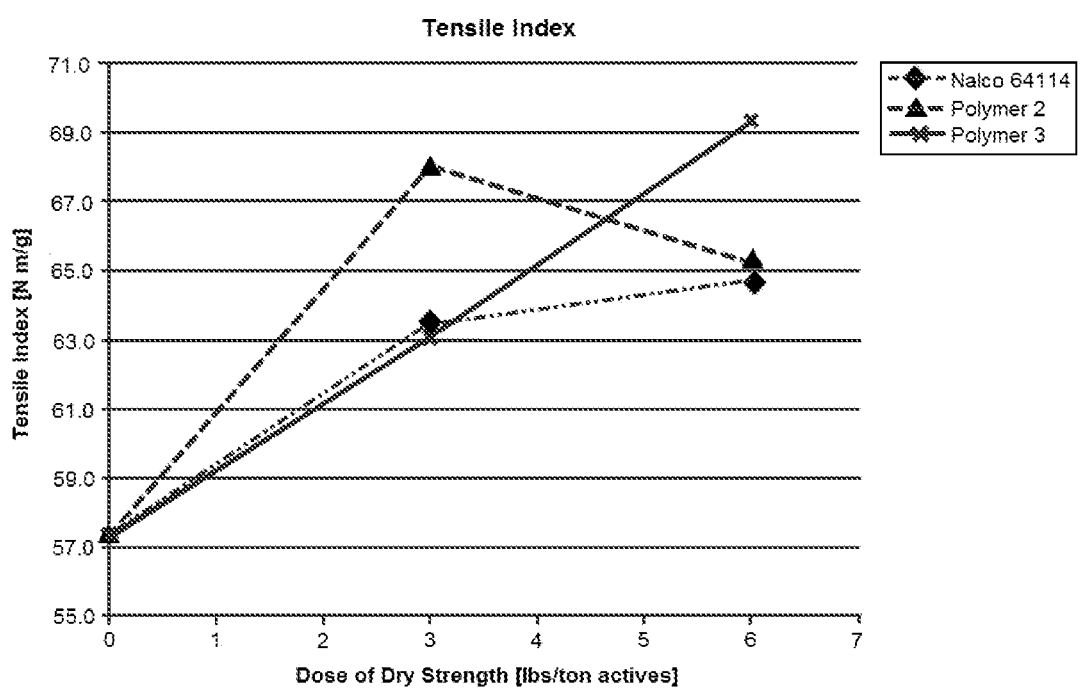
FIG. 2 graphically depicts the results of Example 10.
Figure 3:
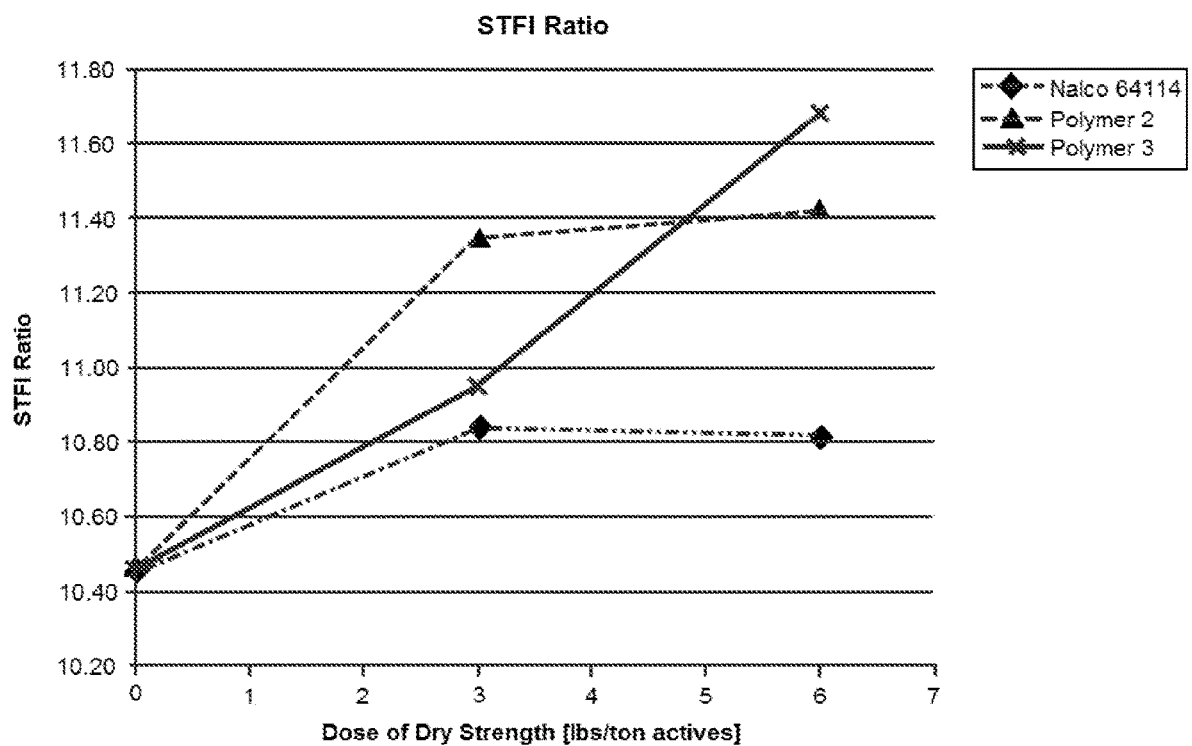
FIG. 3 graphically depicts the results of Example 10.

As demonstrated by FIG. 2 and FIG. 3, Polymer 2 and Polymer 3 exhibit satisfactory strength properties, outperforming the standard, Nalco 64114 (i.e., a glyoxylated polyacrylamide polymer) (control), in both tensile strength and compressive strength.

EXAMPLE 11

This example demonstrates the effect on paper dry strength exhibited by a sheet of paper treated with a powder comprising acrylamide-based polymers(s) networked via an associative monomer unit and a surfactant.

Polymer 1 (control, prepared according to Example 1) and Polymer 2 (prepared according to Example 2) were dissolved in water and dosed at various concentrations into a cellulose fiber slurry. The treated fibers were then added to a handsheet mold and drained through a screen to form a wet fiber pad. The pad was couched from the screen, pressed, and dried to yield the finished paper sheet. The sheet was tested for tensile strength and the results set forth in FIG. 4.

Figure 4:
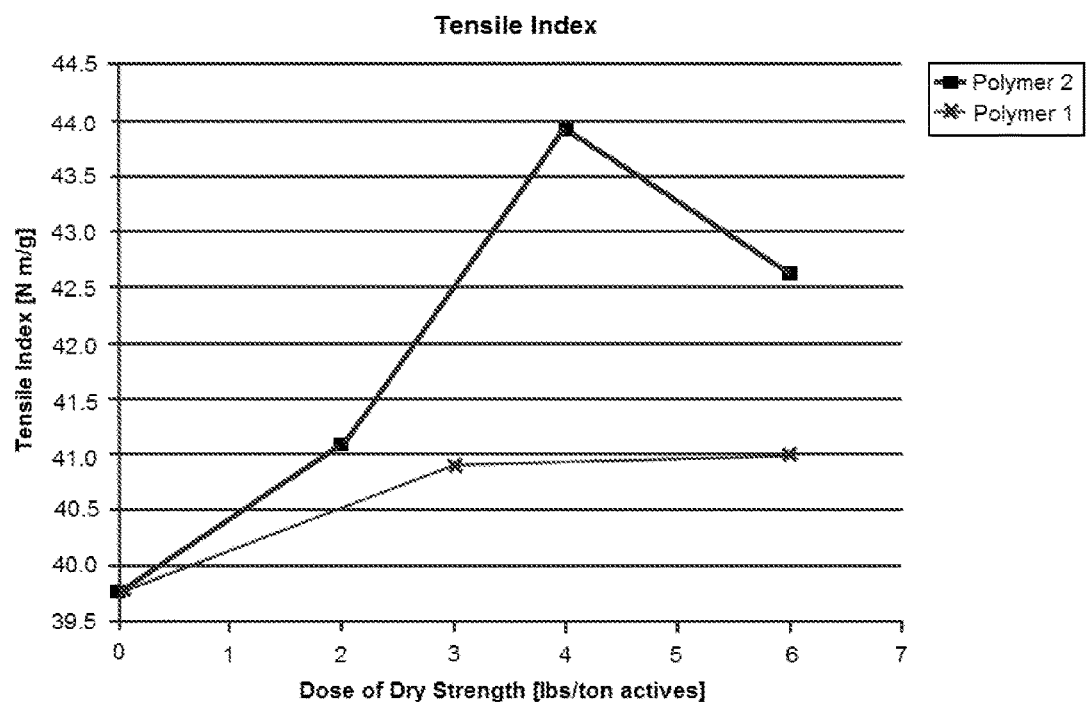
FIG. 4 graphically depicts the results of Example 11.

As demonstrated by FIG. 4, Polymer 2 exhibited improved tensile strength relative to low molecular weight Polymer 1 (control), which lacked networking via an associative monomer unit.

EXAMPLE 12

This example demonstrates the effect on polymer quality exhibited by Polymer 5 made down with high shear mixing and low shear mixing, as compared to a high molecular weight conventional dry powder flocculant ("Flocculant Comparative 1") made down with high shear mixing and low shear mixing.

Flocculant Comparative 1 (median particle size of about 990±386 microns), comprising 90/10 acrylamide/DMAEA.MCQ, was prepared having a molecular weight of ~10,000 kDa, and a reduced specific viscosity ("RSV") of 19 dL/g at 450 ppm and pH 4.

Polymer 5 (median particle size of about 560 microns), comprising 89.965/10/0.035 mol % acrylamide/DMAEA.MCQ/C18PEG1105MA, was prepared having a molecular weight of ~1,000 kDa, and a reduced specific viscosity of 4 dL/g at 3,000 ppm and pH 12.

Two 1 wt. % solutions of Polymer 5 were made down to form a fully made down powder solution. The first solution was made down with a cage stirrer at 800 rpm (tip speed of 1.26 m/s) for 1 hour. The second solution was made down with an IKA T 25 digital ULTRA-TURRAX® high performance dispersing instrument, equipped with an S 25 N-25 F dispersing element at 8,000 rpm (tip speed of 10.47 m/s) for 4 minutes.

For comparison, two 0.25 wt. % solutions of Flocculant Comparative 1 were made down to form a fully made down powder solution. The first solution was made down with a cage stirrer at 400 rpm (tip speed of 0.63 m/s) for 1 hour. The second solution was made down with an IKA T 25 digital ULTRA-TURRAX® high performance dispersing instrument, equipped with an S 25 N-25 F dispersing element at 8,000 rpm (tip speed of 10.47 m/s) for 4 minutes.

Viscosity, intrinsic viscosity, and Huggins constant of the resulting made down powder solutions were measured and the results set forth in Table 1.

TABLE 1

| Powder | Make Down Concentration (wt. %) | Make down Conditions | Viscosity of Made Down Solution (cps) | Intrinsic Viscosity of Made Down Solution at pH 12 (dL/g) |
|---|---|---|---|---|
| Comparative Flocculant 1 | 0.25 | Cage stirrer, 400 rpm, tip diameter 3 cm, tip speed 0.63 m/s, 1 hour | 182 | 19 |
| | 0.25 | IKA, 8,000 rpm, tip diameter 2.5 cm, tip speed 10.47 m/s, 4 min | 77 | 9.05 |
| Polymer 5 | 1 | Cage stirrer, 800 rpm, tip diameter 3 cm, tip speed 1.26 m/s, 1 hour | 221 | 3.52 |
| | 1 | IKA, 8,000 rpm, tip diameter 2.5 cm, tip speed 10.47 m/s, 4 min | 214 | 3.74 |

As is apparent from the results set forth in Table 1, Comparative Flocculant 1 was degraded to a polymer of lower molecular weight when made down with high shear using the IKA T 25 digital ULTRA-TURRAX® high performance dispersing instrument, as evidenced by the reduction in viscosity and intrinsic viscosity. However, Polymer 5, maintained its molecular weight when made down with high shear using the IKA T 25 digital ULTRA-TURRAX® high performance dispersing instrument, as evidenced by the relatively similar viscosity and intrinsic viscosity, as compared to the solution made down with low shear using the cage stirrer.

EXAMPLE 13

This example demonstrates the refractive index of a series of acrylamide-based polymer solutions as measured by a RM50 refractometer (Mettler Toledo) at 25° C. and 1 atmosphere ("atm") of pressure.

A fully dissolved acrylamide-based polymer solution with known concentration was obtained by mixing a weighed amount of powder and a weighed amount of water under shear with a cage stirrer at 400-800 rpm (tip speed of 0.63 m/s to about 1.26 m/s) until the mixture of powder and water can easily pass through 100-mesh screen with a trace amount of insoluble gel residue (<<0.05 wt. % of original powder added) left on the screen. An aliquot of the resulting filtered acrylamide-based polymer solution was placed in the cell of a RM50 refractometer (Mettler Toledo), and the refractive index recorded. The procedure was repeated for varying concentrations of acrylamide-based polymer solutions, and the refractive indices were plotted as a function of concentration.

Figure 5:
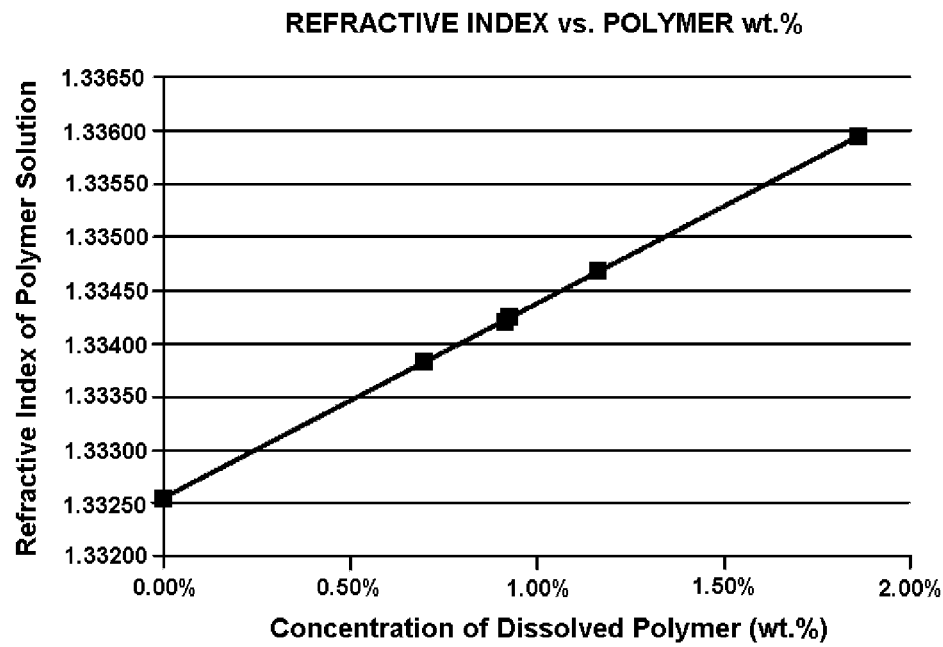
FIG. 5 graphically depicts the results of Example 13.

As demonstrated by FIG. 5, the refractive indices of the acrylamide-based polymer solutions are linearly correlated with concentration. Thus, a refractive index calibration curve can be used to estimate the concentration of an acrylamide-based polymer in solution.

EXAMPLE 14

This comparative example demonstrates the mixing progression of a powder suspension (1 wt. %), made down with a cage stirrer at 800 rpm (tip speed of 1.26 m/s), as measured by the refractive index.

A powder (Polymer 5; median particle size of about 560 microns) suspension was obtained by dispersing a weighed amount of powder into a weighed amount of water (1 wt. % powder content) manually or with a powder feeder, e.g., Norchem POWDERCAT™ feeder (Norchem Industries, Mokena, Ill.). The resulting mixture was blended with a cage stirrer at 800 rpm (tip speed of 1.26 m/s). A small aliquot of the suspension was filtered through a 100-mesh screen at 1-minute intervals to remove any undissolved powder. The refractive index of the filtrate was measured using a RM50 refractometer (Mettler Toledo), and the refractive index recorded. The concentration of dissolved acrylamide-based polymer in solution was determined using calibration curve as outlined in Example 13 and FIG. 5. The refractive indices (or acrylamide-based polymer concentrations) were plotted as a function of time to determine the mixing progression of the powder suspension.

Figure 6:
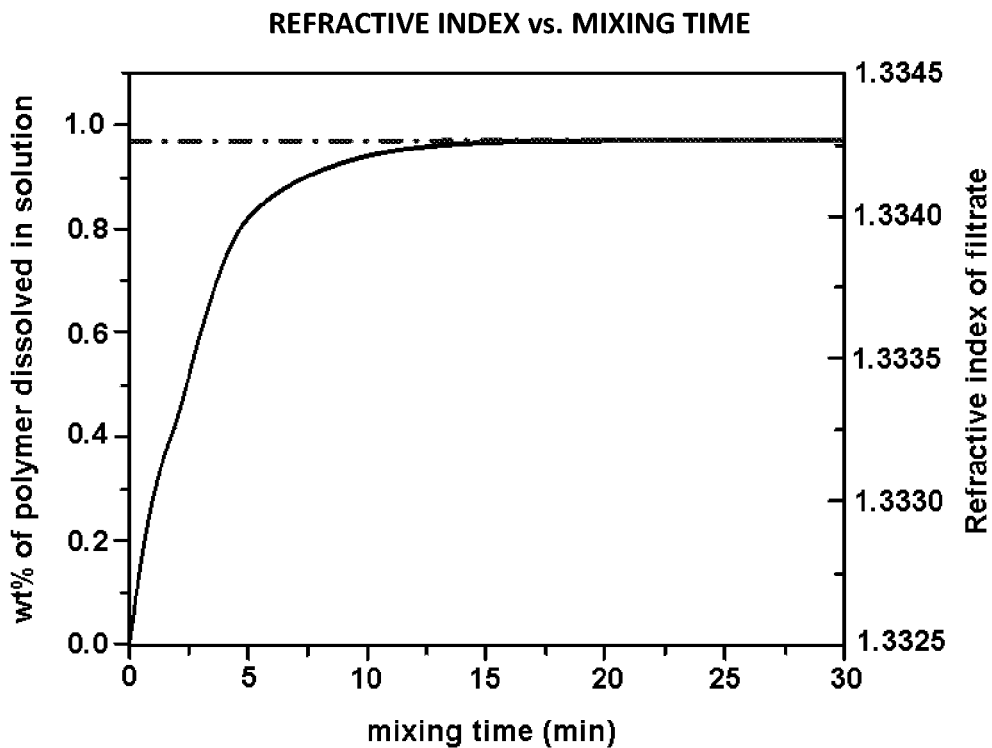
FIG. 6 graphically depicts the results of Example 14.

As demonstrated by FIG. 6, the mixing curve for a 1 wt. % powder suspension plateaus at a refractive index of about 1.33425 after about 15 minutes of mixing. Thus, the 1 wt. % powder suspension can be considered by this example to be a fully made down powder solution after about 15 minutes of mixing.

EXAMPLE 15

This example demonstrates the mixing progression of a powder suspension (1 wt. %), made down with an IKA T 25 digital ULTRA-TURRAX® high performance dispersing instrument at 8,000 rpm (tip speed of 10.47 m/s), as measured by the refractive index.

A powder (Polymer 5; median particle size of about 560 microns) suspension was obtained by dispersing a weighed amount of powder into a weighed amount of water (1 wt. % powder content) manually or with a powder feeder, e.g., Norchem POWDERCAT™ feeder (Norchem Industries, Mokena, Ill.). The resulting mixture was blended with an IKA T 25 digital ULTRA-TURRAX® high performance dispersing instrument at 8,000 rpm (tip speed of 10.47 m/s). A small aliquot of the suspension was filtered through a 100-mesh screen at 30-second intervals to remove any undissolved powder. The refractive index of the filtrate was measured using a RM50 refractometer (Mettler Toledo), and the refractive index recorded. The concentration of dissolved acrylamide-based polymer in solution was determined using calibration curve as outlined in Example 13 and FIG. 5. The refractive indices (or acrylamide-based polymer concentrations) were plotted as a function of time to determine the mixing progression of the powder suspension.

Figure 7:
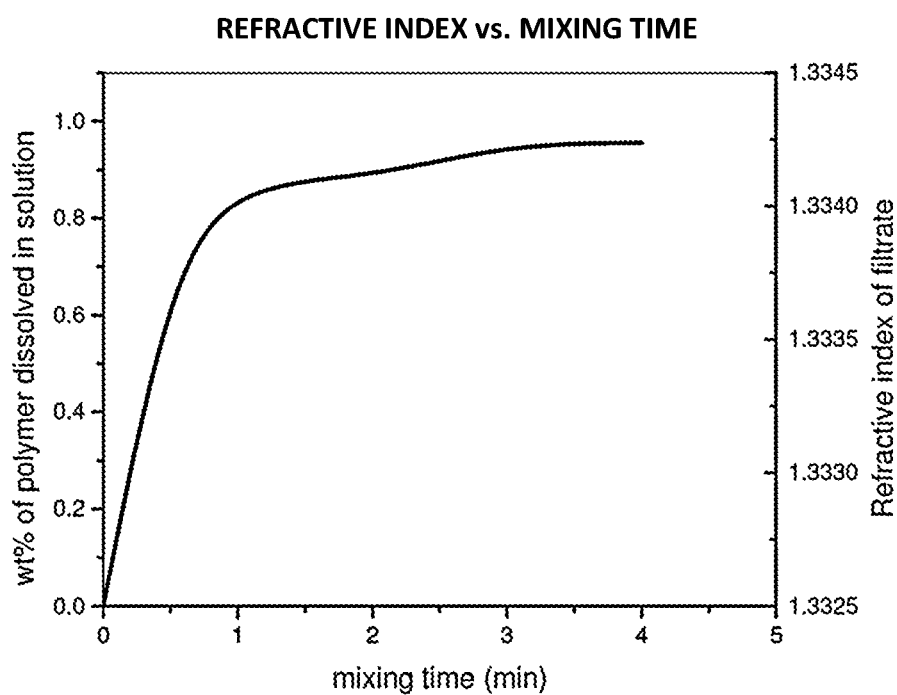
FIG. 7 graphically depicts the results of Example 15.

As demonstrated by FIG. 7, the mixing curve for a 1 wt. % powder suspension plateaus at a refractive index of about 1.33425 after about 4 minutes of mixing. Thus, the 1 wt. % powder suspension can be considered by this example to be a fully made down powder solution after about 4 minutes of mixing.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A process for making an acrylamide-based polymer solution, comprising blending a mixture of an acrylamide-based polymer powder and a solvent for no more than about 15 minutes to yield the polymer solution,
wherein the acrylamide-based polymer powder comprises particles having been dry-cut to a median particle size of from about 200 microns to about 10,000 microns, wherein the acrylamide-based polymer comprises formula $AP_1$:

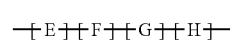

$AP_1$ wherein E is one or more associative monomer units(s), F is one or more additional monomer unit(s), G is one or more additional monomer unit(s) of Formula I:

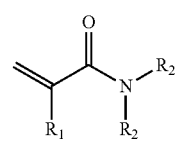

I wherein $R_1$ is H or $C_1$-$C_4$ alkyl and each $R_2$ is independently H or an alkyl group, an aryl group, a fluoroalkyl group, or a fluoroaryl group, and H is optionally present and is one or more piperidine-2,6-dione unit(s), wherein the one or more piperidine-2,6-dione(s) are formed upon cyclization of an acrylamide nitrogen of the additional monomer unit of Formula I ("G") on a carbonyl of the additional monomer unit ("F").

2. The process of claim 1, wherein the solvent is water.

3. The process of claim 1, wherein the particles have a median particle size of from about 350 microns to about 10,000 microns.

4. The process of claim 1, wherein the mixture of the acrylamide-based polymer powder and the solvent is blended at an impeller tip speed of about 5 m/sec to about 25 m/sec.

5. The process of claim 1, wherein the mixture of the acrylamide-based polymer powder and the solvent is blended for no more than about 10 minutes to yield the polymer solution.

6. The process of claim 1, wherein the polymer solution has an intrinsic viscosity of from about 0.05 dL/g to about 15 dL/g.

7. The process of claim 1, wherein the acrylamide-based polymer has a weight average molecular weight of from about 10 kDa to about 5,000 kDa.

8. The process of claim 1, wherein the acrylamide-based polymer has a weight average molecular weight of from about 800 kDa to about 2,000 kDa.

9. The process of claim 1, wherein the polymer solution comprises from about 0.1 wt. % to about 10 wt. % of the acrylamide-based polymer.

10. The process of claim 9, wherein the polymer solution comprises from about 0.5 wt. % to about 5 wt. % of the acrylamide-based polymer.

11. The process of claim 10, wherein the polymer solution comprises from about 1 wt. % to about 4 wt. % of the acrylamide-based polymer.

12. The process of claim 1, wherein the powder further comprises a surfactant.

13. The process of claim 1, wherein the polymer solution further comprises a surfactant.

14. The process of claim 1, wherein the acrylamide-based polymer is associatively networked with a surfactant.

15. The process of claim 14, wherein the acrylamide-based polymer has a monomer unit that is structurally similar to the surfactant.

* * * * *

UNITED STATES PATENT AND TRADEMARK OFFICE
CERTIFICATE OF CORRECTION

PATENT NO. : 11,718,696 B2
APPLICATION NO. : 16/635125
DATED : August 8, 2023
INVENTOR(S) : Heqing Huang, Cheng Sung Huang and Weiguo Cheng Page 1 of 1

It is certified that error appears in the above-identified patent and that said Letters Patent is hereby corrected as shown below:

On the Title Page

Column 2, last line of item (56), delete "tappij" and insert --jtappij--

In the Claims

In Claim 1, Line 52, delete "units(s)," and insert --unit(s),--

Signed and Sealed this
Ninth Day of April, 2024

Katherine Kelly Vidal
*Director of the United States Patent and Trademark Office*